United States Patent [19]
Kinjo et al.

[11] Patent Number: 5,894,383
[45] Date of Patent: Apr. 13, 1999

[54] MAGNETIC RECORDING/REPRODUCING APPARATUS WITH A POSITIONING MECHANISM FOR A TAPE GUIDE DRUM

[75] Inventors: Hisao Kinjo; Hiromichi Hirayama, both of Yokohama, Japan

[73] Assignee: Victor Company of Japan, Ltd., Yokohama, Japan

[21] Appl. No.: 08/576,084

[22] Filed: Dec. 21, 1995

[30] Foreign Application Priority Data

Dec. 21, 1994 [JP] Japan .................. 6-336240

[51] Int. Cl.$^6$ .................................................. G11B 5/56
[52] U.S. Cl. ................................................... 360/109
[58] Field of Search ............................. 360/107, 109

[56] References Cited

U.S. PATENT DOCUMENTS

| | | | |
|---|---|---|---|
| 3,567,869 | 3/1971 | Hirota et al. | 360/109 |
| 3,995,317 | 11/1976 | Schmidt | 360/109 |
| 4,080,639 | 3/1978 | Gunschmann | 360/107 |
| 4,151,570 | 4/1979 | Ravizza et al. | 360/107 |
| 4,647,990 | 3/1987 | Sasamura | 360/70 |
| 5,270,890 | 12/1993 | Katou et al. | 360/107 |
| 5,365,390 | 11/1994 | Hasegawa | 360/107 |
| 5,504,642 | 4/1996 | Kinjo et al. | 360/109 |

FOREIGN PATENT DOCUMENTS

| | | |
|---|---|---|
| 51-61815 | 5/1976 | Japan . |
| 6208701 | 7/1994 | Japan . |
| 6309745 | 11/1994 | Japan . |
| 6318351 | 11/1994 | Japan . |

*Primary Examiner*—Stuart S. Levy
*Assistant Examiner*—George J. Letscher
*Attorney, Agent, or Firm*—Pollock, Vande Sande & Priddy

[57] ABSTRACT

A magnetic recording and reproducing apparatus with a positioning mechanism for a tape guide drum is provided. The positioning mechanism includes first and second actuators which changes the position of the tape guide drum relative to a direction of travel of a magnetic tape during reproduction for orienting rotary magnetic heads to follow tracks formed on the magnetic tape perfectly if the tracks are curved undesirably. The first actuator is designed to turn the tape guide drum to orient a portion of a rotation plane of the rotary magnetic heads at a tape-entering position where the magnetic tape enters the tape guide drum in a first direction and a portion of the rotation plane at a tape-leaving position where the magnetic tape leaves the tape guide drum in a second direction opposite the first direction. The second actuator is designed to turn the rotation plane of the rotary magnetic head at the tape-entering position and the tape-leaving position in the same direction.

7 Claims, 51 Drawing Sheets

FIG. 4(D)
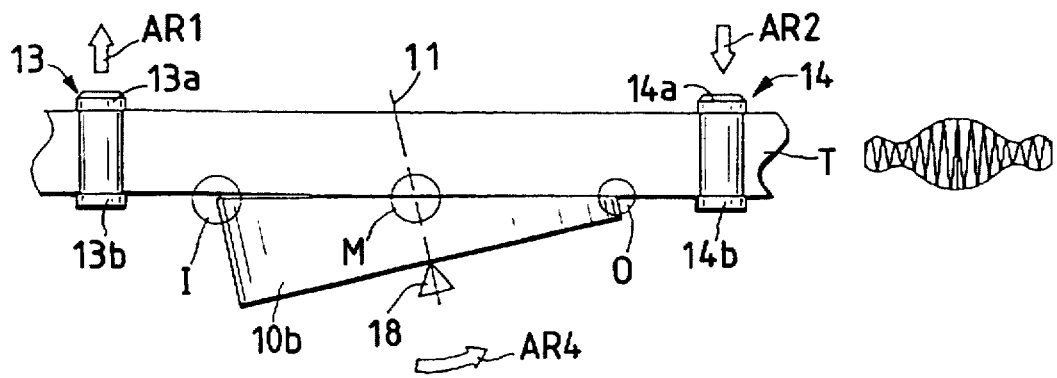
FIG. 4(d)
FIG. 4(E)
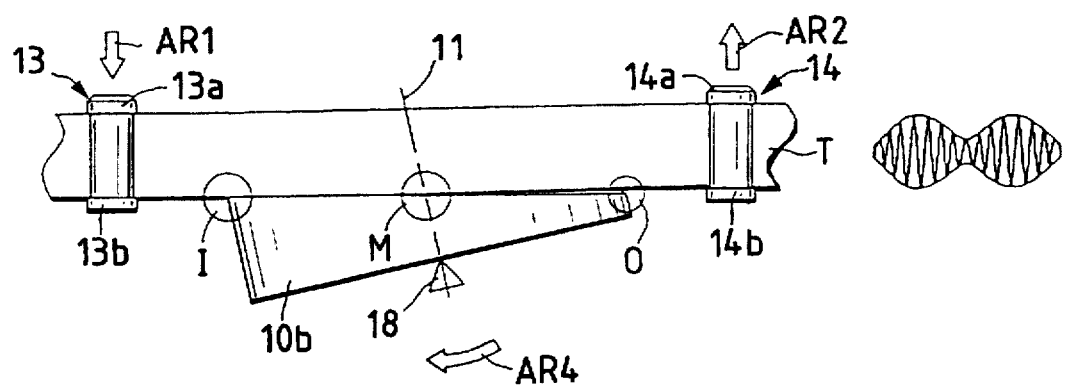
FIG. 4(e)
FIG. 4(F)
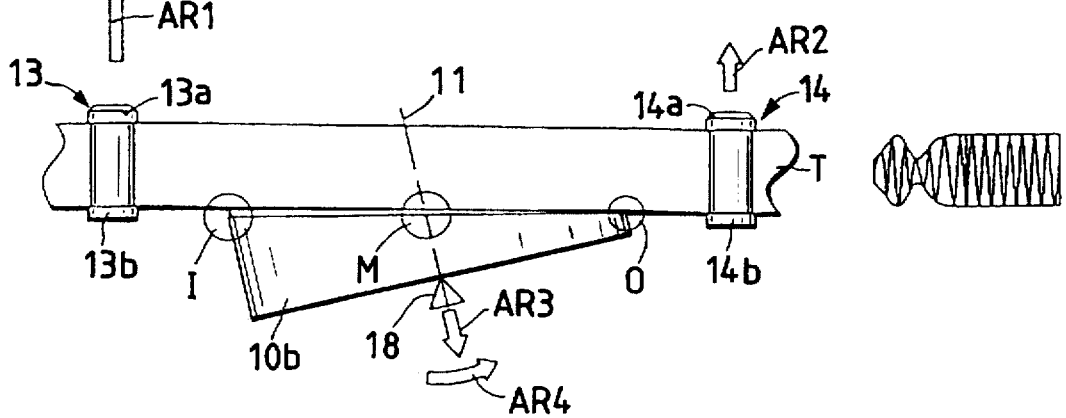
FIG. 4(f)

FIG. 14(a)
FIG. 14(c)
FIG. 14(b)
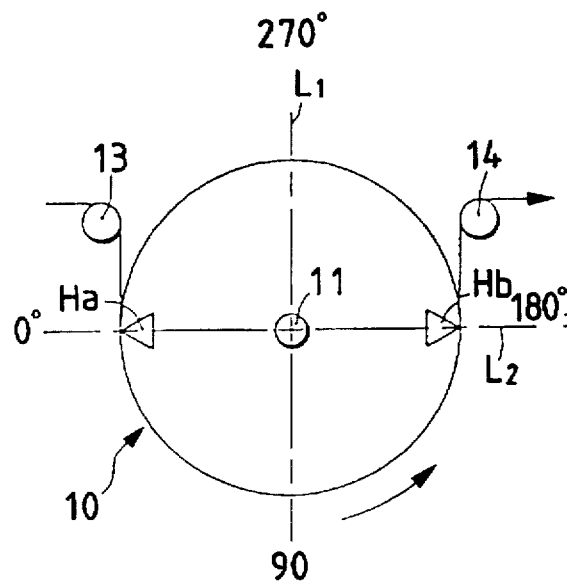
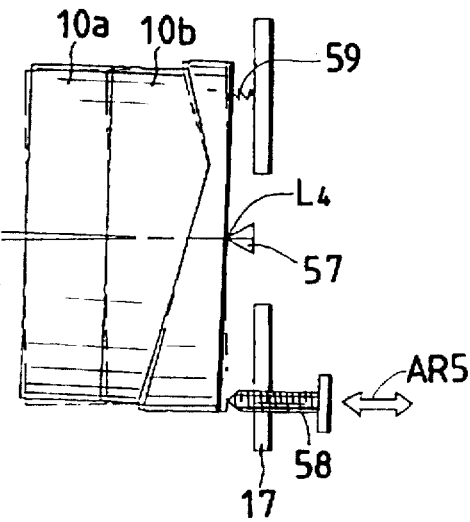
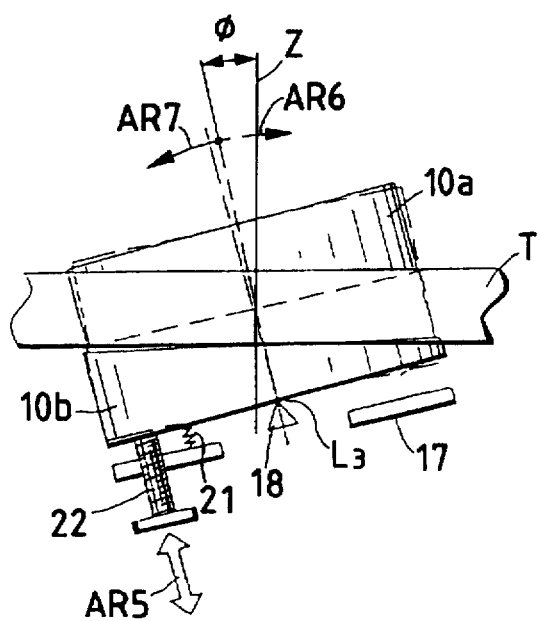

FIG. 59(a)
FIG. 59(c)
FIG. 59(b)
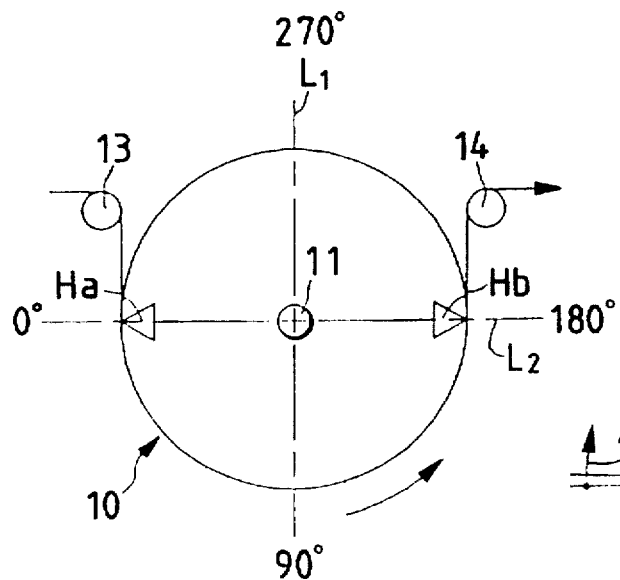
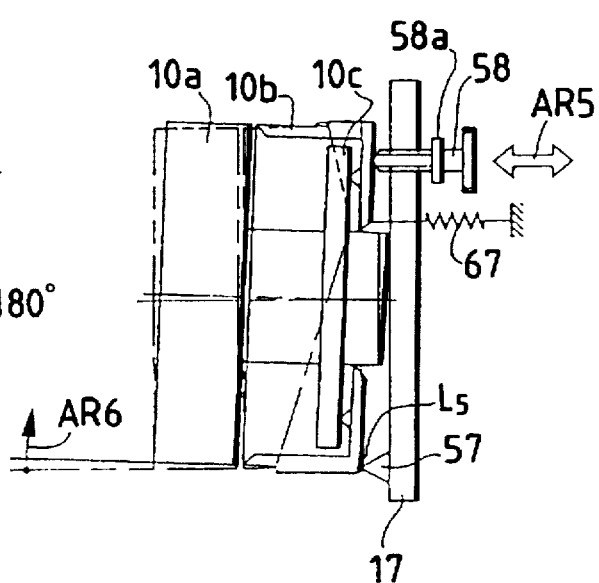
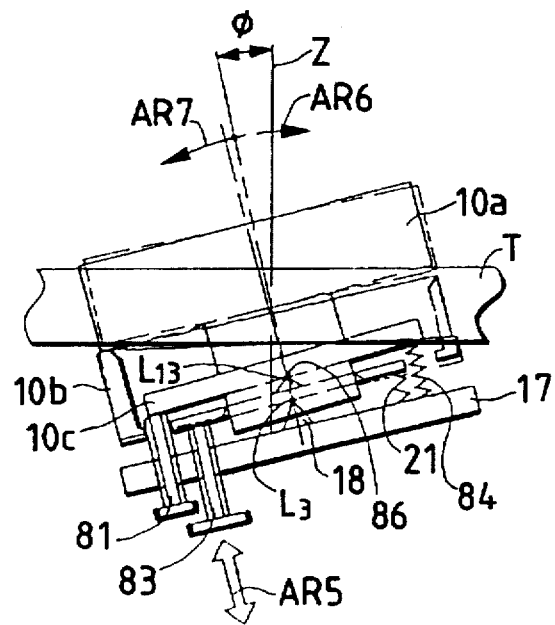

MAGNETIC RECORDING/REPRODUCING APPARATUS WITH A POSITIONING MECHANISM FOR A TAPE GUIDE DRUM

BACKGROUND OF THE INVENTION

1. Technical Field

The present invention relates generally to a magnetic recording/reproducing apparatus designed to record and reproduce signals on and from slant tracks on a magnetic tape using rotary magnetic heads. More particularly, the invention is directed to an improvement on a magnetic recording/reproducing apparatus with a positioning mechanism which orients a rotary tape guide drum having disposed thereon magnetic heads so as to trace slant tracks on a magnetic tape correctly even if the slant tracks are curved undesirably.

2. Background Art

A VHS video tape recorder VTR) is well known as a magnetic recording/reproducing apparatus that forms slant tracks on a magnetic tape using rotary magnetic heads for recording and/or reproducing information signals. Some factors causing slant tracks formed on the magnetic tape to be curved will be discussed with reference to FIGS. 1 to 3.

FIG. 1 shows a conventional tape-transport system of a typical VHS VTR. FIG. 2 is a front view of FIG. 1 illustrating a mechanical relation between slant tracks formed on a magnetic tape T which is curved or deformed for some reason (hereinafter, will be referred to as track set) and a tape guide drum 10. FIG. 3 is a plan view from which an entrance guide roller 13 and an exit guide roller 14 are omitted for convenience. A line L1 extends through a drum shaft 11 so as to divide an area of the magnetic tape T wrapped about the tape guide drum 10 into two equal sections, while a line L2 extends perpendicular to the line L1. In the following discussion, it is assumed that the left of the line L2 is defined as 0°, and angular positions of component parts around the drum shaft 11 are defined as angles in a counterclockwise direction on the basis of 0°.

The shown VTR generally includes the tape guide drum 10 mounted on a drum base 17 at an angle φ to the vertical line Z, the entrance guide roller 13, the exit guide roller 14, and the inclined guide posts 1 and 2. The entrance guide roller 13 is arranged at a position where the magnetic tape T enters the tape guide drum 10, while the exit guide roller 14 is arranged at a position where the magnetic tape T leaves the tape guide drum 10. The magnetic tape T is withdrawn from a supply reel 3 of a tape cassette 20 into engagement with an erase head 4 and an impedance roller 5, wrapped helically about a portion of the periphery of the tape guide drum 10 over an angle defined by the guide posts 1 and 2, and then transported to a take-up reel 9 by a pinch roller 8 and a capstan 7 in engagement with an audio control head 6.

The tape guide drum 10 consists of an upper drum 10a supported rotatably by the drum shaft 11 and a lower drum 10b. The upper drum 10a has mounted thereon magnetic heads Ha and Hb and is driven to rotate around the drum shaft 11. The lower drum 10b has a lead 12 formed around its periphery throughout a range of wrap of the magnetic tape T to guide a lower edge Th of the magnetic tape T during traveling. The lead 12 is formed with a step which is machined by a lathe so as to project from a magnetic tape-wrapped surface 10b-1 by about 100 μm to 150 μm, and which has the horizontal linearity within a range of not over ±1 μm to form a basis in a height-wise direction of the magnetic tape T during traveling.

The entrance guide roller 13 and the exit guide roller 14 include upper flanges 13a and 14a, lower flanges 13b and 14b secured on shafts 13d and 14d, and cylindrical rollers 13c and 14c rotatable around the shafts 13d and 14d, respectively. The shafts 13d and 14d have formed thereon fine screw threads (0.35 mm /round) and engage post bases 15 and 16 for adjustment of height using set screws 15a and 16b, respectively. The upper flanges 13a and 14a of the guide rollers 13 and 14 serve to orient an upper edge Ta of the magnetic tape T during traveling. The width of the magnetic tape T is 12.6±0.01 mm in the VHS VTR standards. Intervals between the upper flanges 13a and 14a and the lower flanges 13b and 14b of the guide rollers 13 and 14 are 12.7±0.03 mm. Therefore, during traveling of the magnetic tape T, the upper edge Ta is oriented by the upper flanges 13a and 14a of the guide rollers 13 and 14, while the lower edge Tb is oriented by the lead 12 formed on the lower drum 10b. The lower flanges 13b and 14b are designed for allowing play of the magnetic tape T in a width-wise direction.

The above conventional tape-transport system would have the following major factors causing the track set:

(1) Failure of height adjustment of the entrance guide roller 13 and the exit guide roller 14;

(2) Deflection due to the eccentricity of the drum shaft 11 and the upper drum 10a;

(3) Non-linearity of the lead 12 in a direction of tape travel;

(4) Vertical deflection of the magnetic tape T during traveling; and (5) Deterioration with age such as wear of the tape-transport system.

The results of research by the inventors of this application, however, show that the track set is practically caused by the factor (1), and the other factors (2) to (5) are minor.

Tests were performed for removing fluctuations in a waveform of an FM signal (FM envelope) reproduced from a magnetic tape whose tracks are curved, by adjusting the heights of the entrance guide roller 13 and the exit guide roller 14, that is, orienting magnetic heads so as to trace the curved tracks on the magnetic tape perfectly. The results of the tests show that even if the track set is great over a range of the order of 100 μm corresponding to the width of several tracks, it is possible to have the magnetic heads follow the curved tracks perfectly even in the EP (extended playing) mode.

Problems in the so-called interchange reproduction due to the track set caused by a failure of height adjustment of the guide rollers will be discussed below.

If the heights of the guide rollers 13 and 14 are adjusted incorrectly, it may cause the magnetic tape T to be pressed by the lead 12 and the upper flanges 13a and 14a, leading to the deformation of the magnetic tape T in a width-wise direction, or the lower edge Tb of the magnetic tape T to be shifted away from the lead 12, resulting in the formation of curved tracks on the magnetic tape T. In the so-called self-record/reproduction in which the magnetic tape T having curved tracks is reproduced by the same VTR as used in recording, the magnetic heads follow the curved tracks perfectly. However, the so-called interchange reproduction in which the magnetic tape T having curved tracks is reproduced by another VTR different from a VTR used in recording poses the following essential problems.

When the magnetic tape T on which curved tracks are formed by a VTR in which the guide rollers 13 and 14 are adjusted in height incorrectly (hereinafter, referred to as an unadjusted VTR) is reproduced by another VTR in which the guide rollers 13 and 14 are adjusted in height correctly (hereinafter, referred to as an adjusted VTR), magnetic heads of the adjusted VTR move on the magnetic tape straight, so that the curved tracks are not correctly traced by the magnetic heads. This may cause the magnetic heads to reproduce part of information signals recorded on an adjacent track, resulting in crosstalk.

The above problem involved in the interchange reproduction becomes serious in high-density recording on narrow tracks. For instance, VHS VTRs usually have two standardized operation modes: an SP (Standard Playing) mode and an EP (Extended Playing) mode. In the SP mode, a track pitch is 58 µm, while in the EP mode, a track pitch is 19 µm which is about ⅓ times that of the SP mode to provide a three times longer recording time. In the EP mode, it is difficult to achieve the interchange reproduction by precisely positioning magnetic heads having a track width of 19 µm. Therefore, in order to achieve the interchange reproduction in the EP mode, there has been proposed the use of magnetic heads having a track width of 26 µm slightly wider than the track pitch of 19 µm to trace a track and part of adjacent tracks simultaneously. This allows the magnetic heads to trace all the tracks completely if the tracks are curved. However, when the tracks having the track pitch of 19 µm are traced by using the magnetic heads having the track width of 26 µm, it will cause information signals recorded on adjacent one of the tracks to be always reproduced. Although the azimuth loss decreases the beat interference greatly, images will be reproduced with the beat interference more conspicuous than that caused when tracks are traced correctly by magnetic heads having a track width of 19 µm. For this reason, relatively advanced VHS VTRs commonly have two types of magnetic heads: one having a track width of 19 µm for use in the self-record/reproduction and the other having a track width of 26 µm for use in the interchange reproduction.

The use of the magnetic heads having the track width of 26 µm allows a magnetic tape whose tracks are curved to be reproduced without crosstalk at the sacrifice of quality of reproduced images. However, if the degree to which the tracks are curved is much greater than the track width of the magnetic heads, it will cause the crosstalk.

For avoiding the above drawback, there has been proposed a technique as described below.

For example, magnetic heads are supported on a rotary drum using an actuator such as a bimorph or a voice coil motor (VCM), and driven by the actuator to be displaced in a direction perpendicular to tracks during reproduction so as to trace the tracks which are curved.

U.S. Pat. No. 4,151,570 discloses the use of a bimorph in the above technique, while Japanese Patent Second Publication No. 51-61815 discloses the use of a voice coil motor.

The above prior art VTR using the actuator for moving the magnetic heads in the direction perpendicular to the length of tracks, however, requires a compact actuator having good amplitude-frequency characteristics such as those of a bimorph or a voice coil motor, resulting in an increased size of an overall system structure. Further, a device such as a slip ring is required for the power supply to the actuator, resulting in a complex system structure.

SUMMARY OF THE INVENTION

It is therefore a principal object of the present invention to avoid the disadvantages of the prior art.

It is another object of the present invention to provide a magnetic recording/reproducing apparatus which has a positioning mechanism for orienting magnetic heads so as to follow curved tracks formed on a magnetic tape perfectly during reproduction.

According to one aspect of the present invention, there is provided a magnetic reproduction apparatus which comprises a tape guide drum including an upper drum portion and a lower drum portion, the lower drum portion having formed thereon a lead for guiding a lower edge portion of a magnetic tape wrapped about the tape guide drum, the upper drum portion having mounted thereon a magnetic head so as to be rotatable on a given head rotation plane for reproducing information data recorded on slant tracks formed on the magnetic tape; a drum shaft supporting the upper drum portion and the lower drum portion of the tape guide drum coaxially with each other and orienting the upper drum portion and the lower drum portion at a given angle to a direction of tape travel; an entrance guide post defining a tape-entering position of a tape-wrapped area on the tape guide drum; an exit guide post defining a tape-leaving position of the tape-wrapped area on the tape guide drum; an entrance guide roller having disposed thereon a flange for orienting an upper edge portion of the magnetic tape entering the tape guide drum; an exit guide roller having disposed thereon a flange for orienting the upper portion of the magnetic tape leaving the tape guide drum; a first positioning means for positioning the tape guide drum, the first positioning means orienting a first portion of the head rotation plane at the tape-entering position in a first direction and orienting a second portion of the head rotation plane at the tape-leaving position in a second direction opposite the first direction; and a second positioning means for positioning the tape guide drum, the second positioning means for orienting the first and second portions of the head rotation plane at the tape-entering position and the tape-leaving position in the same direction.

In the preferred mode of the invention, a drum base is further provided which has a reference surface inclined at the given angle to the direction of tape travel and supports the tape guide drum. The first positioning means turns the tape guide drum around a line defined between a first pivot and a second pivot provided between the drum base and the lower drum of the tape guide drum.

The first positioning means turns the tape guide drum around a first line defined between a first pivot and a second pivot provided between the drum base and the lower drum of the tape guide drum and around a second line defined between the first pivot and a third pivot provided between the drum base and the lower drum.

The first positioning means alternatively turns the tape guide drum around a first line defined between a first pivot and a second pivot provided between the drum base and the lower drum of the tape guide drum and around a second line defined between third pivot and a fourth pivot provided between the drum base and the lower drum.

The second positioning means moves the tape guide drum in a direction substantially parallel to the drum shaft.

The second positioning means alternatively turns the tape guide drum around a line extending between the drum base and the lower drum perpendicular to a line defined between the center of the tape-wrapped area in a lengthwise direction of the magnetic tape and the drum shaft.

A turning means is further provided for establishing relative turning of the upper drum and the lower drum.

According to another aspect of the invention, there is provided a magnetic reproduction apparatus which comprises a tape guide drum including an upper drum portion and a lower drum portion, the upper drum portion having mounted thereon a magnetic head so as to be rotatable on a given head rotation plane for reproducing information data recorded on slant tracks formed on the magnetic tape; a lead ring including an annular portion and a bottom portion, the annular portion having formed thereon a lead guiding a lower edge portion of the magnetic tape wrapped about the tape guide drum; a stepped portion formed on a lower portion of the lower drum of the tape guide drum, the stepped portion being disposed within the annular portion of the lead ring with a given clearance; a drum base having a reference surface which is inclined at a given angle to the direction of tape travel and supports the tape guide drum; a drum shaft supporting the upper drum portion and the lower drum portion of the tape guide drum coaxially with each other and orienting the upper drum portion and the lower drum portion at the given angle to the direction of tape travel; an entrance guide post defining a tape-entering position of a tape-wrapped area on the tape guide drum; an exit guide post defining a tape-leaving position of the tape-wrapped area on the tape guide drum; an entrance guide roller having disposed thereon a flange for orienting an upper edge portion of the magnetic tape entering the tape guide drum; an exit guide roller having disposed thereon a flange for orienting the upper portion of the magnetic tape leaving the tape guide drum; a first positioning means for positioning the tape guide drum, the first positioning means orienting a first portion of the head rotation plane and a first portion of the lead ring at the tape-entering position in a first direction and orienting a second portion of the head rotation plane and a second portion of the lead ring at the tape-leaving position in a second direction opposite the first direction; and a second positioning means for positioning the tape guide drum, the second positioning means for orienting the first and second portions of the head rotation plane and the lead ring at the tape-entering position and the tape-leaving position in the same direction.

In the preferred mode of the invention, a turning means is further provided which establishes relative turning of the lead ring and the tape guide drum.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIGS. 4(B) to 4(I) illustrate tape-transport systems wherein the entrance guide roller 13 and the exit guide roller 14 are adjusted in height incorrectly;

FIGS. 4(a) to 4(i) show waveforms of FM reproduced video signals, which are recorded on magnetic tapes by VTRs having the tape-transport systems shown in FIGS. 4(A) to 4(I), reproduced for one field period of time by an adjusted VTR wherein the guide rollers 13 and 14 are adjusted in height correctly;

FIG. 14(a) is a plan view which shows a tape guide head drum according to a second embodiment of the present invention;

FIG. 14(b) is a front view of FIG. 14(a), as viewed from an angular direction of 90°;

FIG. 14(c) is a side view of FIG. 5(a), as viewed from an angular position of 180°;

FIG. 59(a) is a plan view which shows a tape guide head drum according to a seventh embodiment;

FIG. 59(b) is a front view of FIG. 59(a), as viewed from an angular direction of 90°;

FIG. 59(c) is a side view of FIG. 59(a), as viewed from an angular position of 180°;

DESCRIPTION OF THE PREFERRED EMBODIMENT

Prior to describing embodiments of the present invention in detail, some types of possible failures of height adjustment of guide rollers in VTRs and principles of correcting undesired track set according to the present invention which are caused by the failures of height adjustment of the guide rollers will be discussed below with reference to FIGS. 4(A) to 4(I).

Figure 1:
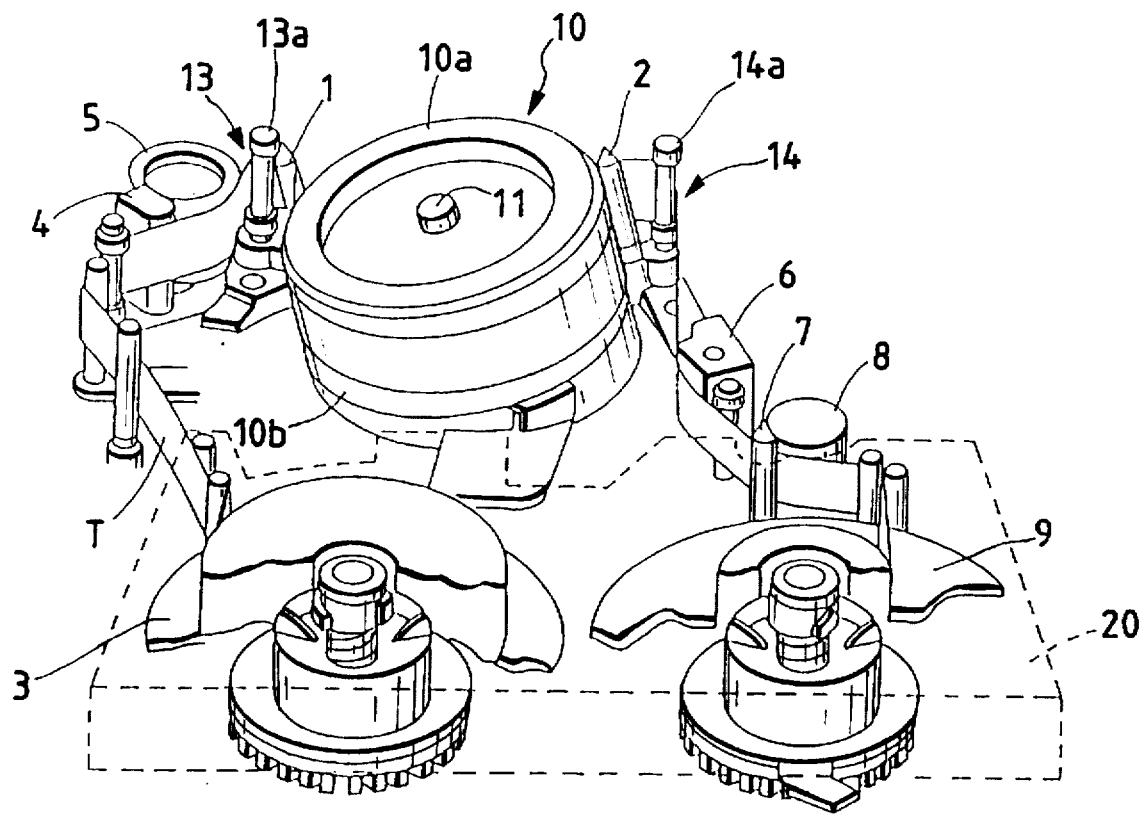
FIG. 1 is a perspective view which shows a tape-transport system of a conventional VHS video tape recorder.
Figure 2:
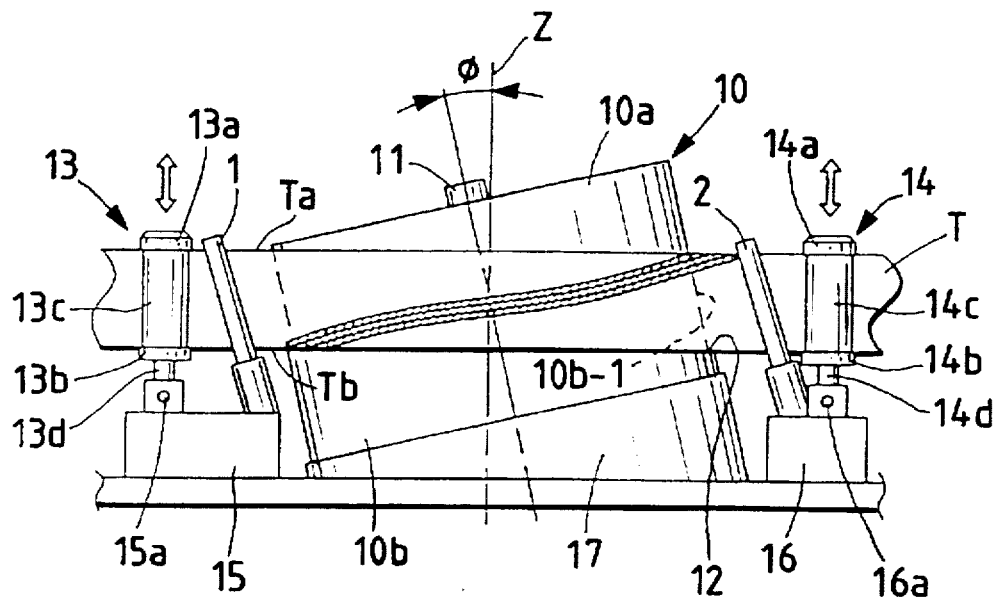
FIG. 2 is a front view of FIG. 1 which shows a positional relation between a tape guide head drum and guide rollers.
Figure 3:
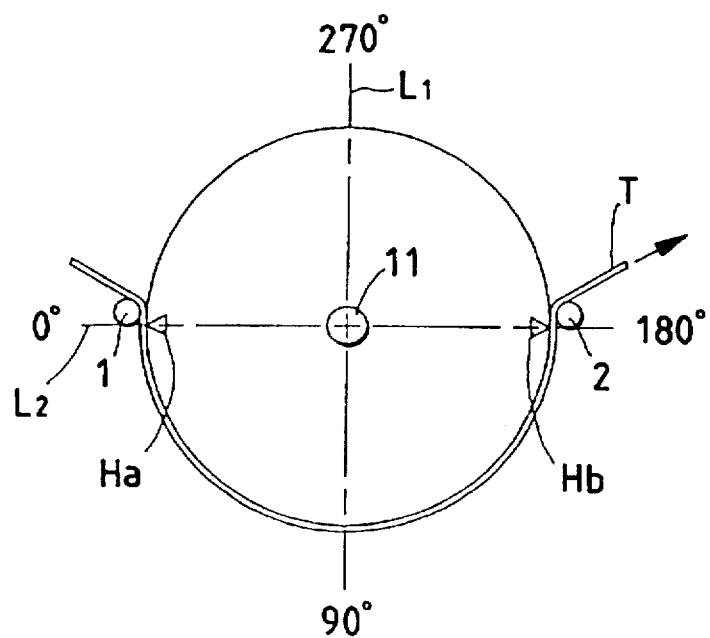
FIG. 3 is a plan view of FIG. 2.
Figure 4A:
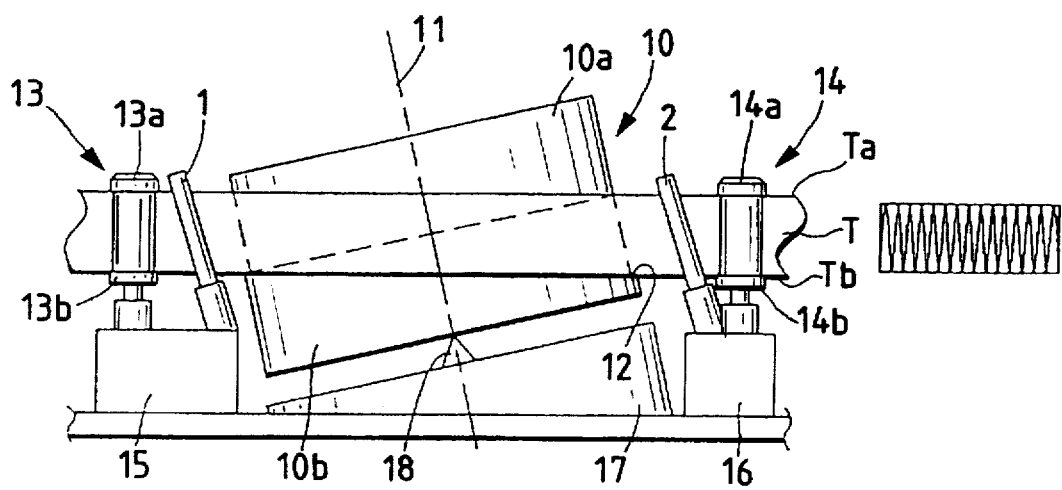
FIG. 4(A) is a front elevation illustrating a tape-transport system similar to the one shown in FIG. 2, as viewed from a direction of 90° in FIG. 3.

FIG. 4(A) is a front elevation illustrating a tape-transport system similar to the one shown in FIG. 2, as viewed from a direction of 90° in FIG. 3. In the shown tape-transport system, the entrance guide roller 13 and the exit guide roller 14 are both adjusted in height correctly. FIGS. 4(B) to 4(I) illustrate tape-transport systems wherein the entrance guide roller 13 and the exit guide roller 14 are adjusted in height incorrectly. In FIGS. 4(B) to 4(I), the upper drum 10a, the inclined guide posts 1 and 2, and the post bases 15 and 16 are omitted for the brevity of illustration.

FIGS. 4(a) to 4(i) on the right sides of FIGS. 4(A) to 4(I) show waveforms of FM reproduced video signals (FM envelope), which are recorded on magnetic tapes by VTRs having the tape-transport systems shown in FIGS. 4(A) to 4(I), reproduced for one field period of time by an adjusted VTR wherein the guide rollers 13 and 14 are adjusted in height correctly.

FIG. 4(A), as already mentioned, shows an adjusted VTR wherein the entrance guide roller 13 and the exit guide roller 14 are adjusted in height correctly. The magnetic tape T travels on the tape guide drum 10 without being subjected to the deformation in a width-wise direction under optimum conditions that the lower edge Th is guided along the lead 12 formed on the lower drum 10b, and the upper edge Ta are oriented by the upper flanges 13a and 14a of the guide rollers 13 and 14. Therefore, when video signals, which are recorded on the magnetic tape T during the traveling, are reproduced by another adjusted VTR, an FM reproduced waveform, as shown in FIG. 4(a), which will not be objectionable in the interchange reproduction is obtained.

Unadjusted VTR I

Figure 4B:
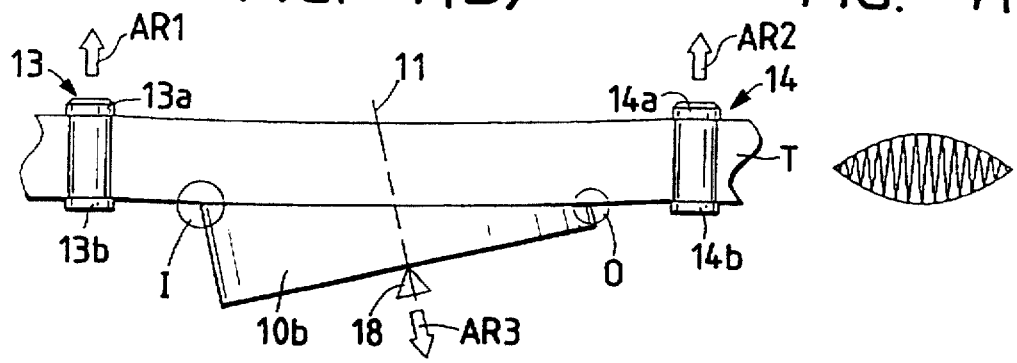

FIG. 4(B) shows an unadjusted VTR I wherein the entrance guide roller 13 and the exit guide roller 14 are shifted in directions indicated by arrows AR1 and AR2 by the same distance. The lower edge Tb of the magnetic tape T is lifted up by the lower flanges 13b and 14b of the guide rollers 13 and 14, so that the magnetic tape T travels on the tape guide drum 10 with air gaps formed between itself and the lead 12 at a tape-entering position I (i.e., about 0° in FIG. 3) and a tape-leaving position O (i.e., about 180° in FIG. 3).

On the magnetic tape T thus transported, curved tracks are formed. When the magnetic tape T whose tracks are curved to the extent corresponding to one track width in a range of one field is reproduced by the adjusted VTR, an FM reproduced waveform, as shown in FIG. 4(b), whose amplitude is maximized at the center and minimized at both ends or an FM reproduced waveform (not shown) whose amplitude is maximized at both ends and minimized at the center according to the positional relation between magnetic heads and the tracks. Noise will be undesirably produced on upper and lower portions or a central portion of a reproduced image.

Such a problem is, however, encountered in the interchange reproduction wherein the magnetic tape T, on which video signals are recorded by an unadjusted VTR such as that shown in FIG. 4(B), is reproduced by an adjusted VTR such as that shown in FIG. 4(A), but it is not encountered in the self-record/reproduction wherein the magnetic tape T is reproduced by the same VTR. Thus, an FM reproduced waveform, as shown in FIG. 4(a) is obtained. This is because when the magnetic tape is reproduced by the same VTR as used in recording, it travels along substantially the same path.

The present invention was made in view of the foregoing. Specifically, a magnetic recording/reproducing apparatus according to the present invention is designed to transport the magnetic tape T, on which video signals are recorded by the unadjusted VTR I, along substantially the same traveling path as that in the unadjusted VTR I by shifting the tape guide drum 10 downward, as shown by an arrow AR3, to establish substantially the same positional relation between the tape guide drum 10 and the guide rollers 13 and 14 as that in the unadjusted VTR I.

As mentioned above, in the interchange reproduction of the magnetic tape whose tracks are curved, noise is generated on a reproduced image, while in the self-record/reproduction, a flat envelope of waveform of an FM reproduced video signal is produced even when the tracks are curved greatly. The same is true for unadjusted VTRs II to VIII, as discussed below, and explanation thereof in detail will be omitted.

Unadjusted VTR II

Figure 4C:
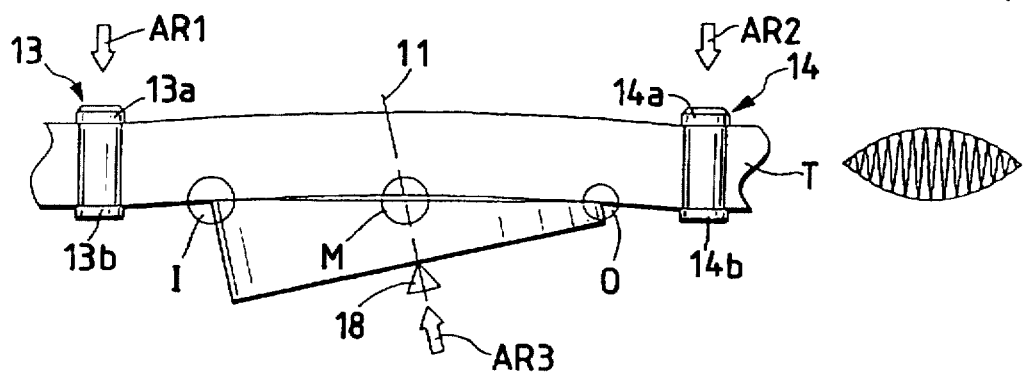

FIG. 4(C) shows an unadjusted VTR II in which the entrance guide roller 13 and the exit guide roller 14 are, as different from the one shown in FIG. 4(B), lowered slightly relative to the tape guide drum 10 by substantially the same distance in directions, as shown by arrows AR1 and AR2. The magnetic tape T is, thus, urged at the upper edge Ta downward by the upper flanges 13a and 14a of the guide rollers 13 and 14 during traveling, so that it is pressed against the lead 12 at the tape-entering position I and the tape-leaving position O while being lifted up from the lead 12 at a central position M (i.e., at an angular position of about 90° in FIG. 3). This will cause curved tracks to be formed on the magnetic tape T during recording. When the magnetic tape T whose tracks are curved to the extent corresponding to one track width in a range of one field is reproduced by the adjusted VTR, an FM reproduced waveform, as shown in FIG. 4(c), whose amplitude is maximized at the center and minimized at both ends or an FM reproduced waveform (not shown) whose amplitude is maximized at both ends and minimized at the center according to the positional relation between magnetic heads and the curved tracks is obtained. Noise will be undesirably generated on upper and lower portions or a central portion of a reproduced image.

The magnetic recording/reproducing apparatus according to the present invention is designed so as to transport the magnetic tape T, on which video signals are recorded by the unadjusted VTR II, along substantially the same traveling path as that in the unadjusted VTR II by shifting the tape guide drum 10 upward, as shown by an arrow AR3, to establish substantially the same positional relation between the tape guide drum 10 and the guide rollers 13 and 14 as that in the unadjusted VTR II.

Unadjusted VTR III

FIG. 4(D) shows an unadjusted VTR III in which the entrance guide roller 13 is shifted upward, as shown by the arrow AR1, while the exit guide roller 14 is shifted downward, as shown by the arrow AR2, relative to the tape guide drum 10. The magnetic tape T is, thus, lifted up at the lower edge Th by the lower flange 13b of the entrance guide roller 13 and urged downward at the upper edge Ta by the upper flange 14a of the exit guide roller 14 during traveling, so that it is lifted up from the lead 12 at the tape-entering position I while being urged against the lead 12 at the tape-leaving position O. This will cause curved tracks to be formed on the magnetic tape T during recording. When the magnetic tape T whose tracks are curved to the extent corresponding to one track width in a range of one field is reproduced by the adjusted VTR, an FM reproduced waveform, as shown in FIG. 4(d), whose amplitude is maximized at the center and minimized at positions slightly shifted from both ends to the center is obtained, so that noise will be undesirably generated on upper and lower portions of a reproduced image.

The magnetic recording/reproducing apparatus according to the present invention is designed so as to transport the magnetic tape T, on which video signals are recorded by the unadjusted VTR III, along substantially the same traveling path as that in the unadjusted VTR III by turning the tape guide drum 10 counterclockwise, as shown by an arrow AR4, around a pivot 18, to establish substantially the same positional relation between the tape guide drum 10 and the guide rollers 13 and 14 as that in the unadjusted VTR III.

It is advisable that the pivot 18 be provided on a line extending parallel to the line L1 shown in FIG. 3 and perpendicular to the drum shaft 11, however; the orientation of the pivot 18 is not limited to the same. Other modifications may be used with the present invention, as will be discussed later in detail.

Unadjusted VTR IV

FIG. 4(E) shows an unadjusted VTR IV in which the entrance guide roller 13 is, in contrast with the unadjusted VTR III, shifted downward, as shown by the arrow AR1, while the exit guide roller 14 is shifted upward, as shown by the arrow AR2. The magnetic tape T is, thus, urged downward at the upper edge Ta by the upper flange 13a of the entrance guide roller 13 and lifted upward at the lower edge Tb by the lower flange 14b of the exit guide roller 14 during traveling, so that it is urged against the lead 12 at the tape-entering position I while being separated from the lead 12 at the tape-leaving position O. This will cause curved tracks to be formed on the magnetic tape T during recording. When the magnetic tape T whose tracks are curved to the extent corresponding to one track width in a range of one field is reproduced by the adjusted VTR, a gourd-shaped FM waveform, as shown in FIG. 4(e), whose amplitude is decreased at the center is obtained, so that noise will be undesirably generated on upper and lower portions of a reproduced image.

The magnetic recording/reproducing apparatus according to the present invention is designed so as to transport the magnetic tape T, on which video signals are recorded by the unadjusted VTR IV, along substantially the same traveling path as that in the unadjusted VTR IV by turning the tape guide drum 10 clockwise, as shown by an arrow AR4, around the pivot 18, to establish substantially the same positional relation between the tape guide drum 10 and the guide rollers 13 and 14 as that in the unadjusted VTR IV.

Unadjusted VTR V

FIG. 4(F) shows an unadjusted VTR V in which the entrance guide roller 13 and the exit guide roller 14 are both shifted upward in a ratio of 2:1. The magnetic tape T is, thus, lifted up at the lower edge Tb by the lower flange 13b of the entrance guide roller 13 and the lower flange 14b of the exit guide roller 14 during traveling, so that it is separated from the lead 12 while being inclined to the lead 12 throughout a range in which the magnetic tape T is wrapped about the tape guide drum 10 (i.e., from the tape-entering position I to the tape-leaving position O). This will cause curved tracks to be formed on the magnetic tape T during recording. When the magnetic tape T whose tracks are curved to the extent corresponding to one track width in a range of one field is reproduced by the adjusted VTR, an FM reproduced waveform whose amplitude is, as shown in FIG. 4(f), decreased partially is obtained, so that noise will be undesirably generated on an upper portion of a reproduced image.

The magnetic recording/reproducing apparatus according to the present invention is designed so as to transport the magnetic tape T, on which video signals are recorded by the unadjusted VTR V, along substantially the same traveling path as that in the unadjusted VTR V by turning the tape guide drum 10 counterclockwise, as shown by the arrow AR4, around the pivot 18 and shifting it downward, as shown by the arrow AR3, to establish substantially the same positional relation between the tape guide drum 10 and the guide rollers 13 and 14 as that in the unadjusted VTR V.

Unadjusted VTR VI

Figure 4G:
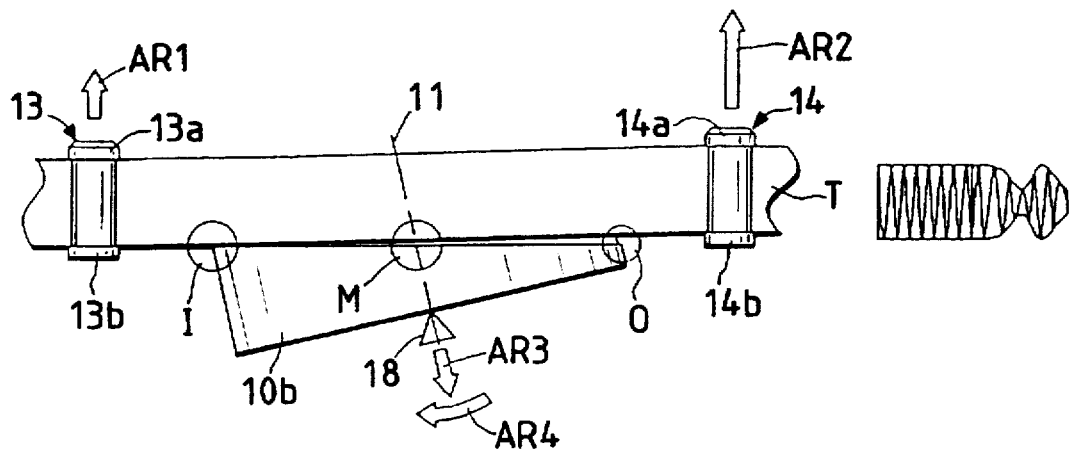

FIG. 4(G) shows an unadjusted VTR VI in which the entrance guide roller 13 and the exit guide roller 14 are both shifted upward in a ratio of 1:2. The magnetic tape T is, thus, lifted up at the lower edge Tb by the lower flange 13b of the entrance guide roller 13 and the lower flange 14b of the exit guide roller 14 during traveling, so that it is separated from the lead 12 throughout a range in which the magnetic tape T is wrapped about the tape guide drum 10 (i.e., from the tape-entering position I to the tape-leaving position O), while being inclined to the lead 12 in a direction opposite that in the unadjusted VTR V shown in FIG. 4(F). This will cause curved tracks to be formed on the magnetic tape T during recording. When the magnetic tape T whose tracks are curved to the extent corresponding to one track width in a range of one field is reproduced by the adjusted VTR, an FM reproduced waveform whose amplitude is, as shown in FIG. 4(g), decreased partially is obtained, so that noise will be undesirably generated on a lower portion of a reproduced image.

The magnetic recording/reproducing apparatus according to the present invention is designed so as to transport the magnetic tape T, on which video signals are recorded by the unadjusted VTR VI, along substantially the same traveling path as that in the unadjusted VTR VI by turning the tape guide drum 10 clockwise, as shown by the arrow AR4, around the pivot 18 and shifting it downward, as shown by the arrow AR3, to establish substantially the same positional relation between the tape guide drum 10 and the guide rollers 13 and 14 as that in the unadjusted VTR VI.

Unadjusted VTR VII

Figure 4H:
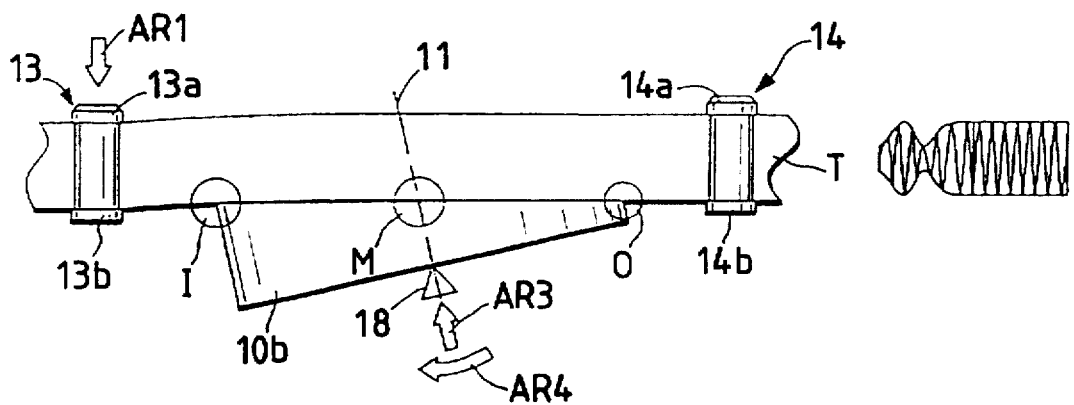

FIG. 4(H) shows an unadjusted VTR VII in which the entrance guide roller 13 is shifted downward, while the exit guide roller 14 is adjusted correctly. The magnetic tape T is, thus, urged at the upper edge Ta downward by the upper flange 13a of the entrance guide roller 13 during traveling, so that the upper edge Ta is pressed against the lead 12 at the tape-entering position I. This will cause curved tracks to be formed on the magnetic tape T during recording. When the magnetic tape T whose tracks are curved to the extent corresponding to one track width in a range of one field is reproduced by the adjusted VTR, an FM reproduced waveform, as shown in FIG. 4(h), whose amplitude is decreased partially, so that noise will be generated at an upper portion of a reproduced image.

The magnetic recording/reproducing apparatus according to the present invention is designed so as to transport the magnetic tape T, on which video signals are recorded by the unadjusted VTR VII, along substantially the same traveling path as that in the unadjusted VTR VII by turning the tape guide drum 10 clockwise, as shown by the arrow AR4, around the pivot 18 and shifting it upward, as shown by the arrow AR3, to establish substantially the same positional relation between the tape guide drum 10 and the guide rollers 13 and 14 as that in the unadjusted VTR VII.

Unadjusted VTR VIII

Figure 4I:
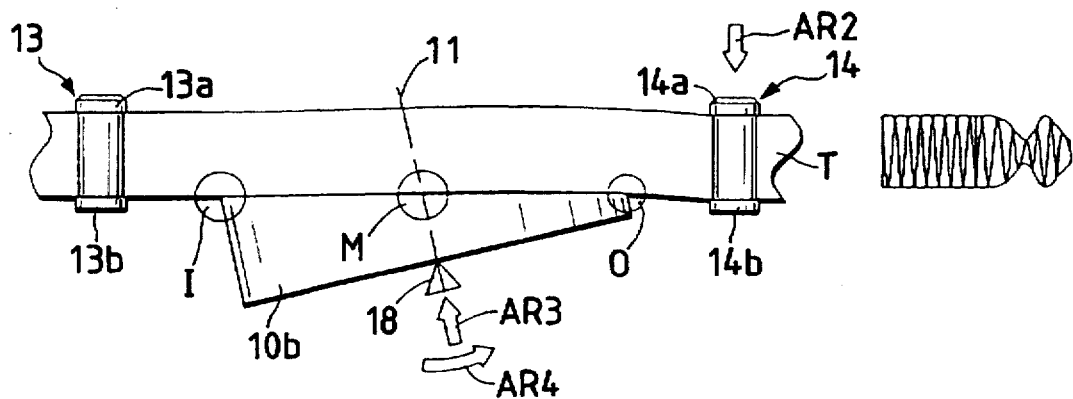

FIG. 4(I) shows an unadjusted VTR VIII in which the exit guide roller 14 is shifted downward, while the entrance guide roller 13 is adjusted in height correctly. The magnetic tape T is, thus, urged at the upper edge Ta downward by the upper flange 14a of the exit guide roller 14 during traveling, so that the upper edge Ta is pressed against the lead 12 at the tape-leaving position O. This will cause curved tracks to be formed on the magnetic tape T during recording. When the magnetic tape T whose tracks are curved to the extent corresponding to one track width in a range of one field is reproduced by the adjusted VTR, an FM reproduced waveform, as shown in FIG. 4(*i*), whose amplitude is decreased partially, so that noise will be generated at a lower portion of a reproduced image.

The magnetic recording/reproducing apparatus according to the present invention is designed so as to transport the magnetic tape T, on which video signals are recorded by the unadjusted VTR VIII, along substantially the same traveling path as that in the unadjusted VTR VIII by turning the tape guide drum 10 counterclockwise, as shown by the arrow AR4, around the pivot 18 and shifting it upward, as shown by the arrow AR3, to establish substantially the same positional relation between the tape guide drum 10 and the guide rollers 13 and 14 as that in the unadjusted VTR VIII.

As explained above, when the magnetic tape T on which the curved tracks are formed during recording of video signals for some reason in an unadjusted VTR, is reproduced in the magnetic recording/reproducing apparatus of the invention, substantially the same traveling path of the magnetic tape T as that in the unadjusted VTR is established by controlling the position of the tape guide drum 10 to modify the positional relation between the tape guide drum 10 and the guide rollers 13 and 14 to agree with that in the unadjusted VTR.

All possible failures of height adjustment of the guide rollers 13 and 14 are discussed so far. The results of the research by the inventors of this application, however, show that the guide rollers 13 and 14 are hardly shifted below a set height, but, in most cases, they are shifted above the set height. Even if the guide rollers are shifted below the set height, the degree of the height shift is relatively small. The reason for this is that height adjustment of the guide rollers 13 and 14 in a VTR assembly process is usually accomplished by running a video signal-recorded test tape whose tracks are essentially straight to monitor the waveform of FM reproduced video signals, and then screwing the guide rollers 13 and 14 into the post bases 15 and 16 so as to remove fluctuations in the waveform of the FM reproduced video signals. Thus, if the guide roller 14 is adjusted below the set height, the test tape is pressed by the lead 12 and the upper flange 14a of the guide roller 14, so that it is deformed, causing the waveform of the FM reproduced video signals to fluctuate. This allows an adjustment operator to easily perceive the fact that the guide roller 14 is shifted below the set height. Conversely, if the guide roller 14 is shifted above the set height, the waveform of FM reproduced video signals is hardly changed even though a lower edge of the test tape is lifted up by the lower flange 14b of the guide roller 14. It is, thus, difficult for the adjustment operator to perceive the fact that the guide roller 14 is shifted above the set height.

Accordingly, automatic positioning control of the tape guide drum 10 during reproducing of a magnetic tape recorded by an unadjusted VTR is accomplished by rotating the tape guide drum 10 around the pivot 18 within a given angular range and shifting it vertically along the drum shaft 11 so that a waveform of FM reproduced video signals may become flat. Alternatively, relations between different types of curved tracks and waveforms of FM video signals produced from the curved tracks (e.g., the waveforms shown in FIGS. 4(*a*) to 4(*i*)) by an adjusted VTR may be determined in advance and then compared with waveforms of FM video signals reproduced by the recording/reproducing apparatus of the invention wherein the tape guide drum 10 is inclined, as shown in FIG. 2, to the vertical line Z at the angle φ, for determining angular and vertical positions of the tape guide drum 10 to be corrected under the positioning control.

Figure 5A:
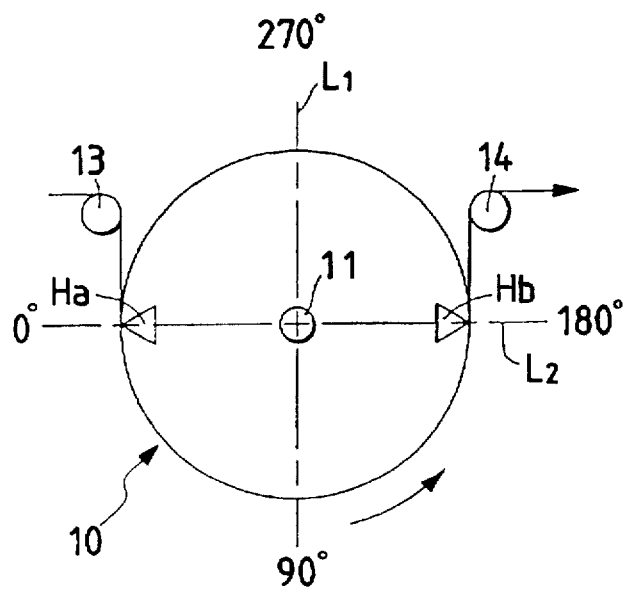
FIG. 5(a) is a plan view which shows a tape guide head drum according to a first embodiment of the present invention.
Figure 5C:
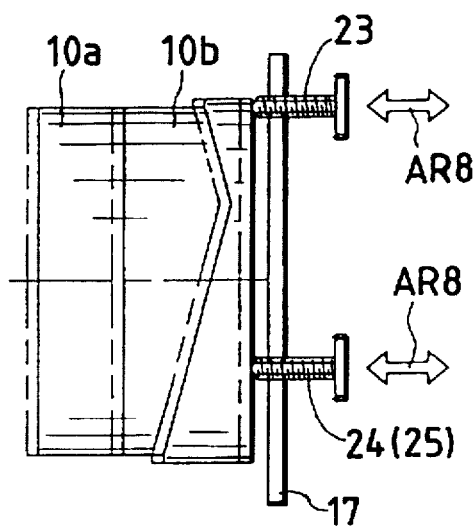
FIG. 5(c) is a side view of FIG. 5(a)

Hereinbelow, a first embodiment of the present invention will be discussed with reference to FIGS. 5(*a*) to 13. FIGS. 5(*a*) to 5(*c*) are drafted according to the third angle system.

A magnetic recording/reproducing apparatus according to the first embodiment includes a tape guide drum 10 consisting of an upper drum 10a and a lower drum 10b. The tape guide drum 10 is mounted on a chassis 190 through a drum base 17 and inclined at an angle of φ relative to the chassis 190 (i.e., the center line C of a magnetic tape T extending in a tape traveling direction).

In a reproducing mode of the magnetic recording/reproducing apparatus, first positioning control and second positioning control are performed. The first positioning control is, as shown in FIG. 5(*b*), accomplished by turning the tape guide drum 10 around a line L3 defined by a pivot 18 provided between the bottom of the lower drum 10b and the drum base 17, extending perpendicular to the drawing and parallel to a line L1 passing through a drum shaft 11 in a direction to divide an area of the magnetic tape T wrapped about the tape guide drum 10 into two equal sections. The second positioning control is, as shown in FIG. 5(*c*), accomplished by moving the tape guide drum 10 vertically along the drum shaft 11.

The magnetic recording/reproducing apparatus further includes a spring 21 and actuators 22, 23, 24, and 25. The spring 21 is arranged between the lower drum 10b and the drum base 17 at a location away from the pivot 18 by a given distance in a direction of 0° to urge the tape guide drum 10 in a counterclockwise direction around the pivot 18. The actuator 22 is mounted in the drum base 17 outside the spring 21 and is designed to be displaceable vertically, as shown by an arrow AR5. When the actuator 22 moves upward, it will cause the tape guide drum 10 to be rotated clockwise, as shown by an arrow AR6, against a spring force of the spring 21. Conversely, when the actuator 22 moves downward, it will cause the tape guide drum 10 to be rotated counterclockwise, as shown by an arrow AR7, with the aide of the spring force of the spring. This achieves the first positioning control.

The actuators 23, 24, and 25 are, as shown in FIG. 5(*c*), disposed in the drum base 17 so as to be moved vertically at the same time, as shown by an arrow AR8. When the actuator 23, 24, and 25 are moved upward, the tape guide drum 10 is lifted upward substantially along the drum shaft 11. Conversely, when the actuators 23, 24, and 25 are moved downward, the tape guide drum 10 is lowered substantially along the drum shaft 11. This achieves the second positioning control.

Figure 5B:
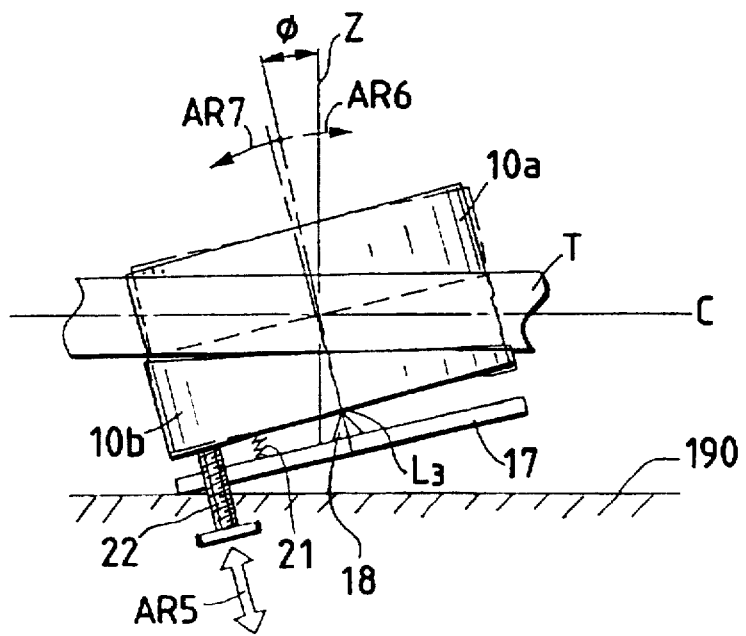
FIG. 5(b) is a front view of FIG. 5(a)
Figure 6:
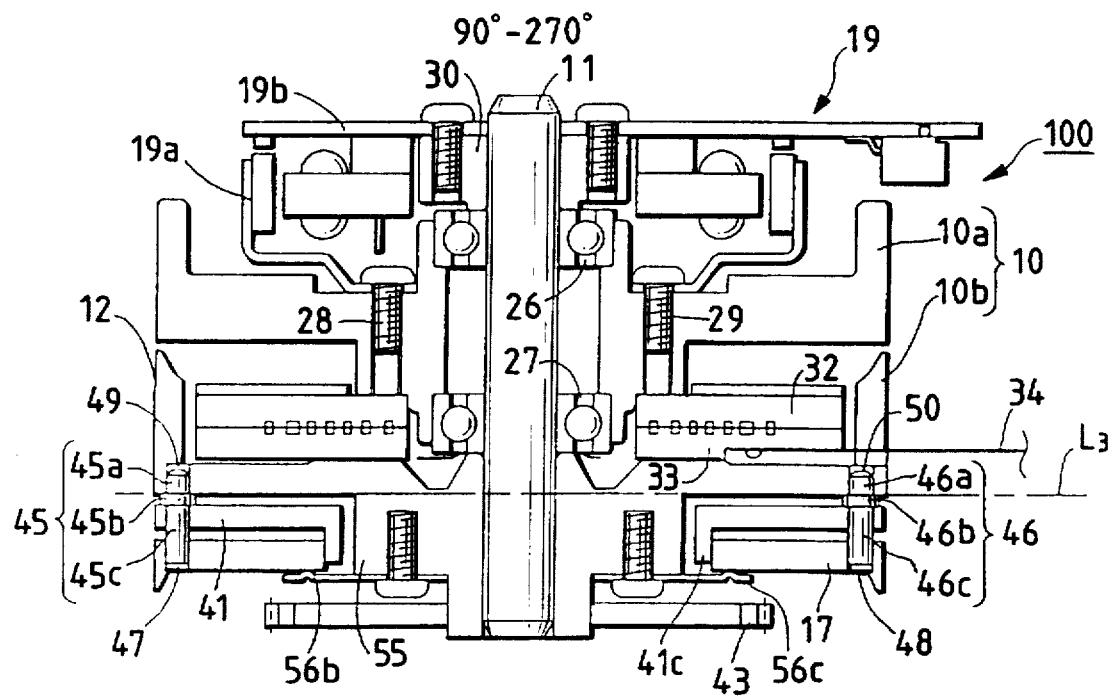
FIG. 6 is a 90°–270° cross sectional view showing a head drum assembly according to the first embodiment.
Figure 7:
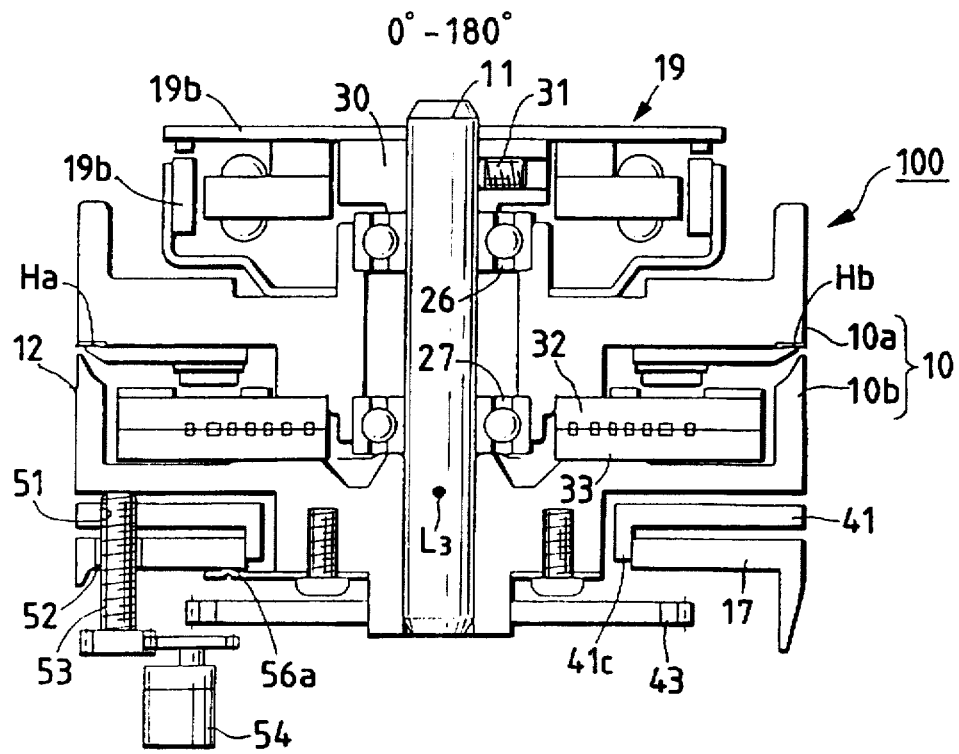
FIG. 7 is a 0°–180° cross sectional view showing the head drum assembly in FIG. 6.
Figure 8:
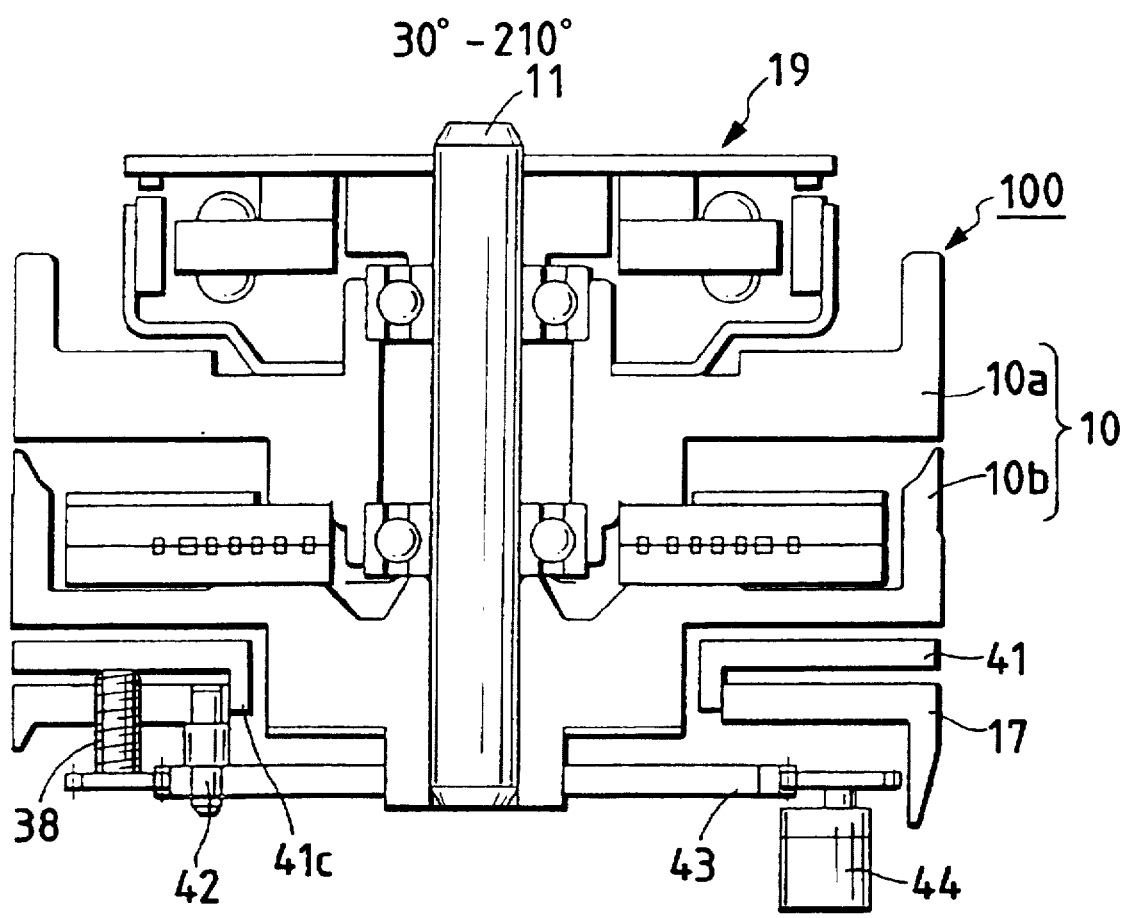
FIG. 8 is a 30°–210° cross sectional view showing the head drum assembly in FIG. 6.
Figure 9:
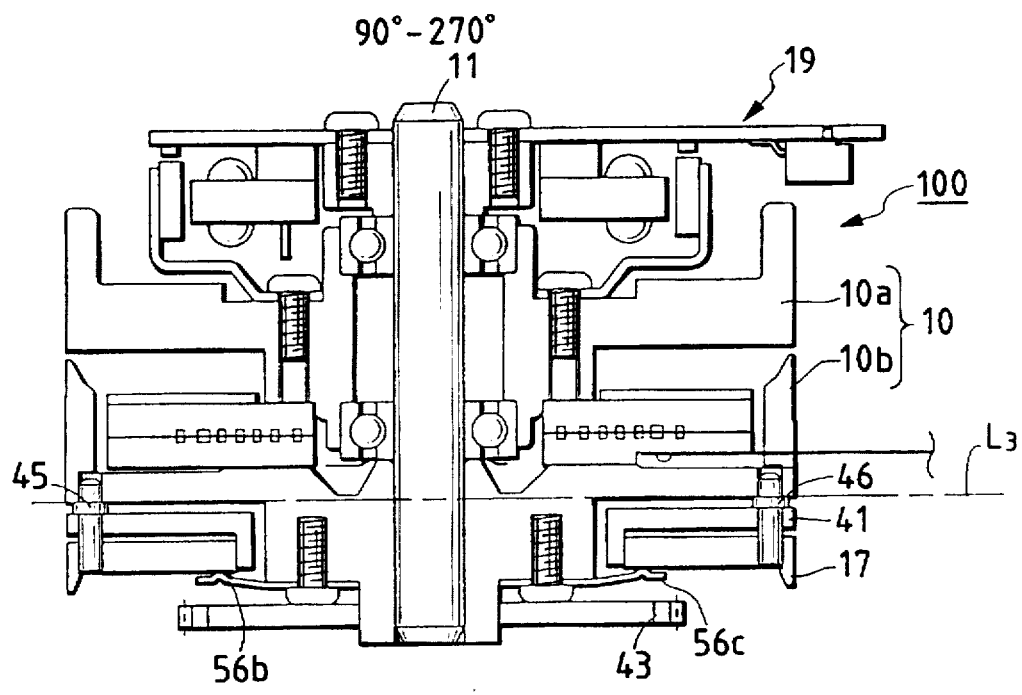
FIG. 9 is a 90°–270° cross sectional view showing the head drum in FIG. 6 under a second positioning control.
Figure 10:
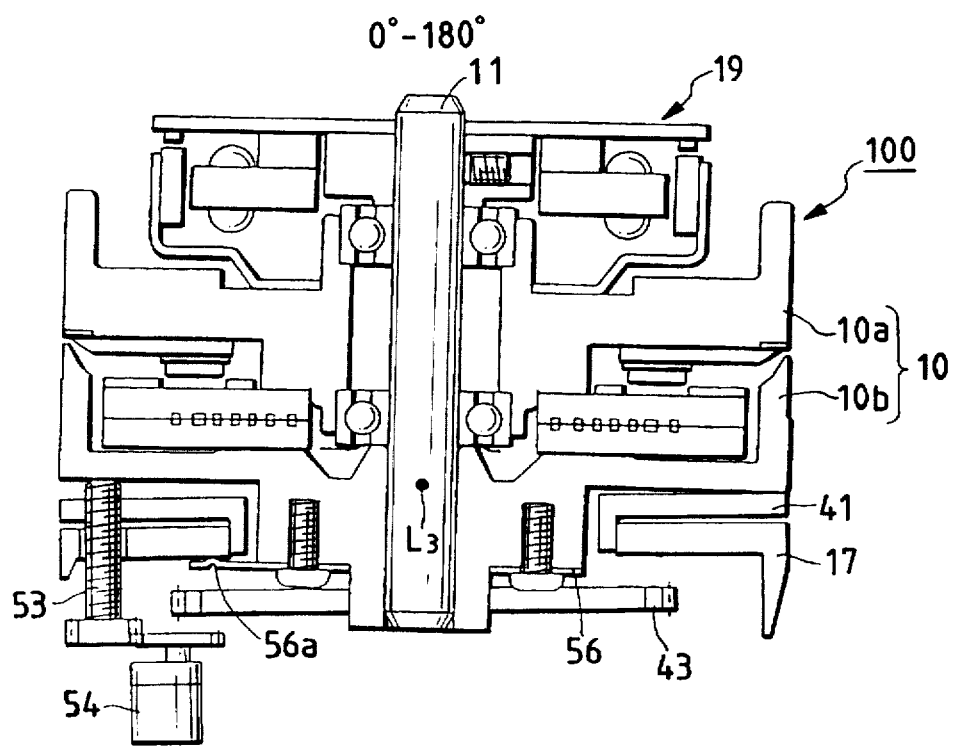
FIG. 10 is a 0°–180° cross sectional view showing the head drum in FIG. 6 under a first positioning control.
Figure 11:
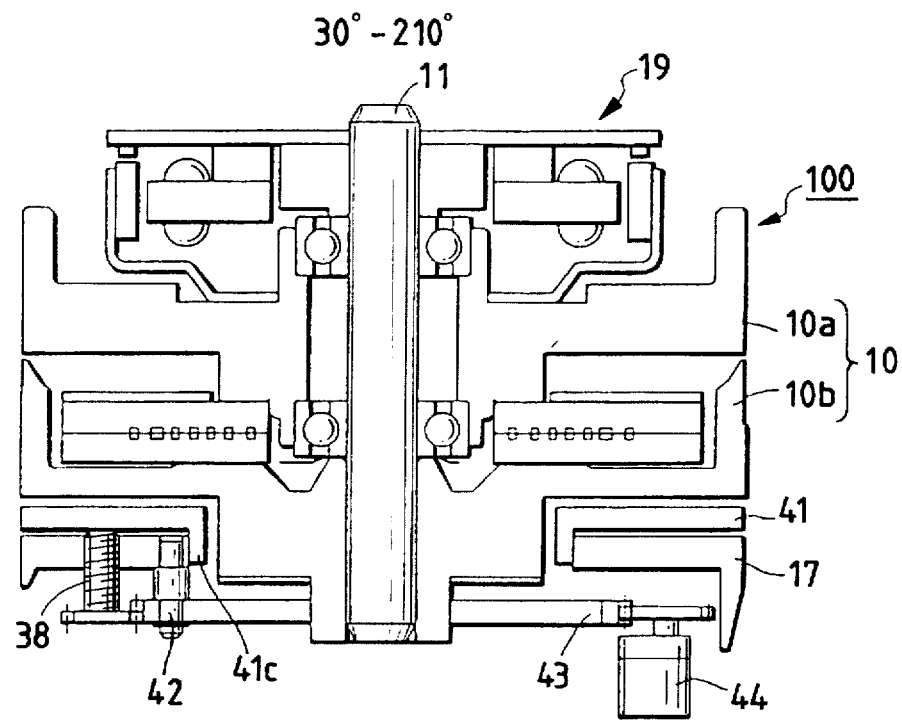
FIG. 11 is a 30°–210° cross sectional view showing the head drum in FIG. 6 under a second positioning control.
Figure 12:
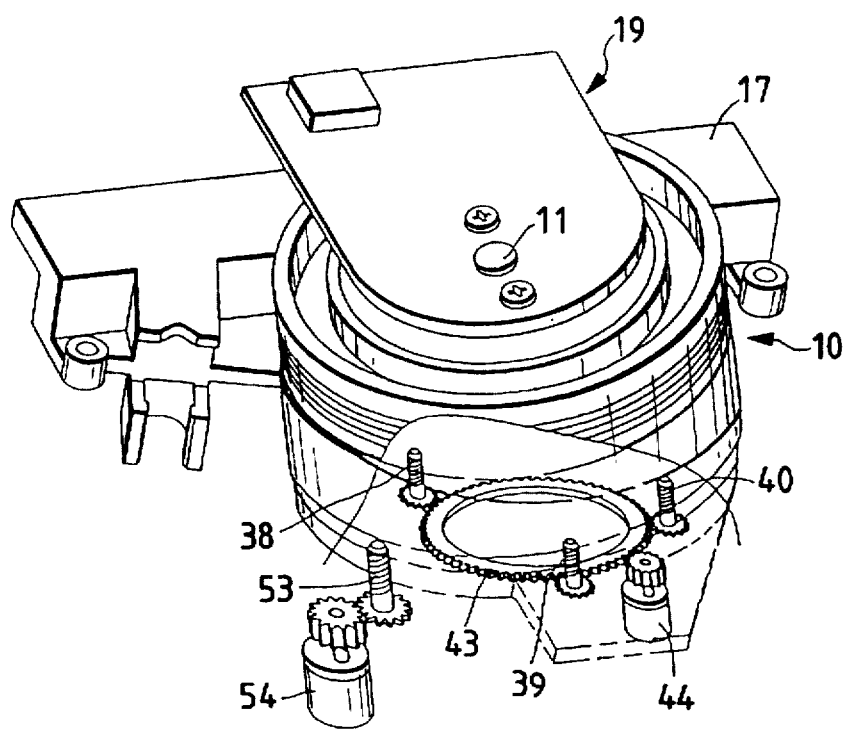
FIG. 12 is a perspective view showing a head drum assembly according to the first embodiment.

FIGS. 6, 7, and 8 show a structure of a head drum assembly 100. FIG. 6 is a cross sectional view taken along the line L1, as shown in FIG. 5(*a*), extending through the drum shaft 11 in a direction from 90° to 270°. FIG. 7 is a cross sectional view taken along the line L2, as shown FIG. 5(*a*), extending through the drum shaft 11 in a direction from 0° to 180°. FIG. 8 is a cross sectional view taken along a line extending through the drum shaft 11 in a direction from 30° to 210°. FIGS. 9 to 11 show the head drum assembly 100 under the first and second positioning control.

The head drum assembly 100 generally includes the tape guide drum 10 consisting of the upper and lower drums 10a and 10b and a drum motor 19.

The lower drum 10b has formed thereon a magnetic tape-wrapped surface and a lead 12 and is supported by the drum shaft 11 with an interference fit. The upper drum 10a is rotatably supported by the drum shaft 11 through bearings 26 and 27. Magnetic heads Ha and Hb are, as shown in FIG. 7, mounted on the upper drum 10a in a diametrically opposed relation. The drum motor 19 includes a rotor 19a and a stator 19b. The rotor 19a is installed on the upper drum 10a using screws 28 and 29. The stator 19b is secured on the drum shaft 11 by a set screw 31 through a collar 30.

The head drum assembly 100 also includes a rotatable transformer 32 and a stationary transformer 33. The rotatable transformer 32 is secured on the upper drum 10a, while the stationary transformer 33 is fixed on the lower drum 10b for achieving transmission of signals between transformers 32 and 33. Lead wires 34 (only one is shown for the brevity of illustration) extend from the stationary transformer 33.

Figure 13:
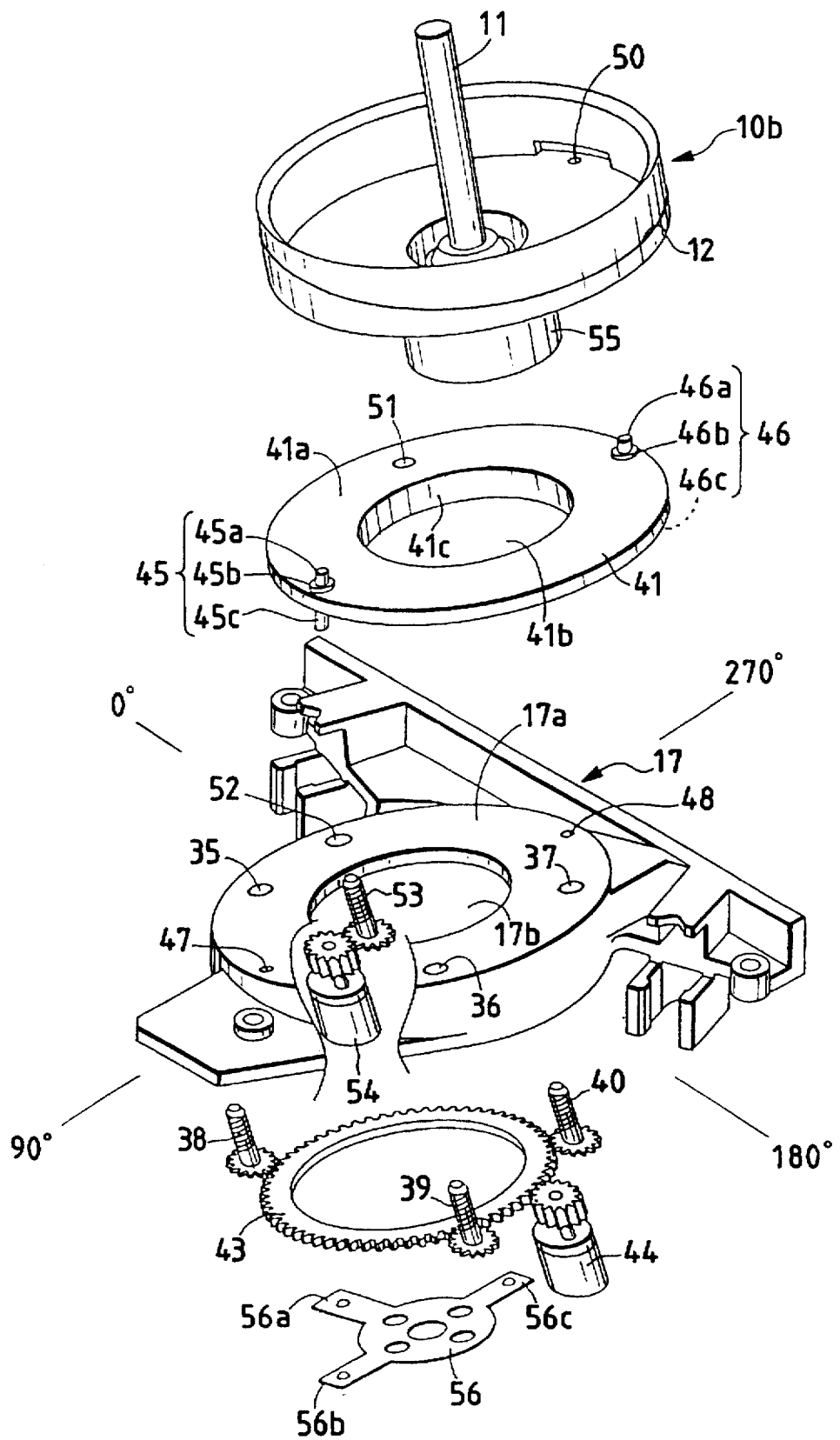
FIG. 13 is an exploded view showing the head drum assembly in FIG. 12.

The head drum assembly 100 thus constructed is mounted on the drum base 17 through a ring-shaped sub-base 41. The drum base 17, as shown in FIG. 13, has formed in its upper surface 17a three threaded holes 35, 36, and 37. The upper surface 17a serves as a reference surface for supporting the tape guide drum 10 at the angle of $\phi$ with respect to the line Z, as shown in FIG. 5(b) (extending perpendicular to the center line C of the magnetic tape T) Screws with gears 38, 39, and 40 engage the threaded holes 35, 36, and 37, respectively, and project from the upper surface 17a of the drum base 17 to bear the sub-base 41 at three support points. A plurality of studs 42 are, as shown in FIG. 8, secured in the bottom of the drum base 17 to retain a ring gear 43 rotatably. The ring gear 43 is, as clearly shown in FIG. 13, in mesh with the gears of the screws 38, 39, and 40 and a pinion of an electric motor 44. Therefore, turning on the motor 44 causes the ring gear 43 to rotate, thereby moving the three screws 38, 39, and 40 simultaneously in a vertical direction. The screws 38, 39, and 40 correspond to the actuators 23, 24, and 25, as discussed in FIG. 5(c).

Support pins 45 and 46 are, as shown in FIG. 13, press-fitted into the sub-base 41 at angular positions of 90° and 270°. The support pins 45 and 46 include upper shafts 45a and 46a, spacers 45b and 46b, and lower shafts 45c and 46c, respectively. The lower shafts 45c and 46c are inserted into the sub-base 41 until the spacers 45b and 46b contact the upper surface 41a, and slidably engage through holes 47 and 48 formed in the drum base 17 at angular positions of 90° and 270° for orienting rotation of the sub-base 41. The sub-base 41, as can be seen in FIG. 13, has an inner circular wall 41c defining an opening 41b at the center thereof. The inner circular wall 41, as shown in FIG. 11, partially projects downward to engage an inner wall 17b of the drum base 17.

The lower drum 10b has, as shown in FIGS. 6 and 13, holes 49 and 50 formed in its bottom at the angular positions of 90° and 270°. Into the holes 49 and 50, the upper shafts 45a and 46a of the support pins 45 and 46 are inserted to define an axis of rotation around the line L3 extending through the upper shafts 45a and 46a. Specifically, the upper shafts 45a and 46a of the support pins 45 and 46 are inserted into the holes 49 and 50 with given gaps or plays, respectively, and the upper drum 10b is arranged above the sub-base 41 with a given gap corresponding to the thickness of the spacers 45b and 46b, thereby allowing the head drum assembly 100 to swing around the line L3.

The sub-base 41 has formed therein a threaded hole 51 at the angular position of 0°. A screw with a gear 53 engages the threaded hole 51 through a through hole 52 formed in the drum base 17. The gear of the screw 53 is in mesh with a pinion of an electric motor 54 for vertical movement according to rotation of the motor 54. The screw 53 corresponds to the actuator 22 shown in FIG. 5(b).

The lower drum 10b has formed on its bottom a boss 55 which is inserted into the central opening 41b of the sub-base 41. A plate spring 56 is, as shown in FIG. 9, secured on the bottom of the lower drum 10b using screws in engagement of arms 56a, 56b, and 56c with a lower surface of the drum base 17 to restrict upward movement of the head drum assembly 100, or to urge the head drum assembly 100 downward relative to the drum base 17. The plate spring 56, as can be seen in FIG. 13, includes the three arms 56a, 56b, and 56c arranged away from each other at angular intervals of 90°. Specifically, the arms 56b and 56c extend in the angular directions of 90° and 270° to urge the head drum assembly 100 downward, while the arm 56a extends in the angular direction of 0° to provide a spring force for urging the head drum assembly 100 to swing around the line L3. The arm 56a corresponds to the spring 21 shown in FIG. 5(b).

The first and second positioning control of the head drum assembly 100 (i.e., the tape guide drum 10) will be discussed with reference to FIGS. 9 to 11. FIG. 10 shows the tape guide drum 10 which has swung clockwise around the line L3 under the first positioning control. FIG. 9 shows the tape guide drum 10 which is shifted downward under the second positioning control.

The first positioning control to swing the tape guide drum 10 is accomplished by turning on the motor 54 to rotate the screw 53 so that it moves vertically in FIG. 10. Upward movement of the screw 53 causes the tape guide drum 10 to be urged in a counterclockwise direction against a spring force of the arm 56a of the plate spring 56, while downward movement of the screw 53 causes the tape guide drum 10 to be urged in a clockwise direction by the spring force of the arm 56a of the plate spring 56.

The second positioning control to move the tape guide drum 10 along the drum shaft 11 is accomplished by turning on the motor 44 to rotate the ring gear 43 to move the screws 38, 39, and 40 vertically. Downward movement of the screws 38, 39, and 40 causes the sub-base 41 to be moved downward by the spring force of the arms 56b and 56c of the plate spring 56 so that the tape guide drum 10 is moved downward, while upward movement of the screws 38, 39, and 40 causes the sub-base 41 to be lifted up against the spring force of the arms 56b and 56 of the plate spring 56 so that the tape guide drum 10 is moved upward.

Referring to FIGS. 14 to 20, there is shown a second embodiment of the magnetic recording/reproducing apparatus of the invention. The same reference number refer to the same parts as employed in the first embodiment.

In this embodiment, the first positioning control is, as shown in FIG. 14(b), accomplished by turning the tape guide drum 10 around the line L3 defined by the pivot 18 between the bottom of the lower drum 10b and the drum base 17, extending perpendicular to the drawing and parallel to the line L1 extending through the drum shaft 11 in a direction to divide an area of the magnetic tape T wrapped about the tape guide drum 10 into two equal sections. This positioning control is the same as in the first embodiment. The second positioning control is, as shown in FIG. 14(c), accomplished by turning the tape guide drum 10 around a line L4 defined by a pivot 57 between the drum base 17 and the lower drum 10b, extending perpendicular to the line L3.

The magnetic recording/reproducing apparatus includes springs 21 and 59, and actuators 22 and 58. The spring 21 is arranged between the lower drum 10b and the drum base 17 at a location away from the pivot 18 by a given distance in a direction of 0° to urge the tape guide drum 10 in a counterclockwise direction around the pivot 18. The actuator 22 is mounted in the drum base 17 outside the spring 21 and is designed to be displaceable vertically, as shown by the arrow AR5. Thus, when the actuator 22 moves upward, it will cause the tape guide drum 10 to be rotated clockwise, as shown by the arrow AR6, against a spring force of the spring 21. Conversely, when the actuator 22 moves downward, it will cause the tape guide drum 10 to be rotated counterclockwise, as shown by the arrow AR7, with the aide of the spring force of the spring. This achieves the first positioning control.

The spring 59 is, as shown in FIG. 14(c), disposed between the drum base 17 and the lower drum 10b at a location away from the center by a given distance in the direction of 270° to urge the tape guide drum 10 in a clockwise direction around the pivot 57. The actuator 58 is mounted in the drum base 17 outside the spring 21 and is designed to be displaceable vertically, as shown by the arrow AR5. Thus, when the actuator 58 moves upward, it will cause the tape guide drum 10 to be rotated counterclockwise, as shown by the arrow AR7, against a spring force of the spring 59. Conversely, when the actuator 58 moves downward, it will cause the tape guide drum 10 to be rotated clockwise, as shown by the arrow AR6, with the aide of the spring force of the spring 59. This achieves the second positioning control.

The turning of the tape guide drum 10 around the line L4 essentially changes the height of the tape guide drum 10 from the drum base 17. This arrangement, as different from the first embodiment, requires only two parts: the actuator 58 and the spring 59, resulting in a simplified structure.

The principle of the second positioning control and a location range of the pivot 57 will be explained in detail with reference to FIGS. 65(a) to 65(h) each showing the tape guide drum 10 and the exit guide roller 14, as viewed from the angular direction of 180°. Of these drawings, FIGS. 65(a) and 65(b) correspond to FIGS. 4(A) and 4(B), and FIGS. 65(c) to 65(h) illustrate an allowable location range of the pivot 57. As already explained, in case of failure of height adjustment, the guide rollers 13 and 14 are, in most cases, shifted above a set height. FIGS. 65(a) to 65(h), thus, show the interchange reproduction of the magnetic tape T under the second positioning control on which video signals are recorded by an unadjusted VTR wherein the guide rollers 13 and 14 are shifted above a given set height.

Figure 65A:
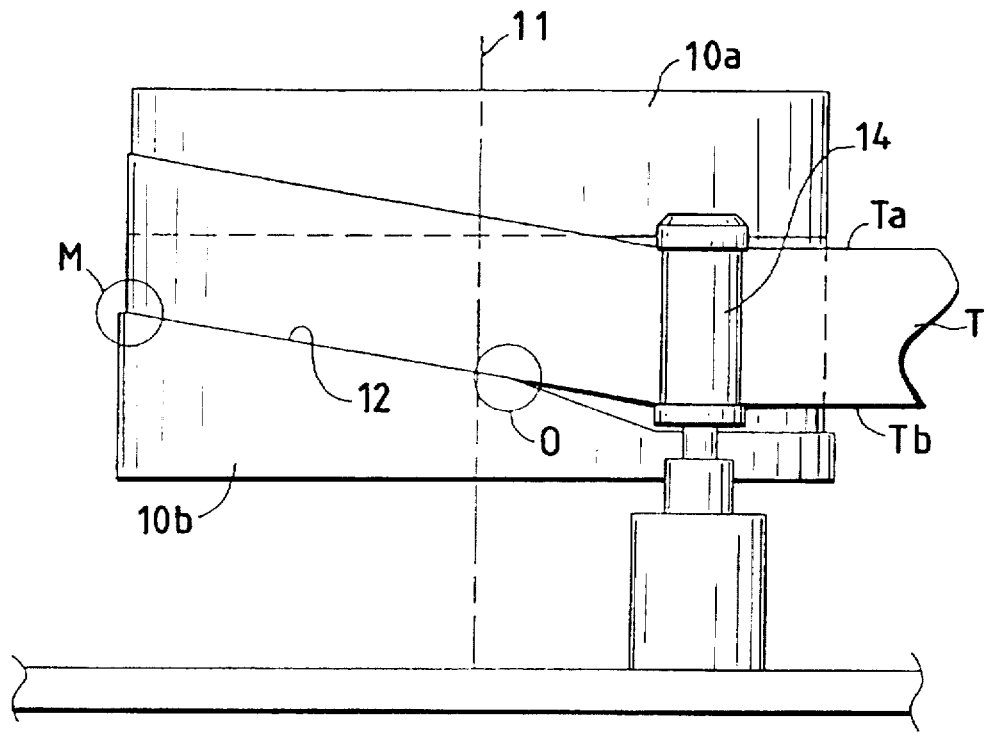
FIGS. 65(a) to 65(h) are 0°–180° cross sectional views showing the principle of a second positioning control and a location range of an axis of rotation of a head drum assembly.

FIG. 65(a), as explained above, corresponds to FIG. 4(A) and shows an adjusted VTR in which the guide rollers 13 and 14 are adjusted in height correctly. The magnetic tape T travels without deformation in a width-wise direction while the lower edge Tb is guided by the lead 12 and the upper edge Ta is guided by the upper flanges 13a and 14a of the guide rollers 13 and 14.

Figure 65B:
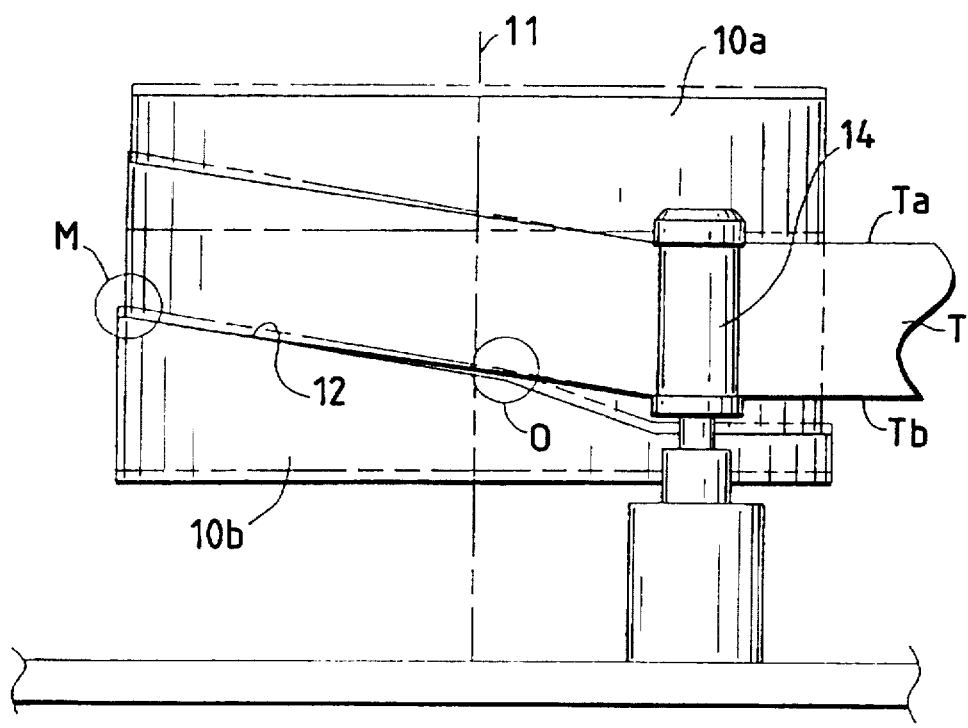

FIG. 65(b) corresponds to FIG. 4(B) and shows the second positioning control in which the tape guide drum 10 is shifted downward from a broken line to a solid line for achieving the interchange reproduction of the magnetic tape T on which video signals are recorded by the unadjusted VTR I in which the entrance guide roller 13 and the exit guide roller 14 are both shifted above a set height by the same distance. The magnetic tape T travels with the lower edge Th of the magnetic tape T being separated from the lead 12 at the tape-entering position I and the tape-leaving position O while engaging or being close to the lead 12 at the central position M. This is essentially equivalent to traveling of the magnetic tape T during the self-record/reproduction in the unadjusted VTR I.

Figure 65C:
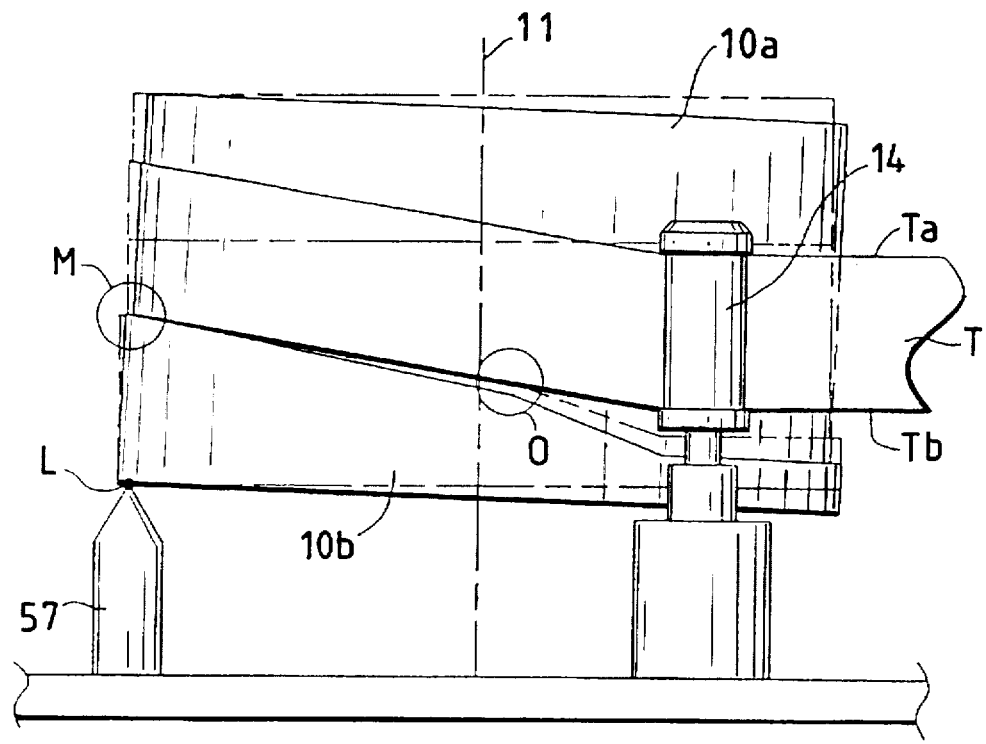

FIG. 65(c) shows one example of the second positioning control achieved by turning the tape guide drum 10 from a broken line to a solid line around a line L (perpendicular to the drawing) defined by the pivot 57 located at an angular position of 90° on the lower drum 10b. Since a portion of the lead 12 at the central position M of the magnetic tape T is located substantially above the pivot 57, the height thereof is hardly changed during the second positioning control. The lower edge Tb of the magnetic tape T at the central position M, thus, travels in engagement with the lead 12, while portions of the magnetic tape T (not shown) at the tape-entering position I and the tape-leaving position O away from the pivot 57 are both shifted downward. The lower edge Th of the magnetic tape T engage at the tape-leaving position O the lower flanges 13b and 14b of the guide rollers. 13 and 14, so that it travels in disengagement from the lead 12 near the tape-entering position I and the tape-leaving position O. This establishes substantially the same tape-traveling path as defined during the self-record/reproduction in the unadjusted VTR I.

Figure 65D:
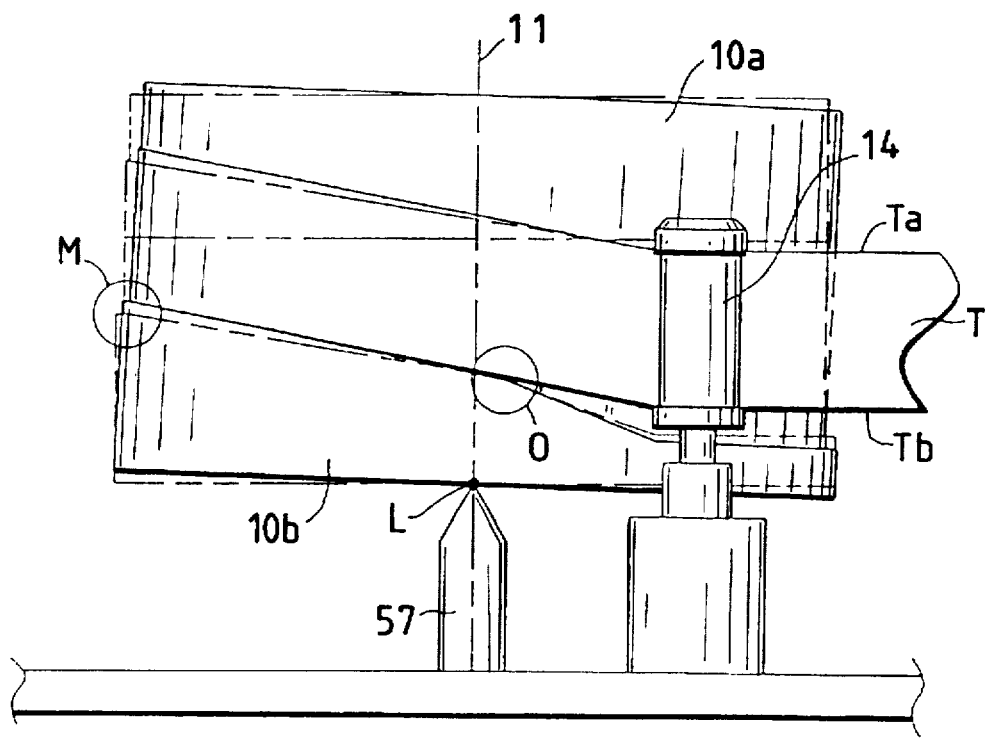

FIG. 65(d) shows an alternative example of the second positioning control achieved by turning the tape guide drum 10 clockwise from a broken line to a solid line around a line L (perpendicular to the drawing) defined by the pivot 57 located on a central portion of the bottom of the lower drum 10b. A portion of the lead 12 at the central position M of the magnetic tape T is shifted upward, so that the magnetic tape T travels in engagement of the lower edge Tb with that portion of the lead 12, while portions of the leads at the tape-entering position I and the tape-leaving position O are located substantially above the pivot 57, so that the heights thereof are hardly changed. Thus, the lower edge Th of the magnetic tape T near the tape-entering position I and the tape-leaving position O are separated from the lead 12. This establishes substantially the same tape-traveling path as defined during the self-reproduction in the unadjusted VTR I.

Figure 65E:
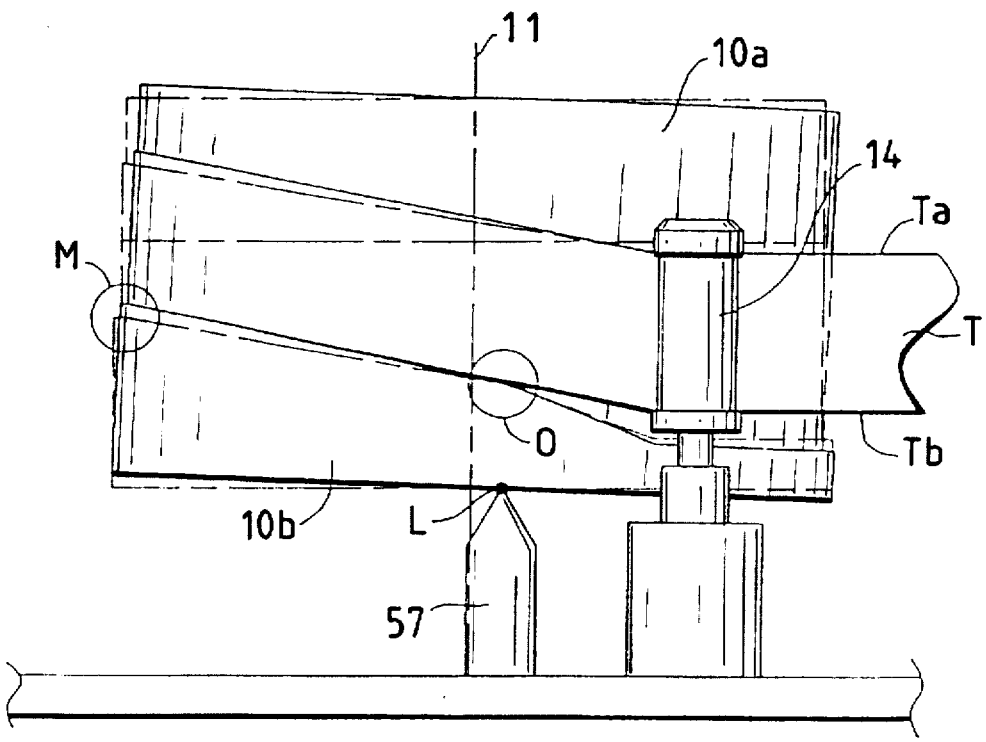

FIG. 65(e) shows a third example of the second positioning control achieved by turning the tape guide drum 10 clockwise from a broken line to a solid line around a line L (perpendicular to the drawing) defined by the pivot 57 located at a preselected interval away from the central portion of the bottom of the lower drum 10b toward the guide rollers 13 and 14. The magnetic tape T, similar to FIG. 65(d), travels in engagement of the lower edge Th with a portion of the lead 12 at the central position M, while the lower edge Tb near the tape-entering position I and the tape-leaving position O are separated from the lead 12. This, therefore, establishes substantially the same tape-traveling path as defined during the self-reproduction in the unadjusted VTR I.

Figure 65F:
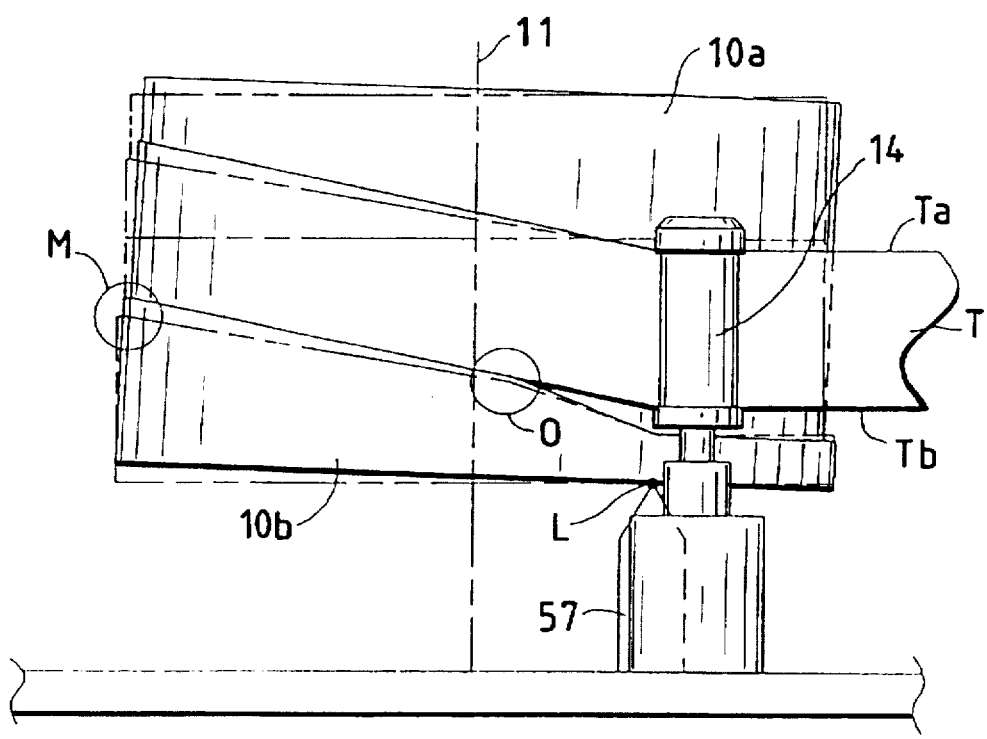
Figure 65G:
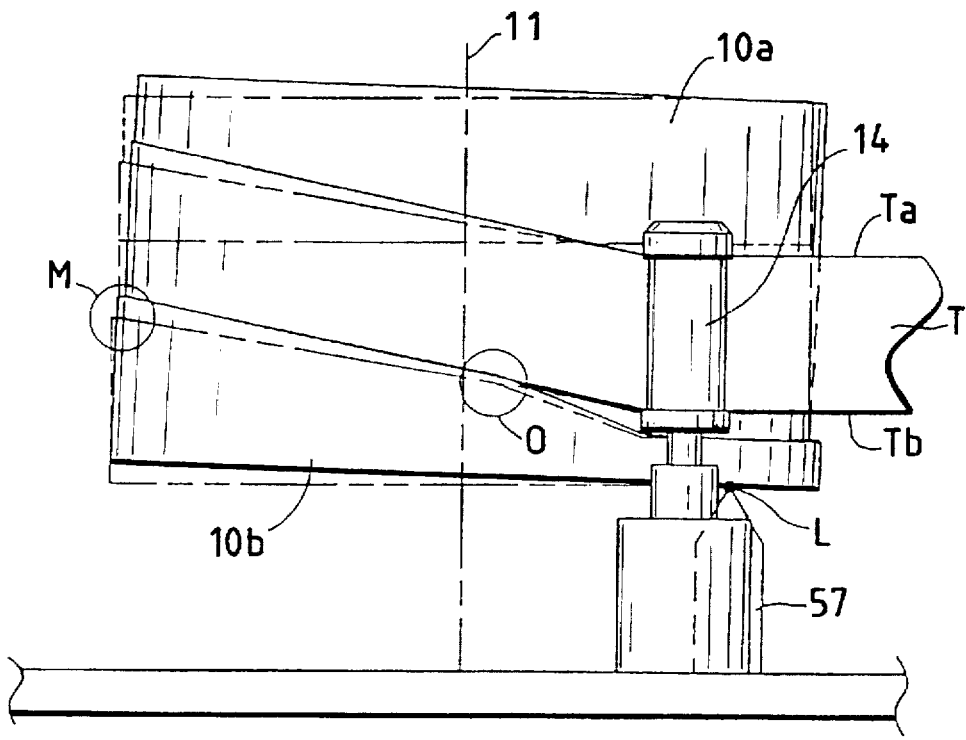
Figure 65H:
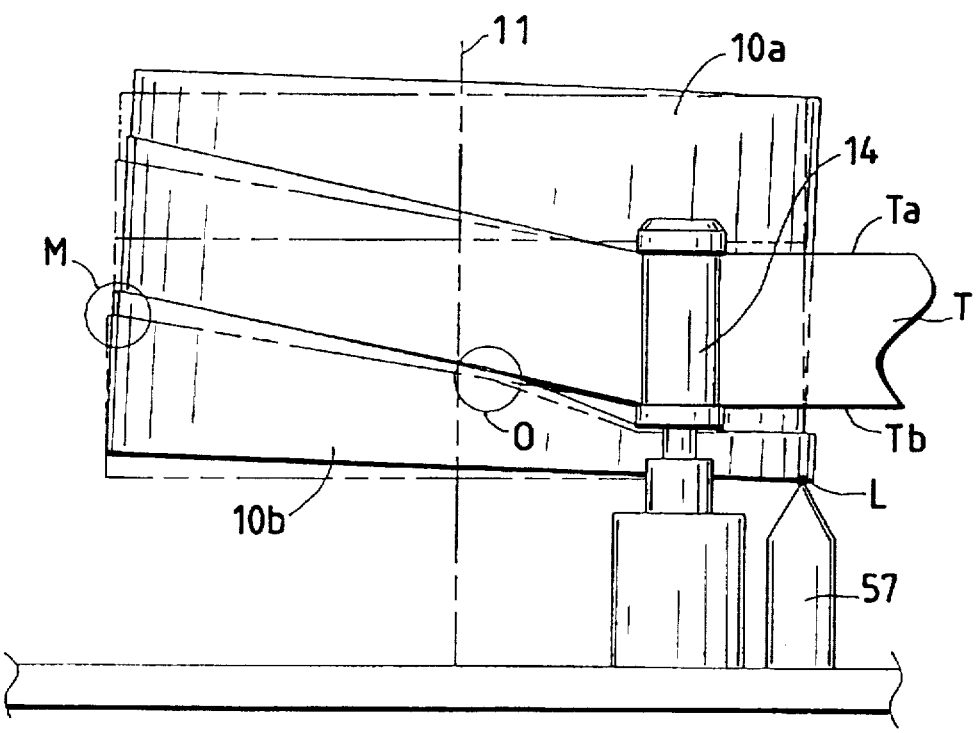

FIGS. 65(f), 65(g), and 65(h) show arrangements wherein the pivot 57 is further shifted to the right, as viewed in the drawings, from the location shown in FIG. 65(e). With these arrangements, the line L defined by the pivot 57 substantially coincides with a line passing through the guide rollers 13 and 14 or extends outside the guide rollers 13 and 14. Thus, portions of the lead 12 at the tape-entering position I, the central position M, and the tape-leaving position O engage the lower edge Tb of the magnetic tape T at all times during clockwise rotation of the guide tape head drum 10. This does not provide the same tape-traveling path as defined during the self-reproduction in the unadjusted VTR I.

It will, thus, be appreciated that the allowable location of the pivot 57 in the second positioning control may range from FIG. 65(c) to FIG. 65(e). Note that, if the tape guide drum 10 is arranged away from a line extending through the guide rollers 13 and 14, in other words, if the guide rollers 13 and 14 are arranged on the right side of the tape guide drum 10, as viewed in the drawings, the same tape-traveling path as defined during the self-record/reproduction in the unadjusted VTR I is also obtained in the positional relations between the pivot 57 and the guide rollers 13 and 14 shown in FIG. 65(f) to 65(h).

Figure 15:
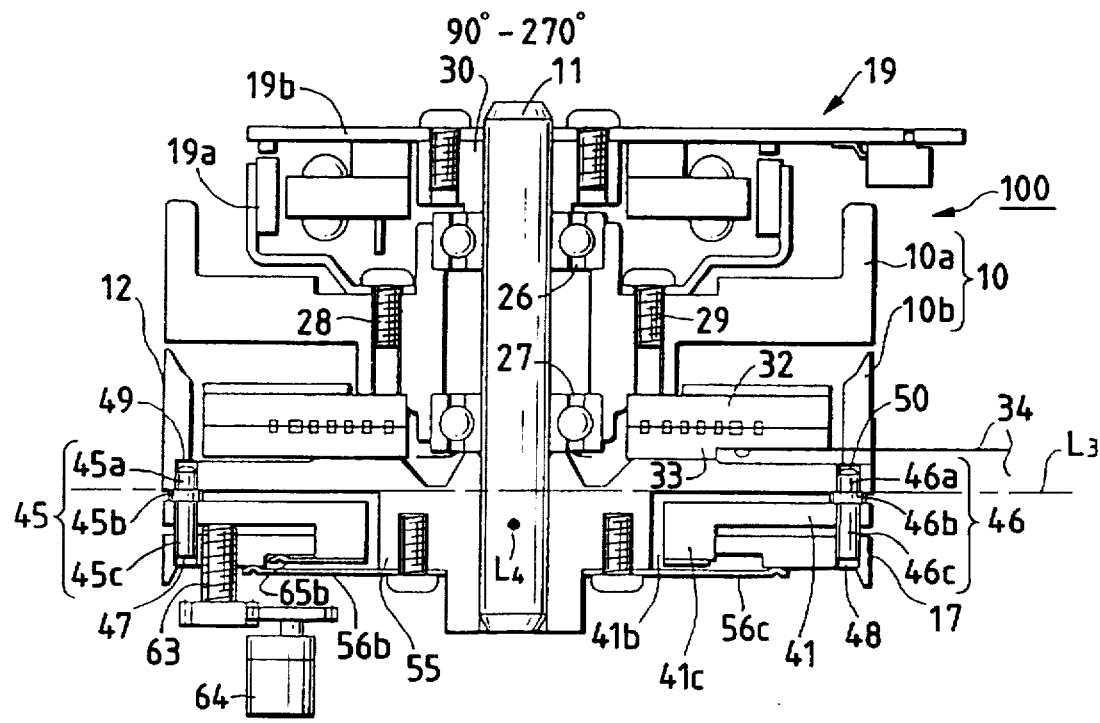
FIG. 15 is a 90°–270° cross sectional view showing a head drum assembly according to the second embodiment.
Figure 16:
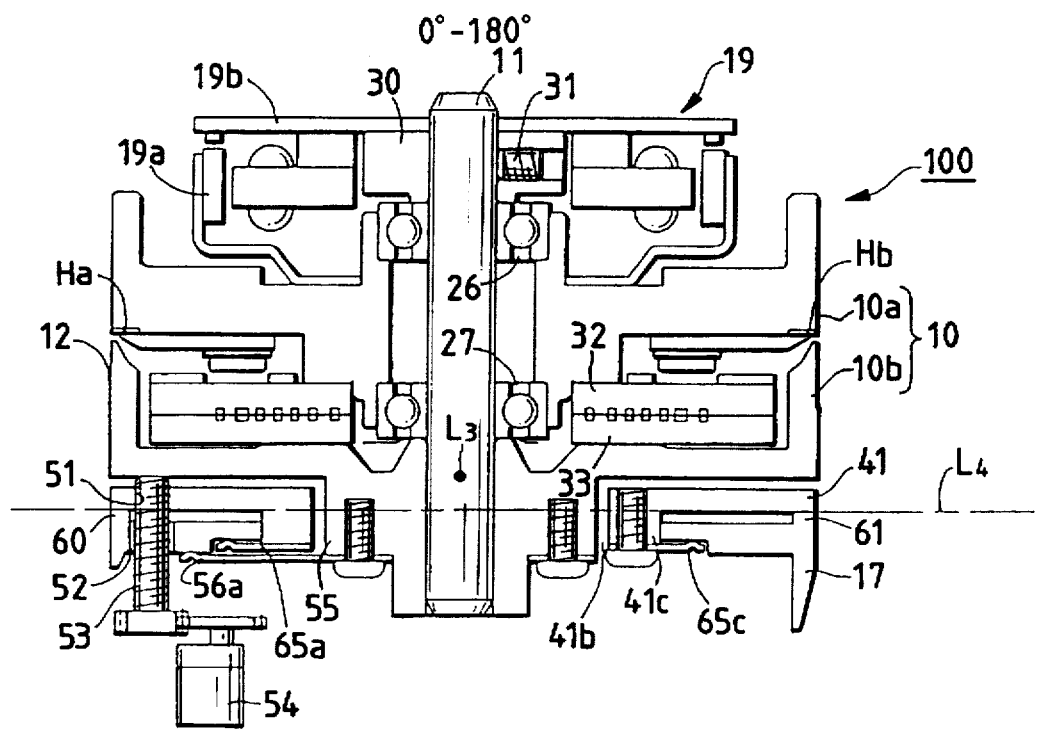
FIG. 16 is a 0°–180° cross sectional view showing the head drum assembly in FIG. 15.
Figure 17:
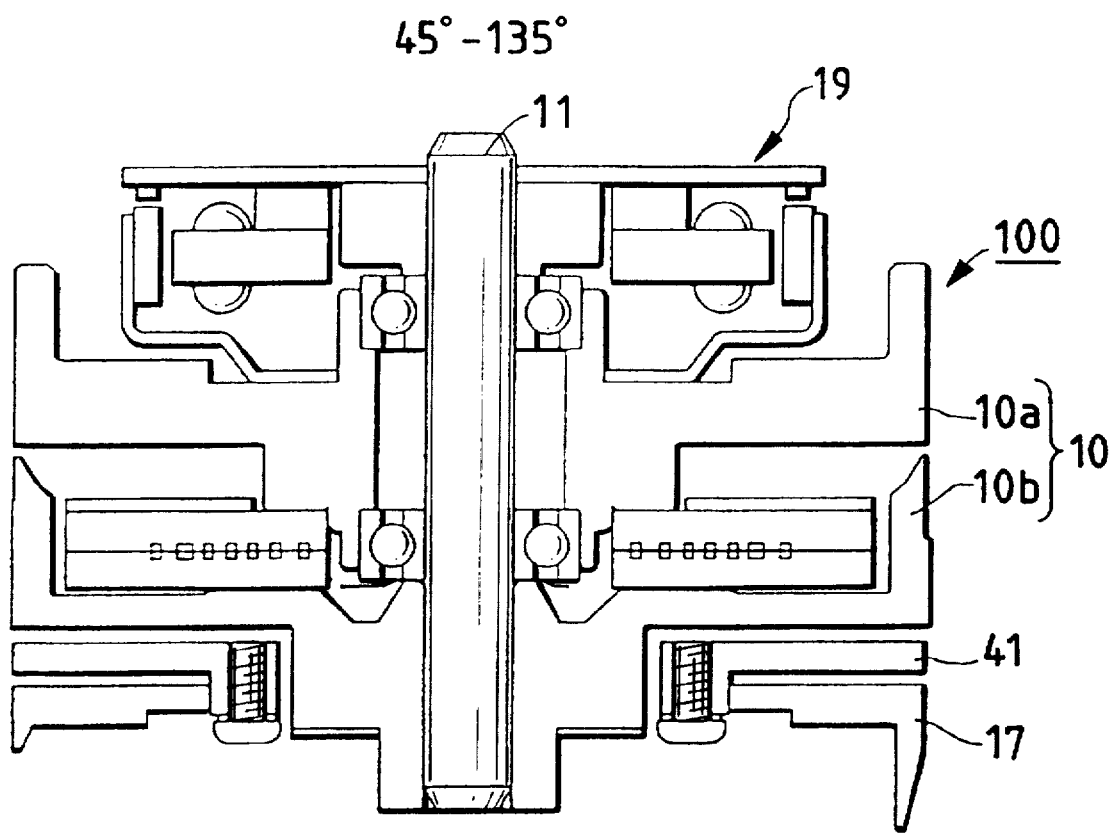
FIG. 17 is a 45°–135° cross sectional view showing the head drum assembly in FIG. 15.
Figure 18:
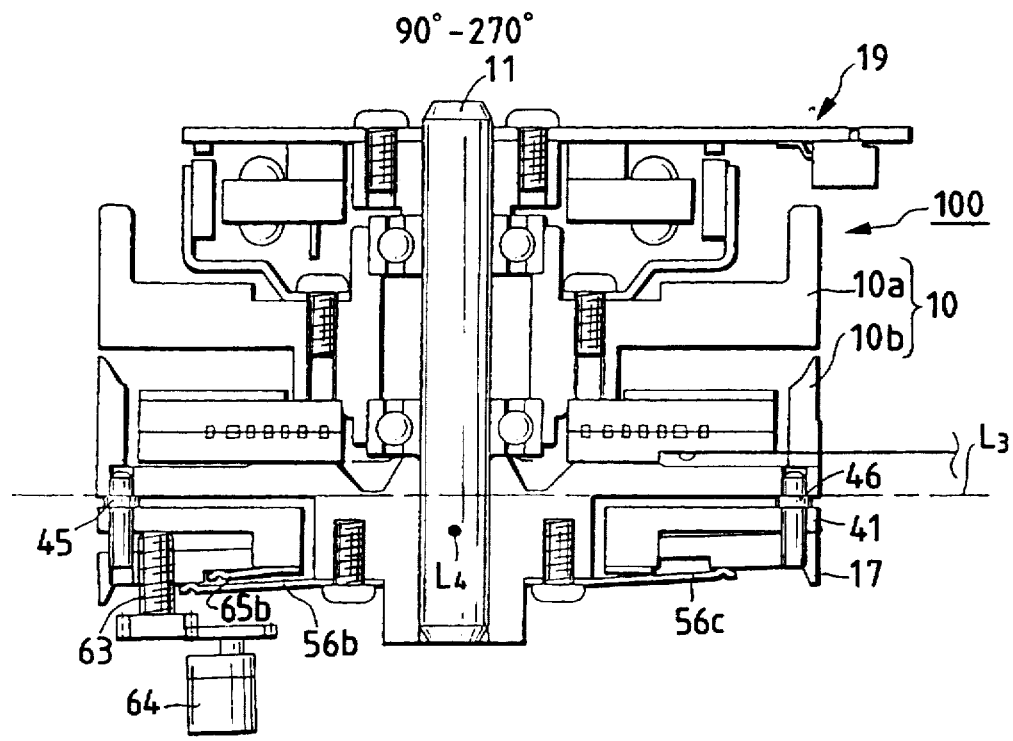
FIG. 18 is a 90°–270° cross sectional view showing the head drum in FIG. 15 under a second positioning control.
Figure 19:
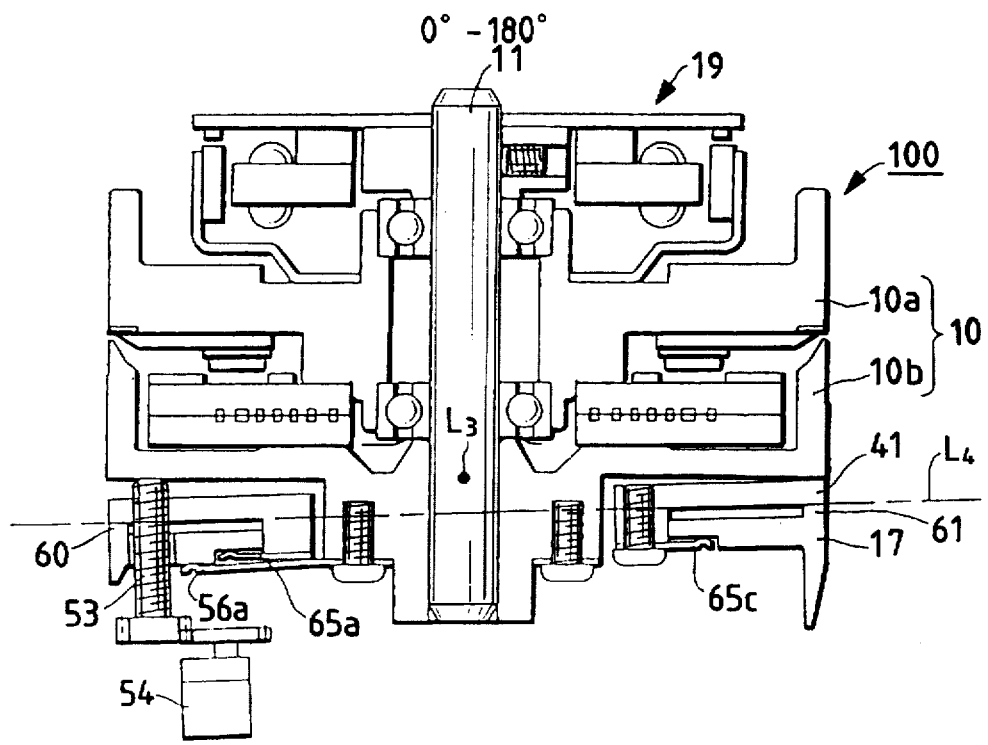
FIG. 19 is a 0°–180° cross sectional view showing the head drum in FIG. 15 under a first positioning control.
Figure 20:
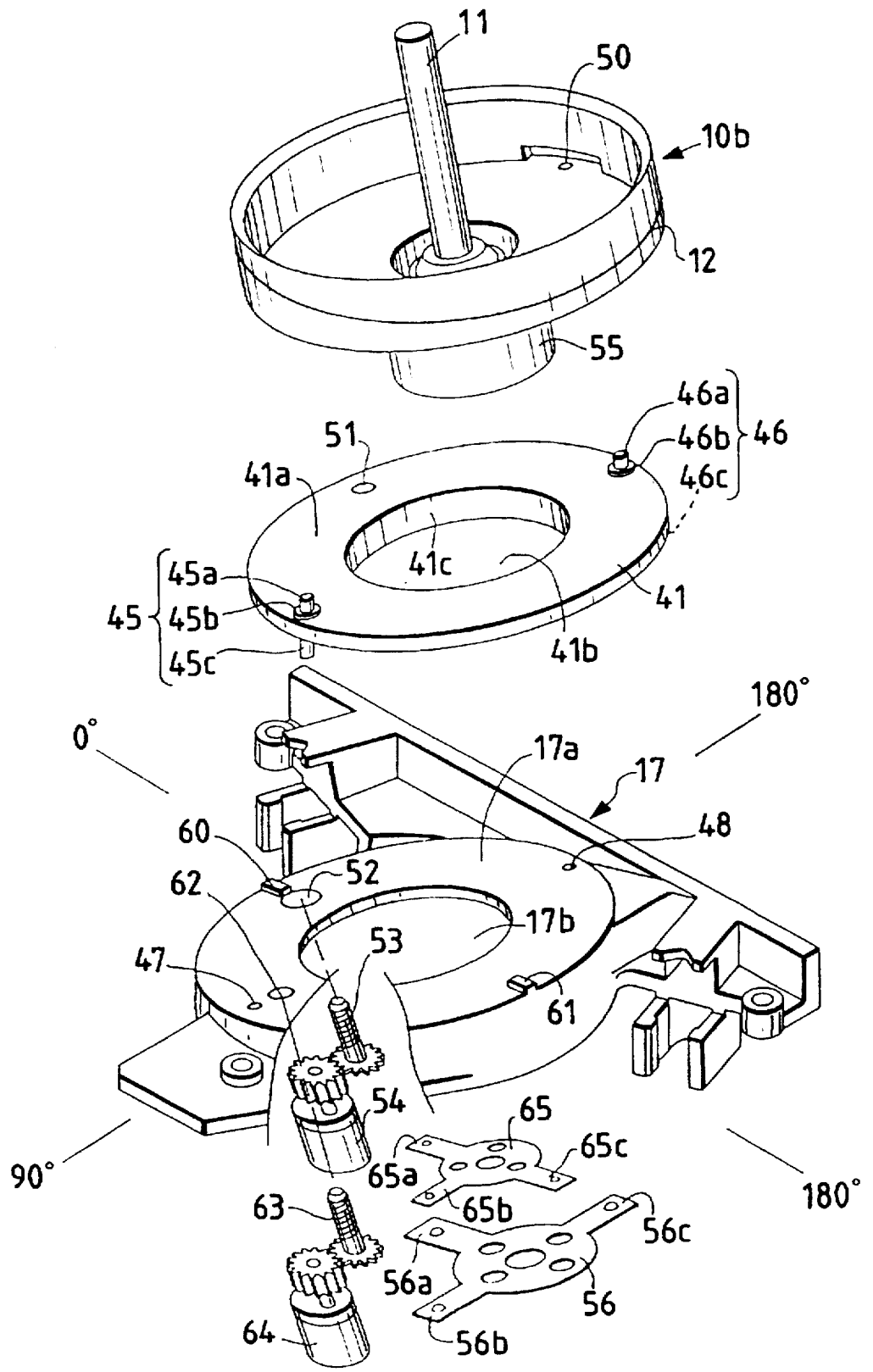
FIG. 20 is an exploded view showing a head drum assembly according to a second embodiment.

FIGS. 15 to 17 show a structure of the head drum assembly 100 in detail according to the second embodiment. FIG. 15 is a 90°–270° cross sectional view. FIG. 16 is a 0°–180° cross sectional view. FIG. 17 is a 45°–135° cross sectional view. FIG. 18 is a 90°–270° cross sectional view. FIG. 19 is a 0°–180° cross sectional view. FIG. 20 is an exploded perspective view showing the head drum assembly 100. The structure of the tape guide drum 10 is identical with that in the first embodiment, and explanation thereof in detail will be omitted here.

The head drum assembly 100 is disposed on the drum base 17 secured on the chassis (not shown) through the sub-base 41. The drum base 17, as can be seen in FIG. 18, is made of an annular member having formed thereon support protrusions 60 and 61 at the angular positions of 0° and 180°. A through hole 52 is formed inside the support protrusion 60. A threaded hole 62 and a through hole 47 are formed at the angular position of 90°. A through hole 48 is formed at the angular position of 270°.

A screw with a gear 63, which corresponds to the actuator 58 shown in FIG. 14(c), is inserted into the threaded hole 62 and projects from the upper surface 17a of the drum base 17 in engagement with the sub-base 41. The screw 63 is rotated by the motor 64 so as to move vertically, as viewed in FIG. 15.

The support pins 45 and 46, which are identical with those in the first embodiment, are press-fitted into the sub-base 41 at the angular positions of 90° and 270°. The support pins 45 and 46 include upper shafts 45a and 46a, spacers 45b and 46b, and lower shafts 45c and 46c, respectively. The lower shafts 45c and 46c slidably engage the through the holes 47 and 48 formed in the drum base 17 for supporting rotation of the sub-base 41 around the line L4 extending through the support protrusions 60 and 61. Clearances between the lower shafts 45c and 46c and inner walls of the through holes 47 and 48 are set to a value sufficient to define a rotational range in which the sub-base 41 is rotated around the line L4. The sub-base 41 has an inner circular wall 41c defining an opening 41b at the center thereof. The inner circular wall 41, as shown in FIG. 15, partially projects downward to engage an inner wall 17b of the drum base 17 with a clearance fit for allowing the rotation of the sub-base 41 around the line L4.

A screw with a gear 53, which corresponds to the actuator 22 in FIG. 14(b), passes through the hole 52 and projects from the upper surface 41a of the sub-base 41 through the threaded hole 51 in engagement with the bottom of the lower drum 10b. The screw 53 is rotated by the motor 54 to move vertically, as viewed in FIG. 16.

The lower drum 10b has, as shown in FIGS. 15 and 20, holes 49 and 50 formed in its bottom at the angular positions of 90° and 270°. Into the holes 49 and 50, the upper shafts 45a and 46a of the support pins 45 and 46 are, similar to the first embodiment, inserted to define an axis of rotation around the line L3 extending through the upper shafts 45a and 46a. Additionally, the lower drum 10b, similar to the first embodiment, has formed on the bottom a boss 55 which is inserted into the central opening 41b of the sub-base 41.

A plate spring 56 is, as shown in FIG. 20, secured on the bottom of the lower drum 10b using screws in engagement of arms 56a, 56b, and 56c with a lower surface of the drum base 17 to restrict upward movement of the tape guide drum 10, or to urge the tape guide drum 10 downward relative to the drum base 17.

The head drum assembly 100 further includes a plate spring 65 which includes three arms 65a, 65b, and 65c extending away from each other at angular intervals of 90°. The plate spring 65 is, as can be seen in FIGS. 15 and 16, attached to the bottom of the inner circular wall 41c of the sub-base 41 using screws so that the arms 65a, 65b, and 65c engage the bottom of the drum base 17 to urge the sub-base 41 downward. The arms 65a and 65c of the plate spring 65 are located at the angular positions 0° and 180° and urge the sub-base 41 downward, while the arm 65b functions as the spring 59, as shown in FIG. 14(c), to urge the sub-base 41 counterclockwise around the line LA, as shown in FIG. 15.

The first and second positioning control of the head drum assembly 100 will be discussed with reference to FIGS. 18 and 19. FIG. 19 shows the tape guide drum 10 which has swung clockwise around the line L3 under the first positioning control. FIG. 18 shows the tape guide drum 10 which has swung clockwise under the second positioning control.

The first positioning control is the same as in the first embodiment, and explanation thereof will be omitted here.

The second positioning control to rotate the tape guide drum 10 around the line L4 is accomplished by turning on the motor 64 to move the screw 63 vertically, as shown in FIG. 15. The upward movement of the screw 63 causes the sub-base 41 to be rotated clockwise against a spring force provided by the arm 65b of the plate spring 65. The downward movement of the screw 63 causes the sub-base 41 to be rotated counterclockwise with the aide of the spring force of the arm 65b of the plate spring 65.

Referring to FIGS. 21 to 25, a modification of the second embodiment is shown which is different from the second embodiment in arrangement of an axis of rotation.

Figure 21:
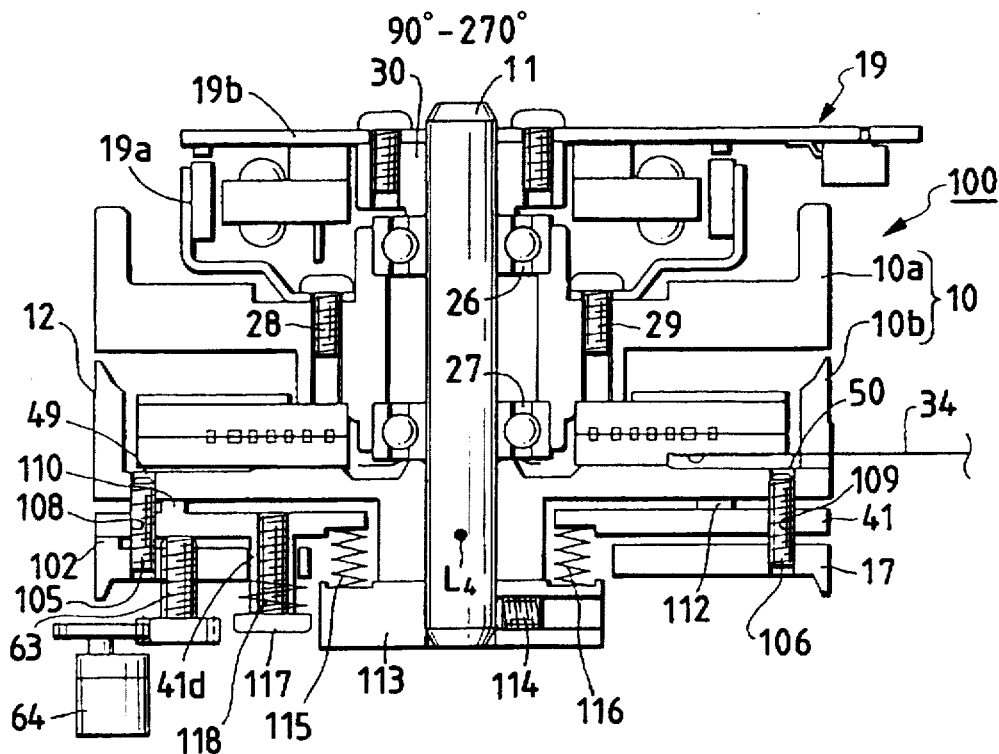
FIG. 21 is a 90°–270° cross sectional view showing a modification of a head drum assembly according to a second embodiment.
Figure 22:
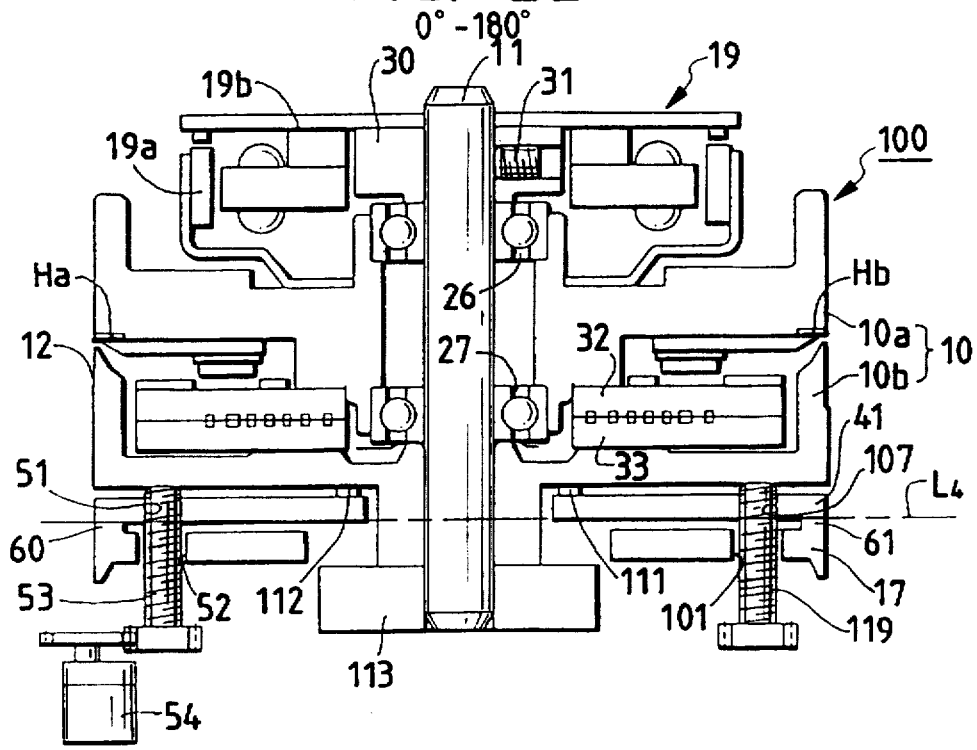
FIG. 22 is a 0°–180° cross sectional view showing the head drum assembly in FIG. 15.
Figure 23:
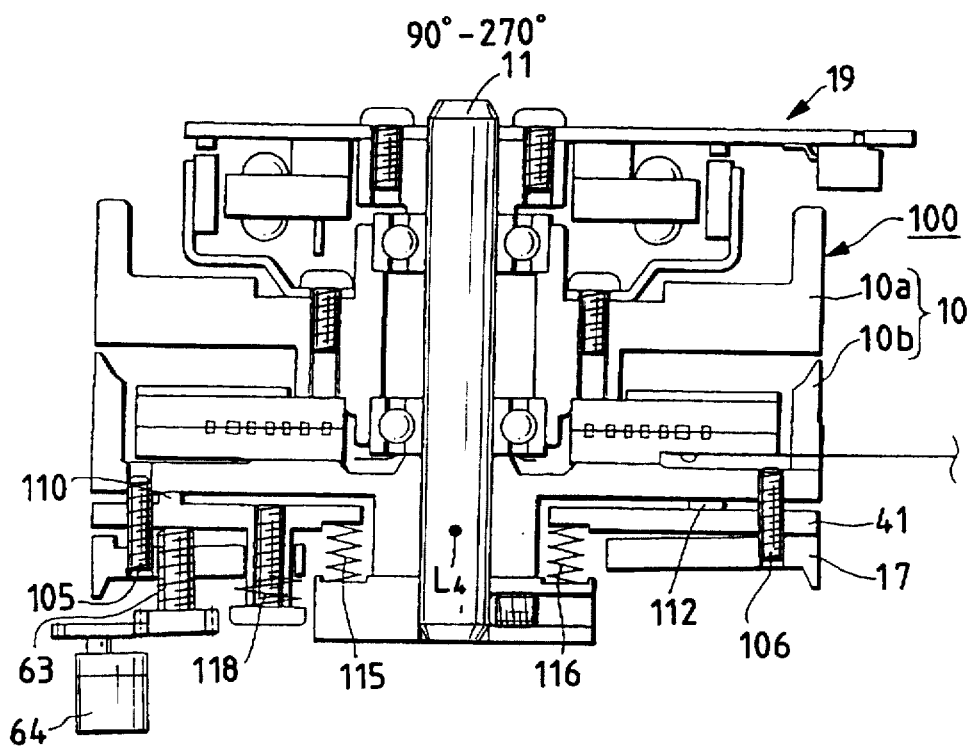
FIG. 23 is a 90°–270° cross sectional view showing the head drum assembly in FIG. 21 under a second positioning control.
Figure 24:
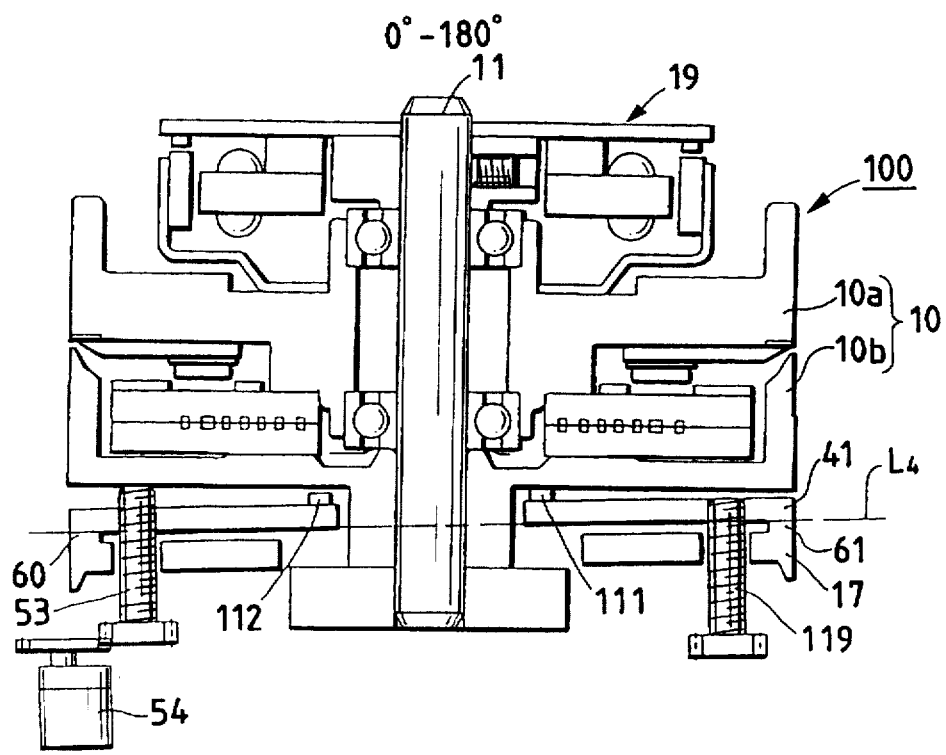
FIG. 24 is a 0°–180° cross sectional view showing the head drum in FIG. 21 under a first positioning control.

FIG. 21 is a 90°–270° cross sectional view showing the head drum assembly 100, while FIG. 22 is a 0–180° cross sectional view. FIG. 23 is a 90°–270° cross sectional view showing the head drum assembly 100 under the second positioning control, while FIG. 24 is a 0°–180° cross sectional view showing the head drum assembly 100 under the first positioning control.

Figure 25:
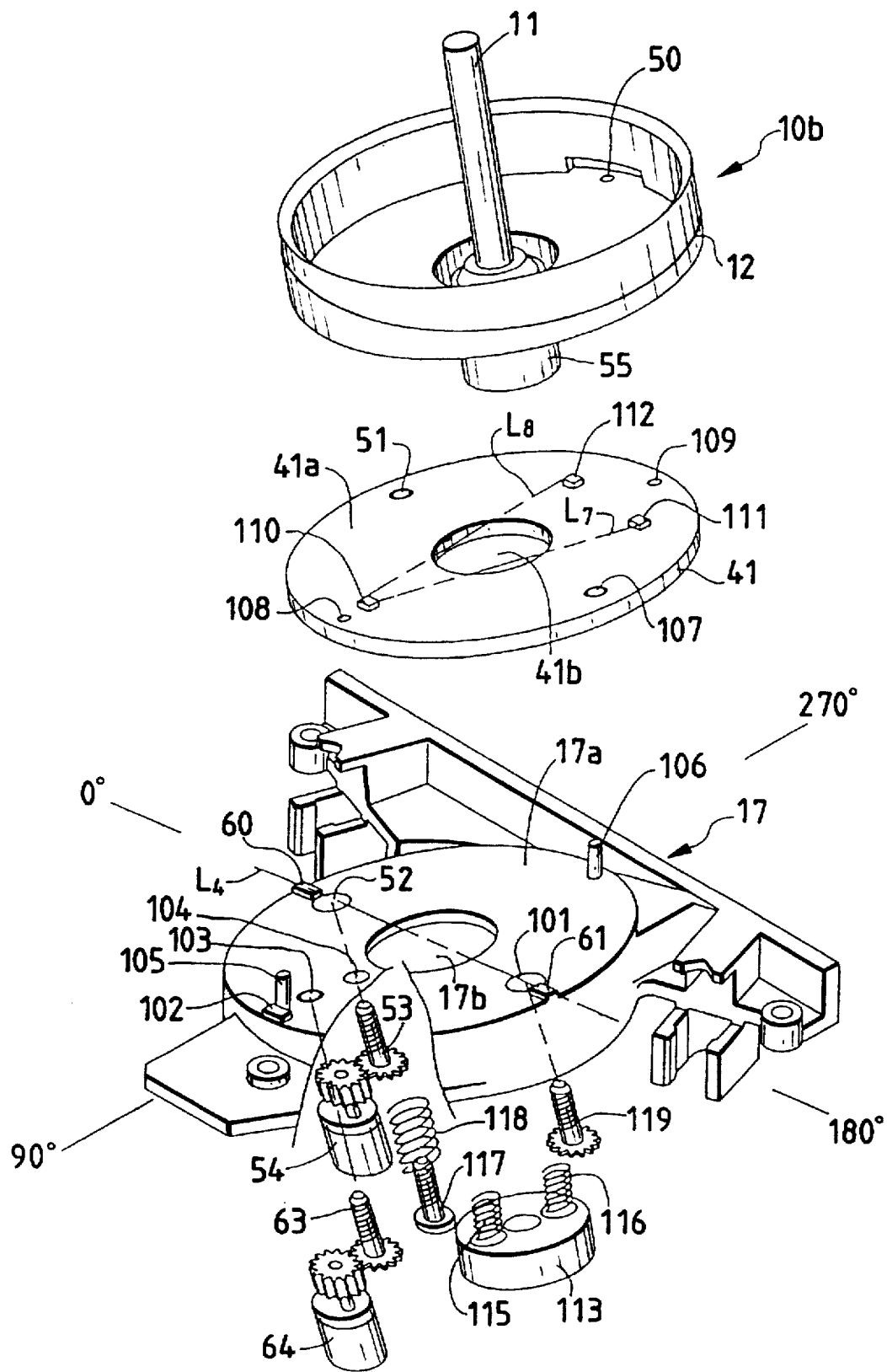
FIG. 25 is an exploded view showing the head drum assembly in FIG. 21.

The support protrusion 60 and the hole 52 are, as shown in FIG. 25, formed on and in the upper surface 17a of the drum base 17 at the angular position of 0°. The support protrusion 61 and the hole 101 are formed at the angular position of 180°. The support protrusion 102, the threaded hole 103, and the through hole 104 are formed at the angular position of 90°. The positioning pins 105 and 106 are press-fitted into the upper surface 17a at the angular positions of 90° and 270°, respectively.

The sub-base 41 has the threaded holes 51 and 107, through holes 108 and 109, and the support protrusions 110, 111, and 112. The threaded holes 51 and 107 are formed at the angular positions of 0° and 180°, respectively. The through holes 108 and 109 are formed at the angular positions of 90° and 270°. The support protrusions 110, 111, and 112 are formed on the upper surface 41a at the angular positions of 90°, 250°, and 290°, respectively. The sub-base 41 further has a boss 41d, as shown in FIG. 21, formed on the bottom thereof at the angular position of 90°. The boss 41d has formed therein a tapped hole.

The sub-base 41 is disposed on the support protrusions 60, 61, and 102 of the drum base 17 with the positioning pins 105 and 106 on the drum base 17 engaging the through holes 108 and 109 of the sub-base 41 with a given clearance and the boss 41d engaging the hole 104 with any play. The engagement of the positioning pins with the through holes 108 and 109 with the given clearance serves to orient the sub-base 41 during rotation around the line L4 passing through the support protrusions 60 and 101 under the second positioning control.

The lower drum 10b is disposed on the support protrusions 110, 111, and 112 of the sub-base 41 with the boss 55 being inserted into the central opening 41b of the sub-base 41 and the central opening 17b of the drum base 17. The positioning pins 105 and 106 projecting from the upper surface 41a of the sub-base 41 through the through holes 108 and 109 engage with a given clearance the through holes 49 and 50 formed in the bottom of the lower drum 10b at the angular positions of 90° and 270°, respectively, for orienting the lower drum 10b during rotation under the first positioning control. The given clearance between the holes 49 and 50 and the positioning pins 105 and 106 is set to a value allowing the lower drum 10b to rotate around the line L7 extending through the support protrusions 110 and 111 or the line L8 extending through the support protrusions 110 and 112.

A spring holder 113, as shown in FIGS. 21 and 25, is secured by a set screw 114 on lower end of the drum shaft 11 press-fitted into the lower drum 10b. Coil springs 115 and 116 are compressed between the spring holder 113 and the bottom of the sub-base 41 to urge the lower drum 10b against the support protrusions 110, 111, and 112 of the sub-base 41. A screw 117 is inserted into the boss 41d of the sub-base 41 projecting downward through the hole 104 of the drum base 17. A coil spring is compressed between a bearing surface of the screw 117 and the drum base 17 to urge the sub-base 41 against the support protrusions 60, 61, and 102 of the drum base 17.

In the bottom of the drum base 17, the screws 53, 119, and 63 are disposed. The screws 53 and 119 engage the threaded holes 51 and 107 of the sub-base 41 through the holes 52 and 101 of the drum base 17, respectively. The screw 63 engages the threaded hole 103 of the drum base 17. The screw 63 is driven by the motor 64, while the screws 53 and 119 are both moved vertically by the motor 54 through a gear train (not shown) which turns the screws 53 and 119 in opposite directions. For instance, when the screw 53 is rotated clockwise, the screw 119 is rotated counterclockwise. The screw 119 may alternatively be moved by an additional electric motor.

In operation, the first positioning control is, as shown in FIG. 24, accomplished by turning on the motor 54 to move the screws 53 and 119 vertically. When the screw 53 is moved upward while the screw 119 is moved downward, it will cause the lower drum 10b to rotate clockwise around the line L7 passing through the support protrusions 110 and 111. Conversely, when the screw 53 is moved downward while the screw 119 is moved upward, it will cause the lower drum 10b to rotate counterclockwise around the line L8 passing through the support protrusions 110 and 112.

The second positioning control is, as shown in FIG. 24, accomplished by turning on the motor 64 to move the screw 63 vertically. The upward movement of the screw 63, as shown in the drawing, causes the sub-base 41 to rotate clockwise around the line 4.

The feature of the above mentioned modification is that the tape guide drum 10 is retained at a desired angular position (i.e., a position where the drum shaft 11 is inclined to the vertical line Z at an angle of $\phi$) during record and self-record/reproduction operations. Specifically, during the record and self-record/reproduction operations, the screw 63 is moved downward by the motor 64 to bring the end of the screw 62 out of engagement from the sub-base 41, and the screws 53 and 119 are also moved downward to bring the ends of the screws 53 and 119 out of engagement from the lower drum 10b. This allows the sub-base 41 to be placed on a plane defined by the three support protrusions 60, 61, and 102 formed on the drum base 17 and the lower drum 10b to be placed on a plane defined by the three support protrusions 110, 111, and 112 formed on the sub-base 41, so that the tape guide drum 10 is positioned in place.

The second positioning control is, as mentioned above, achieved only by turning the sub-base 41 clockwise around the line 4 from a position where the sub-base 41 is supported on the three support protrusions 60, 61, and 102, however; it can orient the tape guide drum 10 to follow various types of track sets, which will be discussed later in detail.

Referring to FIGS. 26(a) to 37(d), there is shown a third embodiment of the magnetic recording/reproducing apparatus.

Figure 26A:
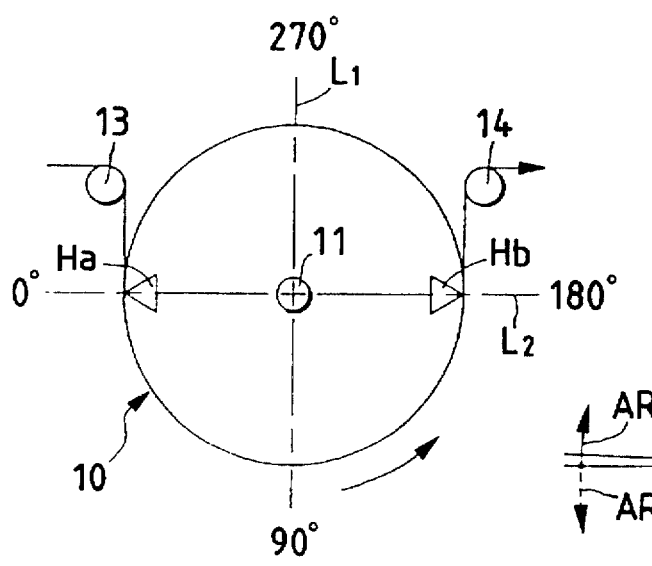
FIG. 26(a) is a plan view which shows a tape guide head drum according to a third embodiment of the present invention.
Figure 26C:
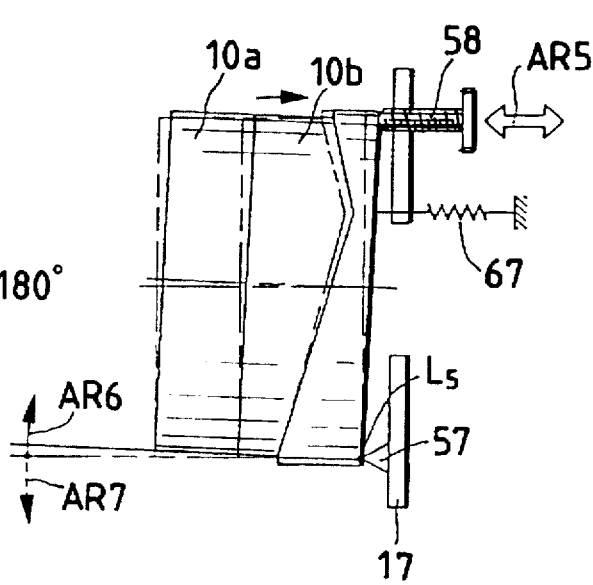
FIG. 26(c) is a side view of FIG. 26(a), as viewed from an angular position of 180°.
Figure 26B:
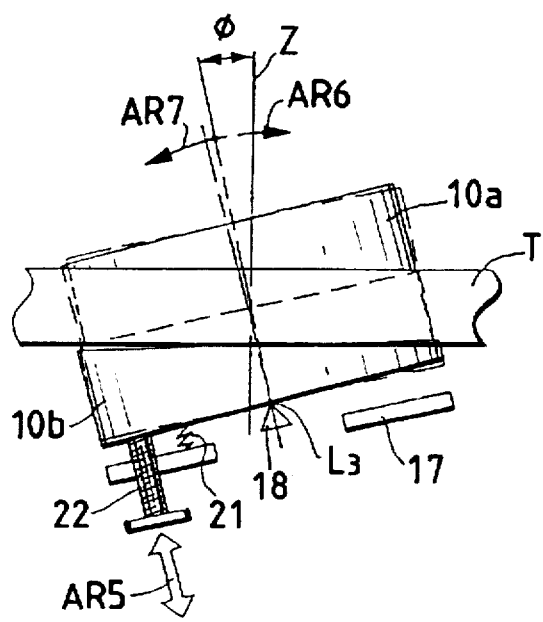
FIG. 26(b) is a front view of FIG. 26(a), as viewed from an angular direction of 90°.

FIGS. 26(a) to 26(c), similar to the above embodiments, show the principles of the first and second positioning control. The first positioning control is, as shown in FIG. 26(b), accomplished by turning the tape guide drum 10 around the line L3 defined by the pivot 18 disposed between the drum base 17 and the lower drum 10b. This is the same as in the first and second embodiments. The second positioning control is, as shown in FIG. 26(c), accomplished by turning the tape guide drum 10 around the line L5 defined by the pivot 57 disposed between the drum base 17 and the lower drum 10b.

The magnetic recording/reproducing apparatus of this embodiment, as shown in FIG. 26(c), includes an actuator 58 and a spring 67. The actuator 57 is secured in the drum base 17 at the angular position of 270° to move the tape guide drum 10 vertically, as shown by the arrow AR5. The spring 67 is also secured on the drum base 17 at the angular position of 270° to urge the tape guide drum 10 to rotate clockwise around the line L5 defined by a pivot 57 located at the angular position of 90°. Therefore, in the second positioning control, upward movement of the actuator 58 causes the tape guide drum 10 to rotate counterclockwise, as shown by the arrow AR7, against a spring force of the spring 67, while downward movement of the actuator 58 causes the tape guide drum 10 to rotate clockwise, as shown by the arrow AR6, with the aide of the spring force of the spring 67.

The location of the pivot 57 in FIG. 26(c) corresponds to that shown in FIG. 65(c), as previously discussed.

FIGS. 27 to 31 show a structure of the head drum assembly 100 in detail according to the third embodiment. The same reference number as employed in the above embodiments refers to the same parts.

Figure 31:
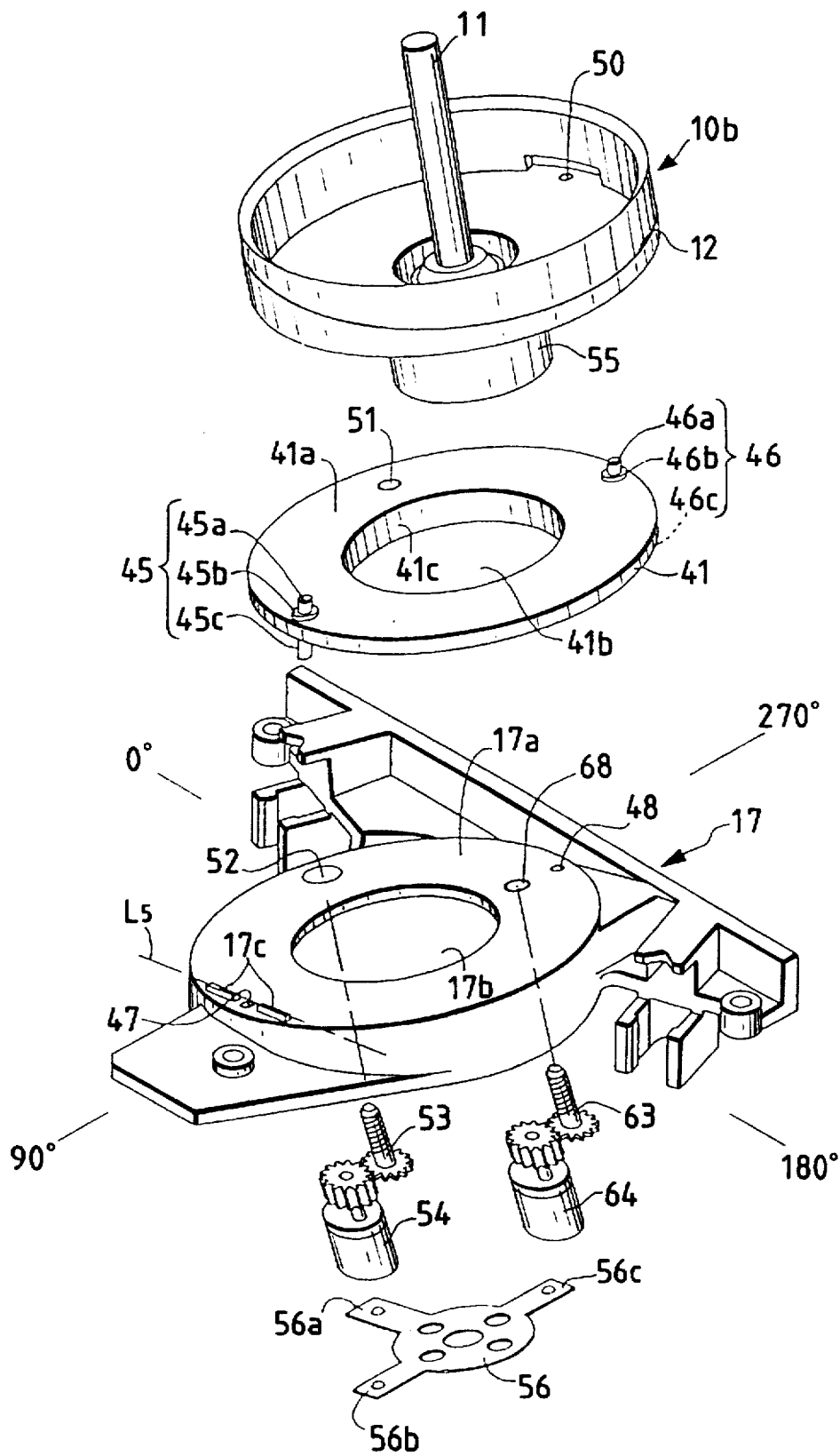
FIG. 31 is an exploded view showing the head drum assembly in FIG. 27.
Figure 32:
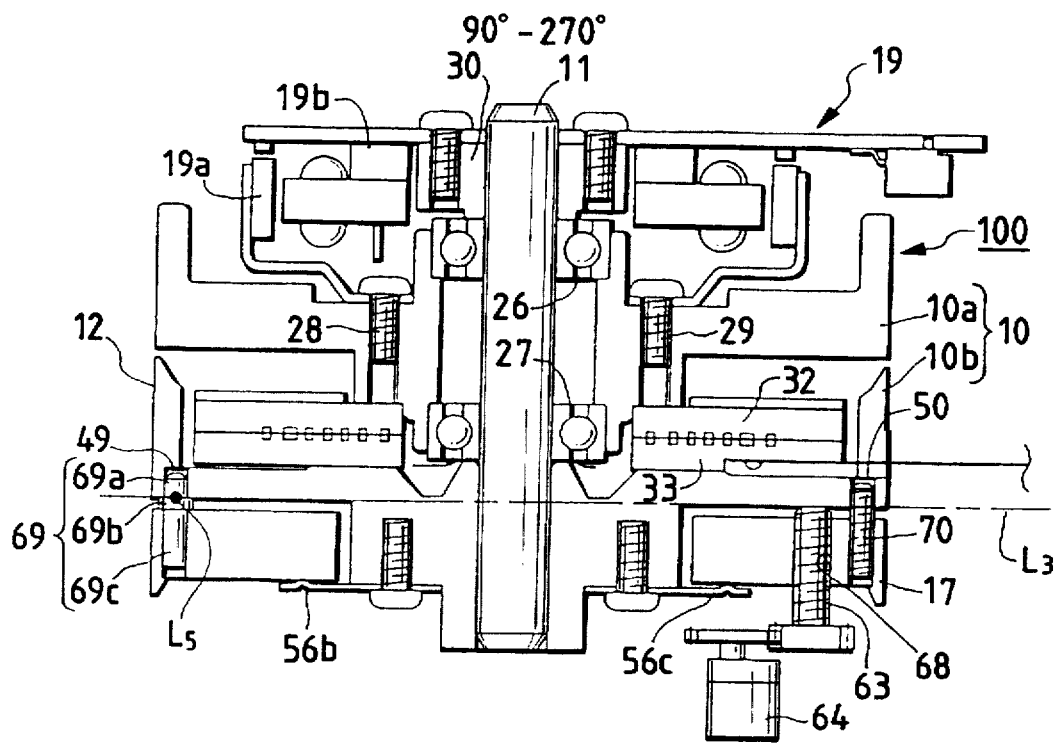
FIG. 32 is a 90°–270° cross sectional view showing a modification of a head drum assembly according to a third embodiment.
Figure 33:
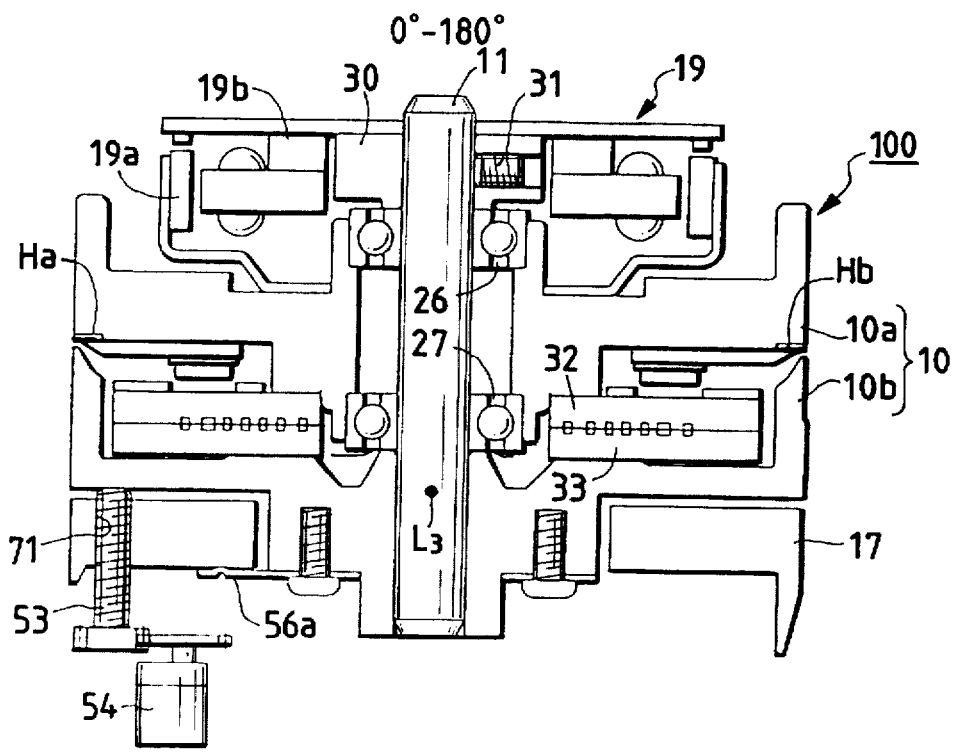
FIG. 33 is a 0°–180° cross sectional view showing the head drum assembly in FIG. 32.

The head drum assembly 100 is, as already explained, disposed on the drum base 17 secured on the chassis (not shown) through the sub-base 41. The drum base 17, as can be seen in FIG. 31, has formed therein through holes 52, 47 and 48 and a threaded hole 68. The through holes 52 and 47 are formed at the angular positions of 0° and 90° respectively. The Through hole 48 and the threaded hole 68 are formed at the angular position of 270°. The drum base 17 further has formed thereon a pair of ribs 17c projecting from the upper surface 17a by a given height.

Figure 27:
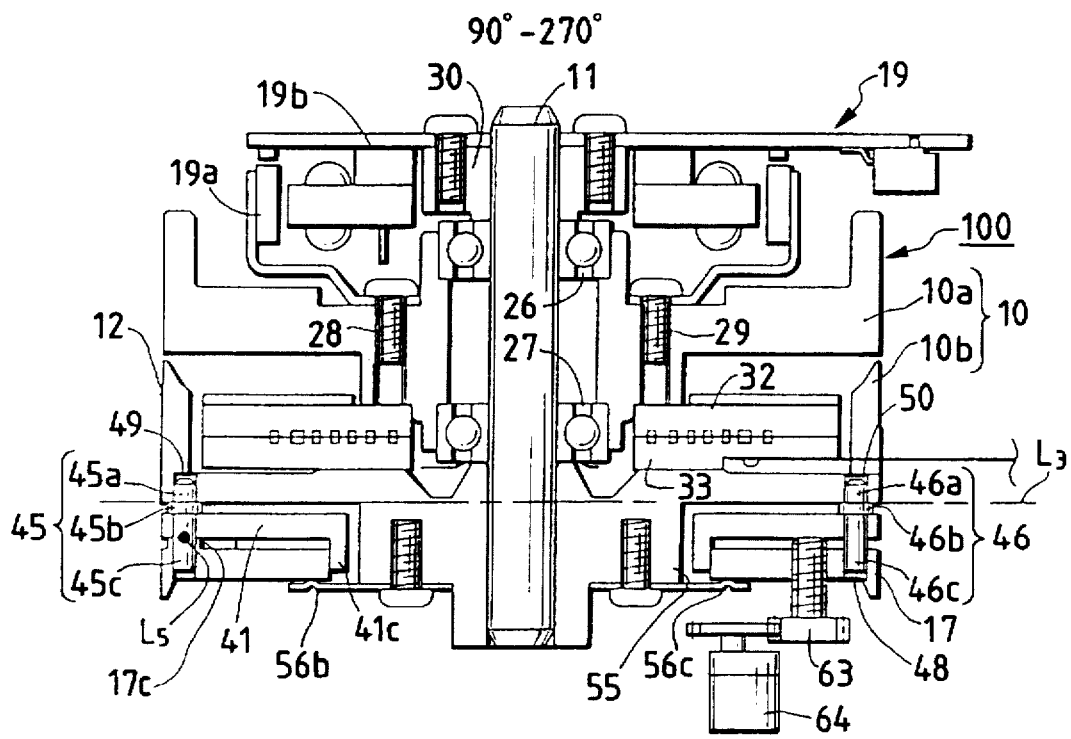
FIG. 27 is a 90°–270° cross sectional view showing a head drum assembly according to a third second embodiment.
Figure 28:
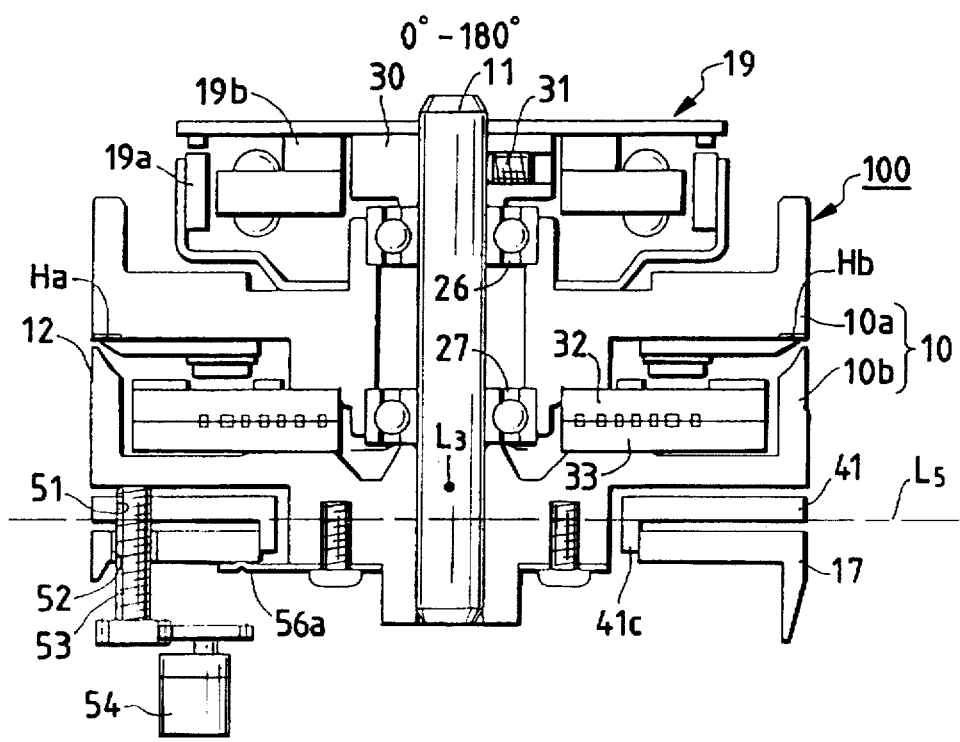
FIG. 28 is a 0°–180° cross sectional view showing the head drum assembly in FIG. 27.

The screw 63 having mounted thereon a gear is, as shown in FIG. 27, inserted from the bottom of the drum base 17 into the threaded hole 68 in engagement with the bottom of the sub-base 41. The screw 63 is driven by the motor 64 to move vertically for displacing the sub-base up and down.

Other arrangements are the same as those described in the above embodiments, and explanation thereof in detail will be omitted here.

In operation, the first positioning control is, as mentioned above, the same as in the above embodiments, and explanation thereof will be omitted here.

Figure 29:
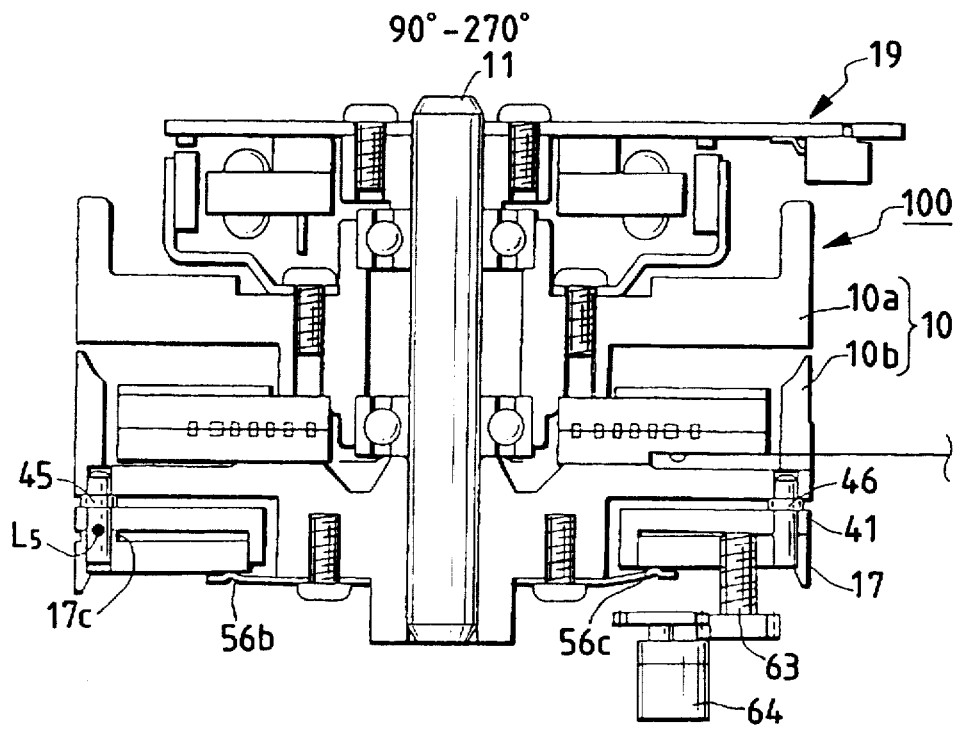
FIG. 29 is a 90°–270° cross sectional view showing the head drum in FIG. 27 under a second positioning control.
Figure 30:
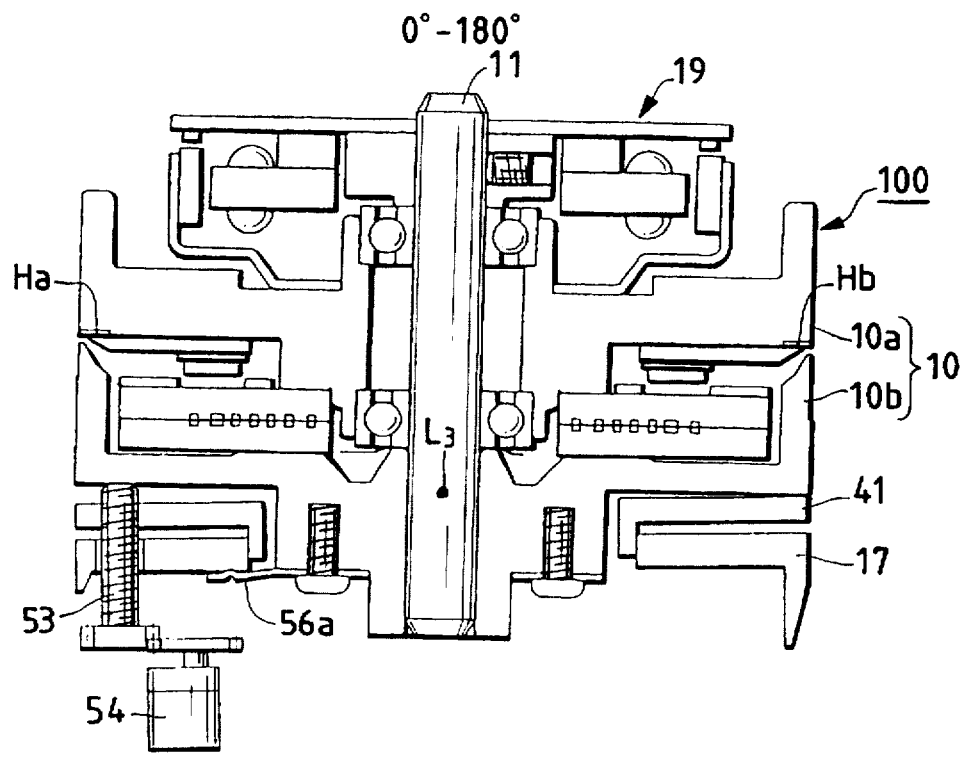
FIG. 30 is a 0°–180° cross sectional view showing the head drum in FIG. 27 under a first positioning control.

The second positioning control is, as shown in FIG. 29, accomplished by turning on the motor 64 to move the screw 63 vertically. The downward movement of the screw 63 causes the sub-base 41 to be rotated clockwise around the line L5 with the aide of a spring force provided by the arm 56c of the plate spring 56. The upward movement of the screw 63 causes the sub-base 41 to be rotated counterclockwise around the line L5 against the spring force of the arm 56c of the plate spring 56.

Referring to FIGS. 32 to 36, a modification of the third embodiment is shown which does not have the sub-base 41.

Figure 36:
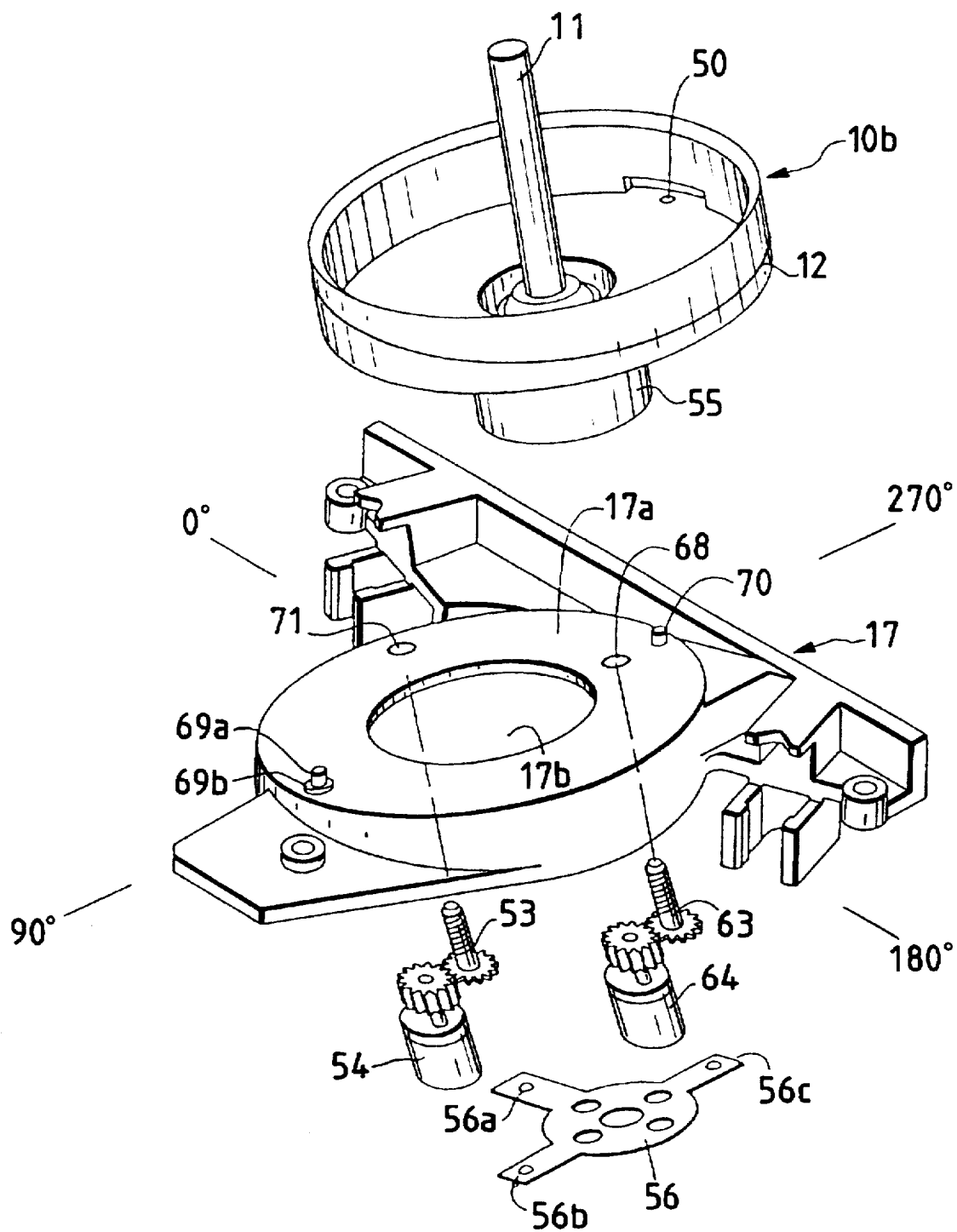
FIG. 36 is an exploded view showing the head drum assembly in FIG. 32.

The drum base 17 includes, as shown in FIG. 36, a pair of support pints 69 and 70 which are fitted into the upper surface 17a at the angular positions of 90° and 270°, respectively. The support pin 69 is similar in structure to the support pins 45 and 46. The lower shaft 69c (not shown) of the support pin 69 is press-fitted into the drum base 17 to the extent that the spacer 69 engages the upper surface 17a. The support pin 70 is made of a cylindrical member having no spacer and partially press-fitted into the upper surface 17a. The upper shaft 69a of the support pins 69 and the upper portion of the support pin 70 are inserted into the holes 49 and 50 with given clearances.

The drum base 17 further has the threaded holes 71 and 68 formed in the upper surface 17a at the angular positions of 0° and 270°. The screws 53 and 63 are inserted into the threaded holes 71 and 68 and driven by the motors 54 and 64, respectively, for vertical movement. Other arrangements are the same as those in the third embodiment.

Figure 35:
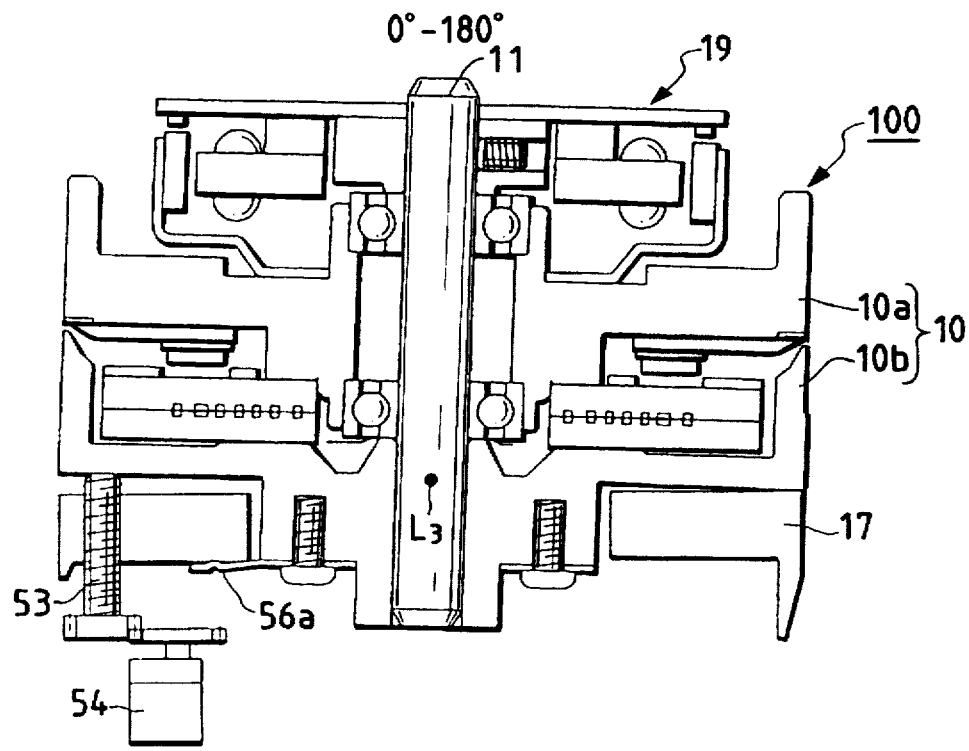
FIG. 35 is a 0°–180° cross sectional view showing the head drum in FIG. 32 under a first positioning control.

In operation, the first positioning control is, as shown in FIG. 35, accomplished by turning on the motor 54 to move the screw 53 vertically. Specifically, when the screw 53 is moved upward from a position where the end of the screw 53 projects from the upper surface 17a of the drum base 17 by a distance equal to the thickness of the spacer 69b of the support pin 69, it will cause the tape guide drum 10 to be turned clockwise around the line L3 against a spring force of the arm 56a of the plate spring 56. Conversely, when the screw 53 is moved downward, it will cause the tape guide drum 10 to be turned counterclockwise with the aide of the spring force of the arm 56a of the spring 56.

Figure 34:
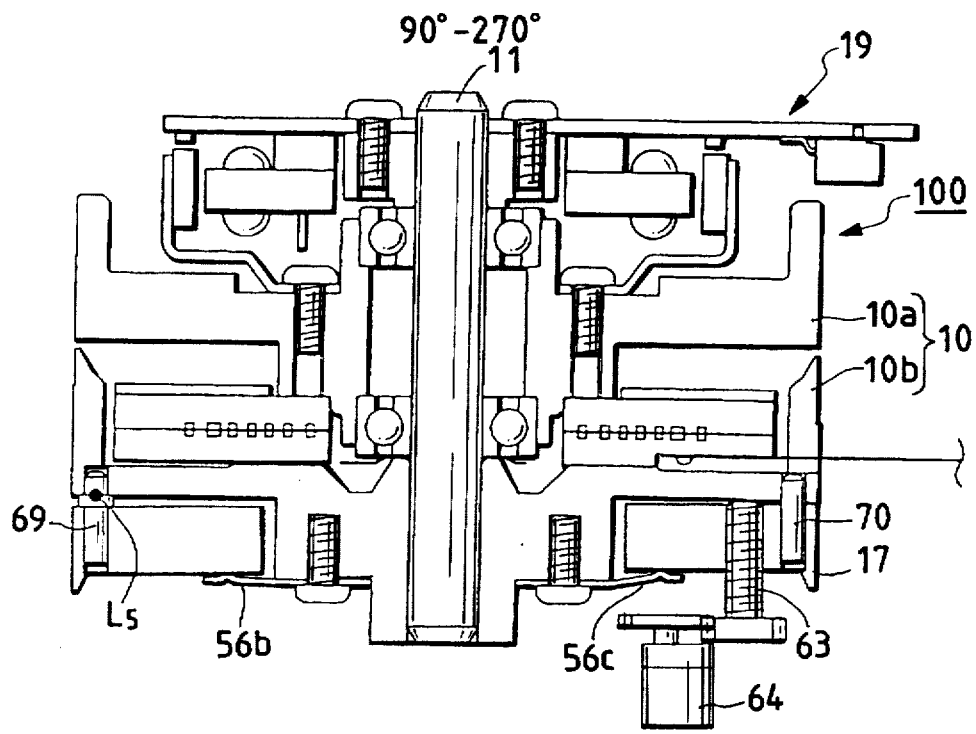
FIG. 34 is a 90°–270° cross sectional view showing the head drum assembly in FIG. 32 under a second positioning control.

The second positioning control is, as shown in FIG. 34, accomplished by turning on the motors 64 and 54 simultaneously to move the screws 63 and 53 vertically. When the screws 63 and 53 are moved downward in a fixed speed ratio, the tape guide drum 10 is rotated clockwise around the line L5 with the aide of a spring force of the arum 56c of the plate spring 56. Conversely, when the screws 63 and 53 are moved upward in a fixed speed ratio, the tape guide drum 10 is rotated counterclockwise around the line L5 against the spring force of the arm 56c of the plate spring 56. The speed ratio of the screw 63 to the screw 53 during the vertical movement may be determined so as to orient a plane defined by three points: the end of the screw 63, the end of the screw 53, and the spacer 69b of the support pin 69 to coincide with the bottom of the lower drum 10b when the tape guide drum 10 is rotated through a desired angle around the line 15.

During the rotation of the tape guide drum 10 under the second positioning control, the hole 50 of the lower drum 10b slides along the support pin 70.

In the above discussion, the first positioning control and the second positioning control are performed independently, however; since the orientation of the plane defined by the ends of the screws 63 and 53 and the spacer 69b of the support pin 69 relative to the upper surface 17a of the drum base 17, as apparent from the above, determines an angular position of the lower drum 10b, it is possible to perform the first and second positioning control simultaneously by selectively changing the speed ratio of the screws 63 and the screw 53 during the vertical movement.

In the second embodiment, the axis of rotation of the tape guide drum 10 under the first positioning control is defined by the line L3 extending through the support pins 45 and 46 at right angles to the drum shaft 11, while the axis of rotation under the second positioning control is defined by the line L4 extending through the support protrusions 60 and 61 at right angles to the line L3. In the third embodiment, the axis of rotation of the tape guide drum 10 under the first positioning control is defined by the line L3 extending through the support pins 45 and 46 at right angles to the drum shaft 11, while the axis of rotation under the second positioning control is defined by the line L5 on the ribs 17c at right angles to the line L3. The orientation of the axis of rotation of the tape guide drum 10 is, however, not limited to the above. It's allowable range will be discussed with reference to FIGS. 37(a) to 37(d).

First Orientation of an Axis of Rotation

Figure 37A:
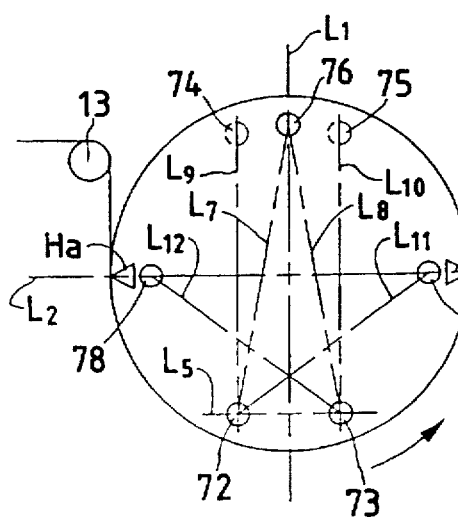
FIGS. 37(a) to 37(d) show modifications of location of axes of rotation of the head drum assemblies in the second and third embodiments.
Figure 37C:
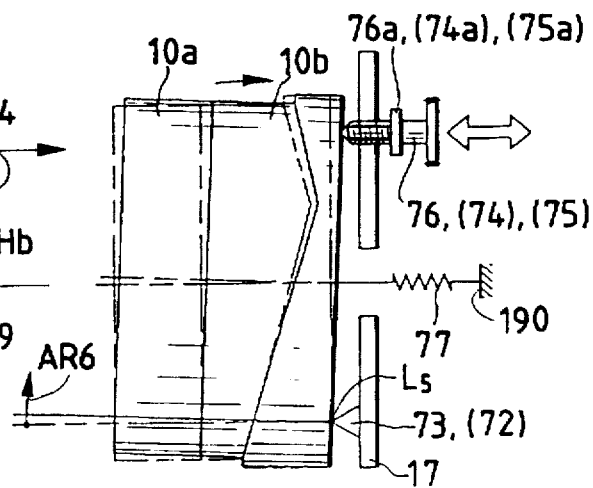

Two pivots 72 and 73 are, as shown in FIG. 37(a), disposed between the drum base 17 and the lower drum 10b at the angular positions of 90°. A vertical movable actuator 76 is, as shown in FIG. 37(c), disposed in the drum base 17 at the angular position of 270° across the line L2 from the pivots 72 and 73. The actuator 76 has a stopper 76a located so that an end of the actuator 76 may be leveled with the pivots 72 and 73 when the actuator 76 is moved upward until the stopper 76a engages the drum base 17.

The tape guide drum 10 is placed on a plane defined by three points: the pivots 72 and 73 and the actuator 76 and urged downward by a spring 77 disposed between the chassis 190 and the lower drum 10b.

Figure 37B:
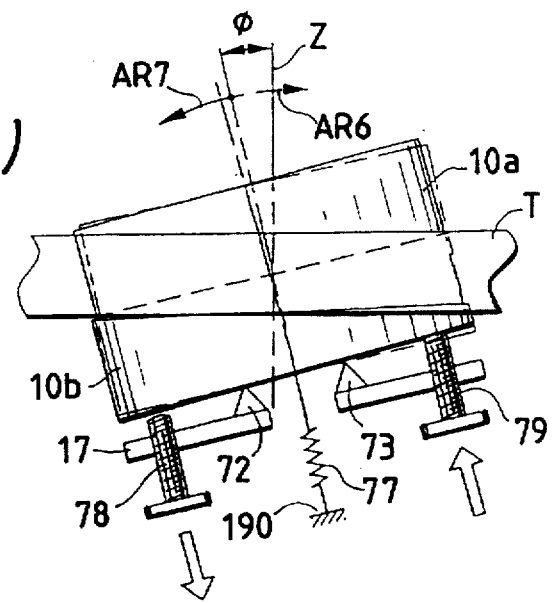
Figure 37D:
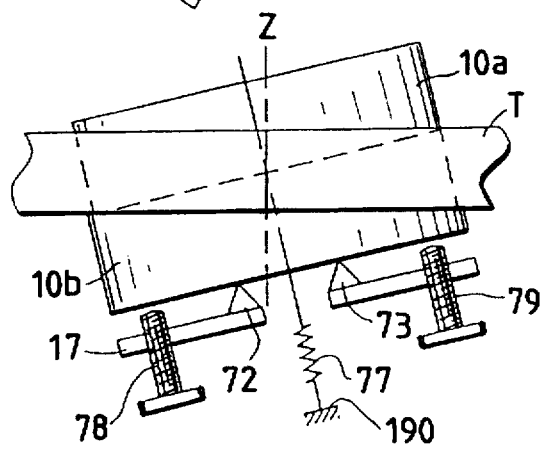

Actuators 78 and 79 are, as shown in FIGS. 37(b) and 37(d), disposed in the drum base 17 at the angular positions of 0° and 180° and moved vertically by motors (not shown).

In operation, counterclockwise rotation of the tape guide drum 10 under the first positioning control around the line L7 extending through the pivot 72 and the end of the actuator 76 is, as shown in FIG. 37(b), accomplished by moving the actuator 78 downward to bring its end into disengagement from the lower drum 10b and moving the actuator 79 upward to lift up the bottom of the lower drum 10b. Alternatively, clockwise rotation of the tape guide drum 10 under the first positioning control around the line L8 extending through the pivot 73 and the end of the actuator 76 is accomplished by moving the actuator 79 downward to bring its end into disengagement from the lower drum 10b and moving the actuator 78 upward to lift the bottom of the lower drum 10b.

The second positioning control is, as shown in FIG. 37(d), accomplished by moving both the actuators 78 and 79 downward to bring their ends into disengagement from the bottom of the lower drum 10b and moving the actuator 76 vertically to turn the tape guide drum 10 around the line L5 extending through the pivots 72 and 73.

The first and second positioning control may be achieved simultaneously in the following manner. After the tape guide drum 10 is turned counterclockwise around the line L7 extending through the pivot 72 and the end of the actuator 76 (the stopper 76a of the actuator 76 is moved upward into engagement with the drum base 17 and the end of the actuator 76 is projected from the drum base 17 to be on a level with the pivots 72 and 73), the actuator 76 is moved downward to rotate the tape guide drum 10 around the line L11 extending through the pivot 72 and the end of the actuator 79. Additionally, after the tape guide drum 10 is turned clockwise around the line L8 extending through the pivot 73 and the end of the actuator 76 (the stopper 76a of the actuator 76 is moved upward into engagement with the drum base 17 and the end of the actuator 76 is projected from the drum base 17 to be on a level with the pivots 72 and 73), the actuator 76 is moved downward to rotate the tape guide drum 10 around the line L12 extending through the pivot 73 and the end of the actuator 78.

Second Orientation of an Axis of Rotation

The pivots 72 and 73 are, similar to the above, provided between the drum base 17 and the lower drum 10b at the angular positions of 90°. Two actuators 74 and 75 are, as shown in FIGS. 37(a) and 37(d), disposed in the drum base 17 at the angular position of 270° at a given interval therebetween. The actuators 75 and 76 have stoppers 74a and 75a which are located so that ends of the actuators 75 and 76 may be leveled with the pivots 72 and 73 when the actuators 74 and 75 are moved upward until the stoppers 74a and 75a engage the drum base 17, respectively.

The tape guide drum 10 is placed on a plane defined by four points: the pivots 72 and 73 and the actuators 74 and 75 and urged downward by the spring 77 disposed between the chassis 190 and the lower drum 10b.

The actuators 78 and 79 are, similar to the above example, disposed in the drum base 17 at the angular positions of 0° and 180° and moved vertically by motors (not shown).

In operation, counterclockwise rotation of the tape guide drum 10 under the first positioning control around the line L9 extending through the pivot 72 and the end of the actuator 74 is, as shown in FIG. 37(b), accomplished by moving the actuator 78 downward to bring its end into disengagement from the lower drum 10b and moving the actuator 79 upward to lift up the bottom of the lower drum 10b. Alternatively, clockwise rotation of the tape guide drum 10 under the first positioning control around the line L10 extending through the pivot 73 and the end of the actuator 75 is accomplished by moving the actuator 79 downward to bring its end into disengagement from the lower drum 10b and moving the actuator 78 upward to lift the bottom of the lower drum 10b.

The second positioning control is, as shown in FIG. 37(d), accomplished by moving both the actuators 78 and 79 downward to bring their ends into disengagement from the bottom of the lower drum 10b and moving either or both of the actuators 74 and 75 vertically to turn the tape guide drum 10 around the line L5 extending through the pivots 72 and 73.

The first and second positioning control may be achieved simultaneously in the following manner. After the tape guide drum is turned counterclockwise around the line L9 extending through the pivot 72 and the end of the actuator 74 (the stopper 74a of the actuator 76 is moved upward into engagement with the drum base 17, and the end of the actuator 76 is projected from the drum base 17 to be on a level with the pivots 72 and 73), the actuators 74 and 75 are moved downward to rotate the tape guide drum 10 around the line L11 extending through the pivot 72 and the end of the actuator 79. Additionally, after the tape guide drum 10 is turned clockwise around the line L10 extending through the pivot 73 and the end of the actuator 75 (the stopper 75a of the actuator 75 is moved upward into engagement with the drum base 17 and the end of the actuator 75 is projected from the drum base 17 to be on a level with the pivots 72 and 73), the actuators 74 and 75 are moved downward to rotate the tape guide drum 10 around the line L12 extending through the pivot 73 and the end of the actuator 78.

In the examples of the first and second orientation of the axis of rotation of the tape guide drum 10, the actuators 76, 74, and 75 have the stoppers 76a, 74a, and 75a, and maximum degrees to which these actuators are projected from the drum base 17 are limited to the height of the pivots 72 and 73. This means that the tape guide drum 10 is turned in the second positioning control only in a clockwise direction, as shown by the arrow AR6 in FIG. 37(c), from a position where the bottom of the lower drum 10b is in parallel to the drum base 17. The reason for this is that since, as already explained, if the heights of the guide rollers 13 and 14 are not adjusted correctly, the guide rollers 13 and 14 are in most cases shifted above a set height, the same tape-traveling path as that in an unadjusted VTR may be provided only by moving the tape guide drum 10 downward in the angular direction of 270°.

The examples of the first and second orientation of the axis of rotation of the tape guide drum 10 offer the following advantages. In a VTR constructed having the first and second examples of the orientation of the axis of rotation, the tape guide drum 10 is oriented correctly to a reference angular position where the drum shaft 11 is inclined at the angle of φ relative to the vertical line Z. Specifically, in record or self-record/reproduction operation, the tape guide drum 10 may be oriented at a desired angle by displacing the actuator 76 or both the actuators 74 and 75 upward until the stopper 76a or the stoppers 74a and 75a engage the drum base 17, and displacing the actuators 78 and 79 downward, as shown in FIG. 37(d), from the lower drum 10b, allowing the tape guide drum 10 to be urged downward by the spring 77 so as to have the bottom of the lower drum 10b coincide with the plane defined by the pivots 72 and 73 and the end of the actuator 76 or the plane defined by the pivots 72 and 73 and the actuators 74 and 75.

The fourth to seventh embodiments of the invention will be discussed below.

FIGS. 38(a) to 39(c) are 0°–180° cross sectional views showing modifications of the head drum assembly 100 common to the fourth to seventh embodiments.

The magnetic recording/reproducing apparatuses of the fourth to seventh embodiments are designed to operate in a trick play mode such as an FF reproduction mode, an FB reproduction mode, or STILL reproduction mode. In the FF reproduction mode, the magnetic tape T is reproduced while being transported forward at a higher speed than a standard reproduction speed. In the FB reproduction mode, the magnetic tape is reproduced while being transported backward. In the STILL reproduction mode, the magnetic tape T is reproduced while being maintained still. During reproduction, a positional relation between the rotary magnetic heads Ha and Hb and the magnetic tape T is changed according to the speed of tape transport in each of the reproduction modes to orient the rotary magnetic heads Ha and Hb to follow tracks recorded on the magnetic tape T correctly.

The head drum assemblies 100 shown in FIGS. 38(a) to 39(c) may be classified into two types.

Figure 38A:
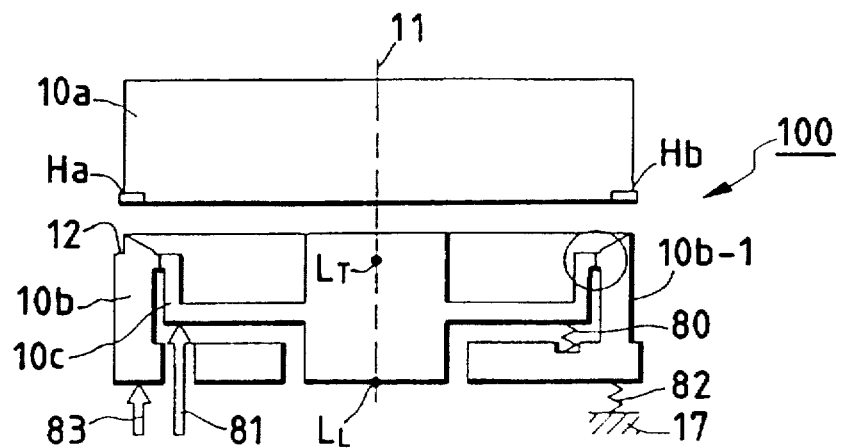
FIGS. 38(a) to 39(c) are 0°–180° cross sectional views showing modifications of a head drum assembly used in fourth to seventh embodiments.
Figure 38B:
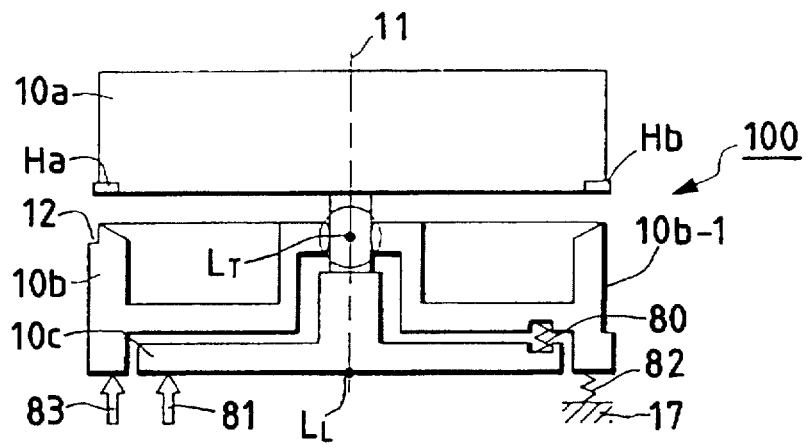
Figure 38C:
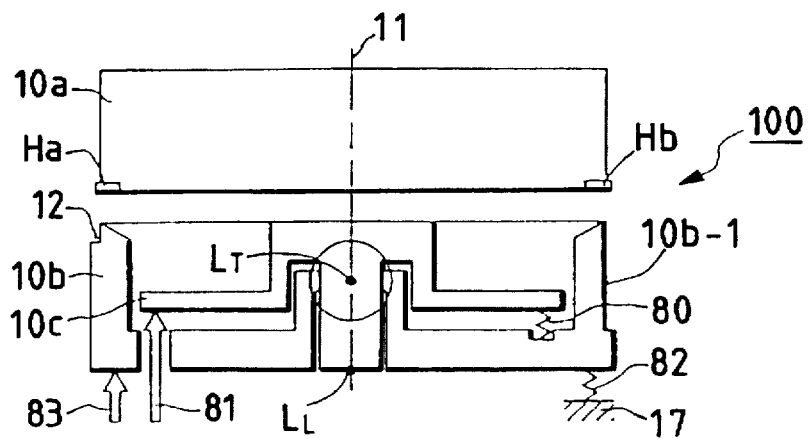

In each of the head drum assemblies 100 of the first type shown in FIGS. 38(a) to 38(c), the upper drum 10a having mounted thereon the magnetic heads Ha and Hb is rotated clockwise or counterclockwise, as viewed in the drawings, relative to the lower drum 10b having formed thereon the tape-wrapped surface 10b-1 and the lead 12 to correct a relative angular position of a rotation path of the magnetic heads Ha and Hb to the lead 12 of the lower drum 10b for matching the rotation path of the magnetic heads Ha and Hb with a track pattern on the magnetic tape T (hereinafter, this will be referred to as track correction). The rotation of the upper drum 10a in the track correction will cause the magnetic tape T to be drawn upward, thereby causing the lower edge Tb of the magnetic tape T to be separated from or pressed against the lead 12. To avoid such a drawback, the upper drum 10a is further rotated together with the lower drum 10b to correct a location of the lead 12 of the lower drum 10b to coincide with the lower edge Tb of the magnetic tape T (hereinafter, this will be referred to as lead correction). The results of tests performed by the inventors of this application show that a rotational direction of the upper drum 10a relative to the lower drum 10b for the track correction is identical with a rotational direction of the lower drum 10b for the lead correction, and a ratio of a rotational range of the upper drum 10a in the track correction to a rotational range of the lower drum 10b in the lead correction is about 1:1. Specifically, a ratio of the amount of rotation of the upper drum 10a for the track correction to the amount of rotation of the lower drum 10b for the lead correction on the basis of the drum base 17 is about 2:1 regardless of the speed of the magnetic tape T in the trick play mode.

The head drum assembly 100 shown in FIG. 38(a) has an intermediate member 10c connected to the upper drum 10a through the drum shaft 11 disposed within an inner wall of the lower drum 10b with a certain gap for orienting an axis of rotation (i.e., the line LT) of the upper drum 10a relative to the lower drum 10b. The track correction is achieved by turning the upper drum 10a along with the intermediate member 10c through a spring 80 acting on the intermediate member 10c and an actuator 81 in a clockwise or counterclockwise direction around the line LT perpendicular to the drawing at right angles to the drum shaft 11. The lead correction is achieved by turning the lower drum 10b along with the upper drum 10a through a spring 82 acting on the lower drum 10b and an actuator 83 in a clockwise or counterclockwise direction around the line LL perpendicular to the drawing at right angles to the drum shaft 11.

The head drum assemblies 100 shown in FIGS. 38(b) and 38(c) achieve the track correction and the lead correction in the same manner as in the head drum assembly in FIG. 38(a), but they are different from each other in orientation of an axis of rotation of the upper drum 10a relative to the lower drum 10b. Specifically, in the head drum assembly 100 shown in FIG. 38(b), the drum shaft 11 supporting the upper drum 10a and the intermediate member 10c engages a central bore of the lower drum 10b to orient an axis of rotation (i.e., the line LT) of the upper drum 10a relative to the lower drum 10b. In the head drum assembly 100 shown in FIG. 38(c), a shaft of the intermediate member 10c extending coaxially with the drum shaft 11 engages a central bore of the lower drum 10b to orient an axis of rotation (i.e., the line LT) of the upper drum 10a relative to the lower drum 10b.

Figure 39A:
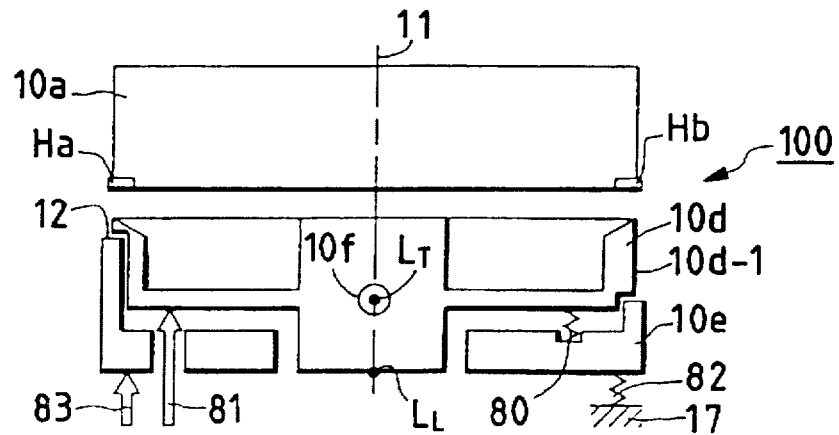
Figure 39B:
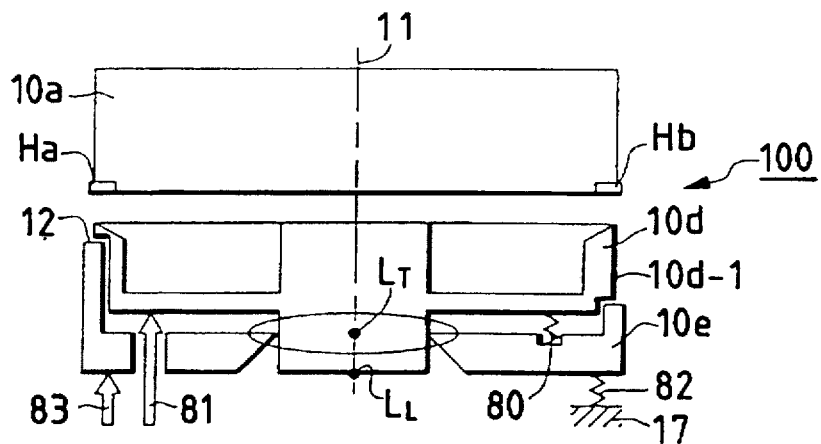
Figure 39C:
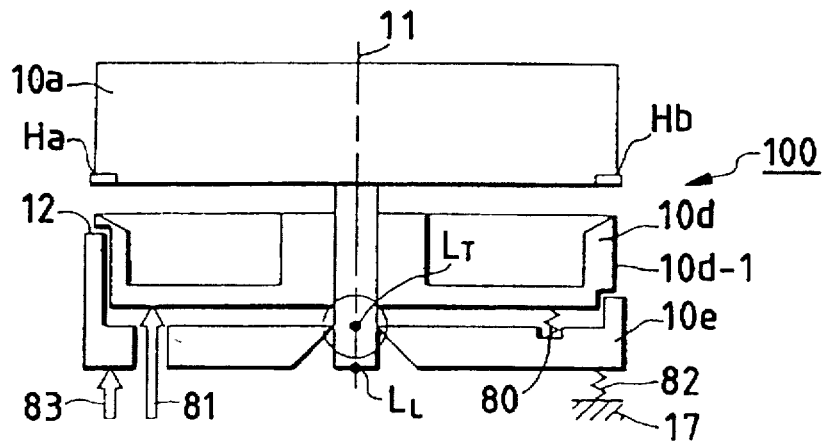

Each of the head drum assemblies 100 of the second type shown in FIGS. 39(a) to 39(c) includes a lower drum 10d having formed thereon a tape-wrapped surface 10d-1 and a lead ring 10e engaging a stepped outer surface of the lower drum 10d to form the lead 12.

In each of the head drum assemblies 100, the track correction is achieved by turning the upper drum 10a having mounted thereon the magnetic heads Ha and Hb along with the lower drum 10d in a clockwise or counterclockwise direction, as viewed in the drawing. The lead correction is achieved by turning the lead ring 10e, the lower drum 10d, and the upper drum 10a together in a clockwise or counterclockwise direction. A rotational direction of the upper drum 10a and the lower drum 10d relative to the lead ring 10e for the track correction is identical with a rotational direction of the lead ring 10e in the lead correction, and a ratio of a rotational range in the track correction to a rotational range in the lead correction is about 1:1. Specifically, a ratio of the amount of rotation of the upper drum 10a and the lower drum 10d for the track correction to the amount of rotation of the lead ring 10e for the lead correction on the basis of the drum base 17 is about 2:1 regardless of the speed of the magnetic tape T in the trick play mode.

In the head drum assembly 100 in FIG. 39(a), the lower drum 10d is suspended by a pin 10f fitted into the lead ring 10e. The track correction is achieved by turning the upper drum 10a along with the lower drum 10d through the spring 80 acting on the lower drum 10e and the actuator 81 in a clockwise or counterclockwise direction around the line LT defined by the pin 10f, extending perpendicular to the drawing at right angles to the drum shaft 11. The lead correction is achieved by turning the lead ring 10e along with the lower drum 10d and the upper drum 10a through the spring 82 acting on the lead ring 10d and the actuator 82 in a clockwise or counterclockwise direction around the line TL extending perpendicular to the drawing at right angles to the drum shaft 11.

The head drum assemblies 100 shown in FIGS. 39(b) and 39(c) achieve the track correction and the lead correction in the same manner as in the head drum assembly in FIG. 39(a), but they are different from each other in orientation of an axis of rotation of the lower drum 10d relative to the lead ring 10e. Specifically, in the head drum assembly 100 shown in FIG. 39(b), a shaft of the lower drum 10d extending coaxially with the drum shaft 11 engages a central bore formed in the lead ring 10e to orient an as of rotation (i.e., the line LT) of the upper drum 10a relative to the lead ring 10e. In the head drum assembly 100 shown in FIG. 39(c), the drum shaft 11 supporting the upper drum 10a and the lower drum 10d engages a central bore of the lead ring 10e to orient an axis of rotation (i.e., the line LT) of the upper drum 10a relative to the lead ring 10e.

While the present invention may be used with any of the head drum assemblies 100 shown in FIGS. 38(a) to 39(c), the fourth to sixth embodiments, as will be described below, use the head drum assembly 100 in FIG. 39(b), and the seventh embodiment uses the head drum assembly 100 in FIG. 38(c).

Figure 40A:
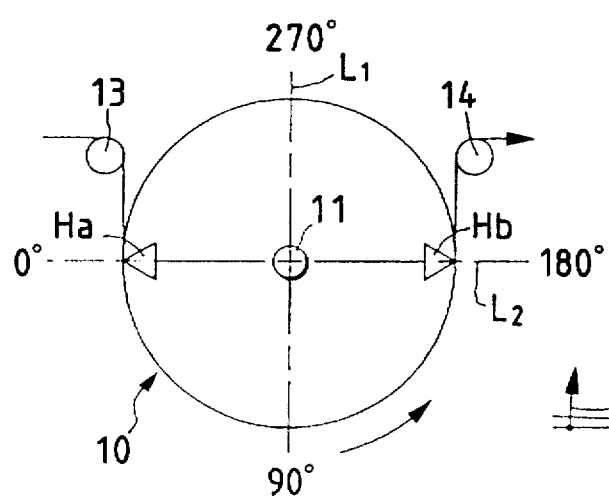
FIG. 40(a) is a plan view which shows a tape guide head drum used in fourth and fifth embodiments.
Figure 40C:
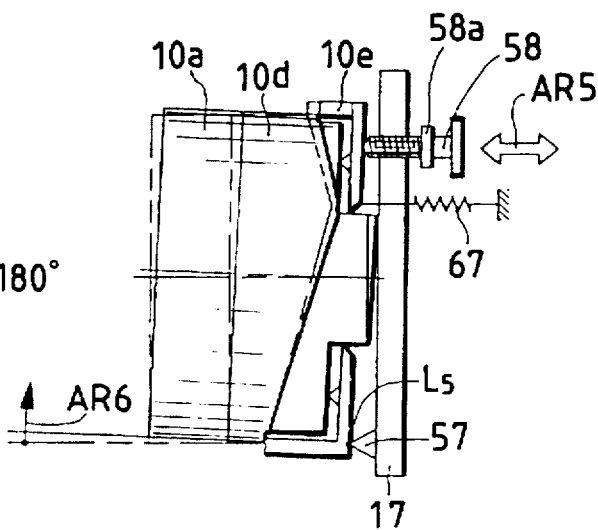
FIG. 40(c) is a side view of FIG. 40(a), as viewed from an angular position of 180°.
Figure 40B:
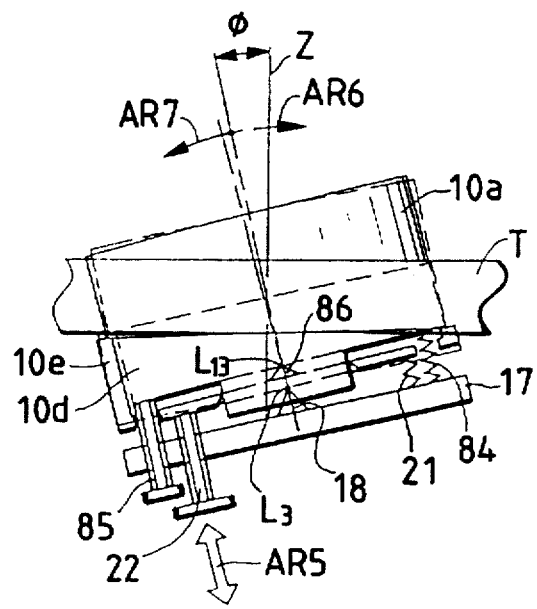
FIG. 40(b) is a front view of FIG. 40(a), as viewed from an angular direction of 90°.

FIGS. 40(a) to 40(c) show the first and second positioning control performed in the fourth embodiment and the fifth embodiment which will be described later. FIG. 40(a) is a plan view. FIG. 40(b) is a front view, as viewed from the angular direction of 90°. FIG. 40(c) is a side view, as viewed from the angular position of 180°.

The first positioning control performed in the fourth and fifth embodiments is, as shown in FIG. 40(b), accomplished by turning the tape guide drum 10 consisting of the lead ring 10e, the upper drum 10a, and the lower drum 10d around the line L3 extending perpendicular to the drawing at right angles to the drum shaft 11, defined by the pivot 18 disposed between the drum base 17 and the lead ring 10e.

The second positioning control is, as shown in FIG. 40(c), accomplished by turning the tape guide drum 10 around the line L5 extending perpendicular to the drawing at right angles to the line L3, defined by the pivot 57 disposed between the drum base 17 and the lead ring 10e.

As shown in FIGS. 40(a) to 40(c), a spring 21 is disposed between the drum base 17 and the lead ring 10e at the angular position of 180° to urge the lead ring 10e counterclockwise around the pivot 18. An actuator 22 is disposed in the drum base 17 at the angular position of 0° to be movable vertically, as shown by the arrow AR5. Therefore, the upward movement of the actuator 22 causes the lead ring 10e to be turned clockwise, as shown by the arrow AR6, against a spring force of the spring 21. The downward movement of the actuator 22 causes the lead ring 10e to be turned counterclockwise, as shown by the arrow AR7, with the aide of the spring force of the spring 21. This achieves the first positioning control.

A spring 67 is disposed between the drum base 17 and the lead ring 10e at the angular position of 270° to turn the lead ring 10e clockwise around the pivot 57. An actuator 58 is disposed in the drum base 17 which moves vertically, as shown by the arrow AR5 at the angular position of 270°. Therefore, the second positioning control is achieved by turning the actuator 58 upward to turn the lead ring 10e counterclockwise against a spring force of the spring 67 or by turning the actuator downward to turn the lead ring 10e clockwise with the aide of the spring force of the spring 67.

The track correction and the lead correction in the trick play mode such as the FF reproduction mode or the FB reproduction mode is achieved in the following manner. In the FF reproduction mode, the track correction is achieved by moving the actuator 85 upward to turn the upper drum 10a along with the lower drum 10d clockwise around the line L13 perpendicular to the drawing of FIG. 40(b), defined by the pivot 86 against a spring force of the spring 84. The lead correction is achieved by moving the actuator 22 to turn the lead ring 10e clockwise around the line L3 defined by the pivot 18. In the FB reproduction mode, the track correction is achieved by moving the actuator 85 downward to turn the upper drum 10a and the lower drum 10d counterclockwise. The lead correction is achieved by moving the actuator 22 downward to turn the lead ring 10e counterclockwise.

FIGS. 41 to 45 shows a structure of the head drum assembly 100 in detail according to the fourth embodiment. The same reference number as employed in the above embodiments refer to the same parts.

Figure 41:
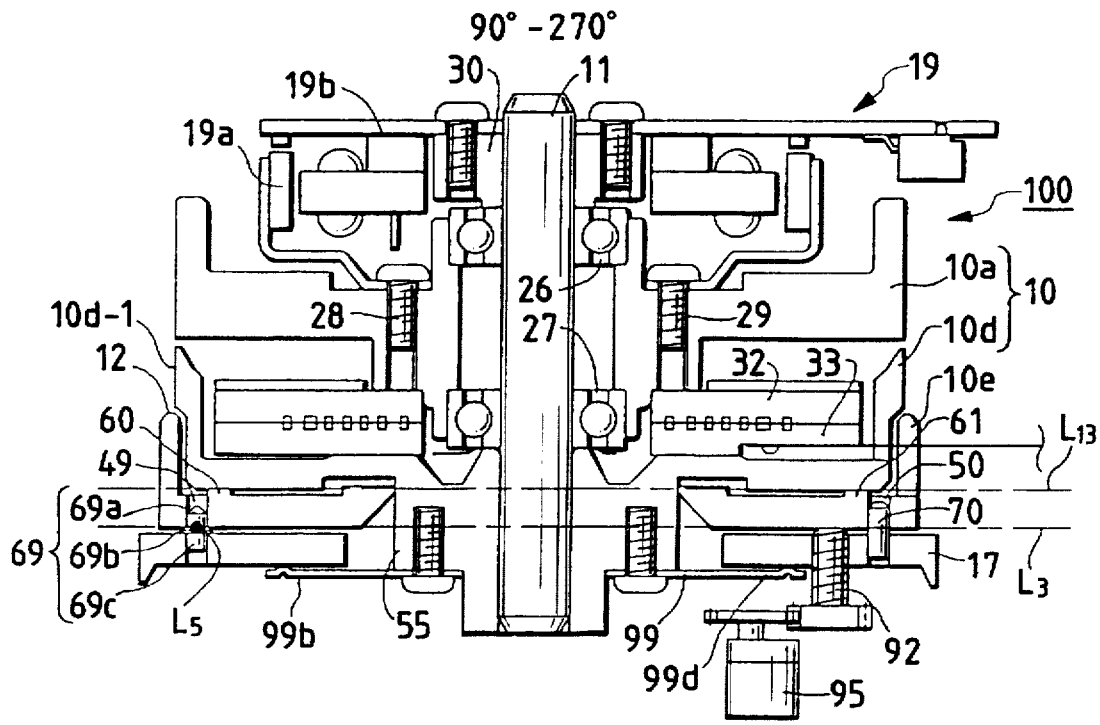
FIG. 41 is a 90°–270° cross sectional view showing a head drum assembly according to a fourth embodiment.

The head drum assembly 100, as shown in FIG. 41, includes the tape guide drum 10 consisting of the upper drum 10a, the lower drum 10d, the lead ring 10e, and the drum motor 19. The upper drum 10a and the lower drum 10b are supported by the drum shaft 11 coaxially with each other. The lead ring 10e has a peripheral wall engaging a stepped or recessed portion formed in an outer surface of the lower drum 10e with any play to form the lead 12 extending helically to define the tape-wrapped surface 10d-1 on the lower drum 10e.

The drum shaft 11 is press-fitted into the lower drum 10d and supports at its end the upper drum 10a rotatably through bearings 26 and 27. The upper drum 10a, as clearly shown in FIG. 42, has mounted thereon the magnetic heads Ha and Hb at locations diametrically opposed to each other. The drum motor 19 includes a rotor 19a and a stator 19b. The rotor 19a is secured on the upper drum 10a through screws 28 and 29. The stator 19b is secured on the drum shaft 11 by a set screw 31 through a collar 30.

The head drum assembly 100 also includes a rotatable transformer 32 and a stationary transformer 33. The rotatable transformer 32 is secured on the upper drum 10a, while the stationary transformer 33 is fixed on the lower drum 10b for establishing transmission of signals between transformers 32 and 33. Lead wires 34 (only one is shown for the brevity of illustration) extend from the stationary transformer 33.

Figure 42:
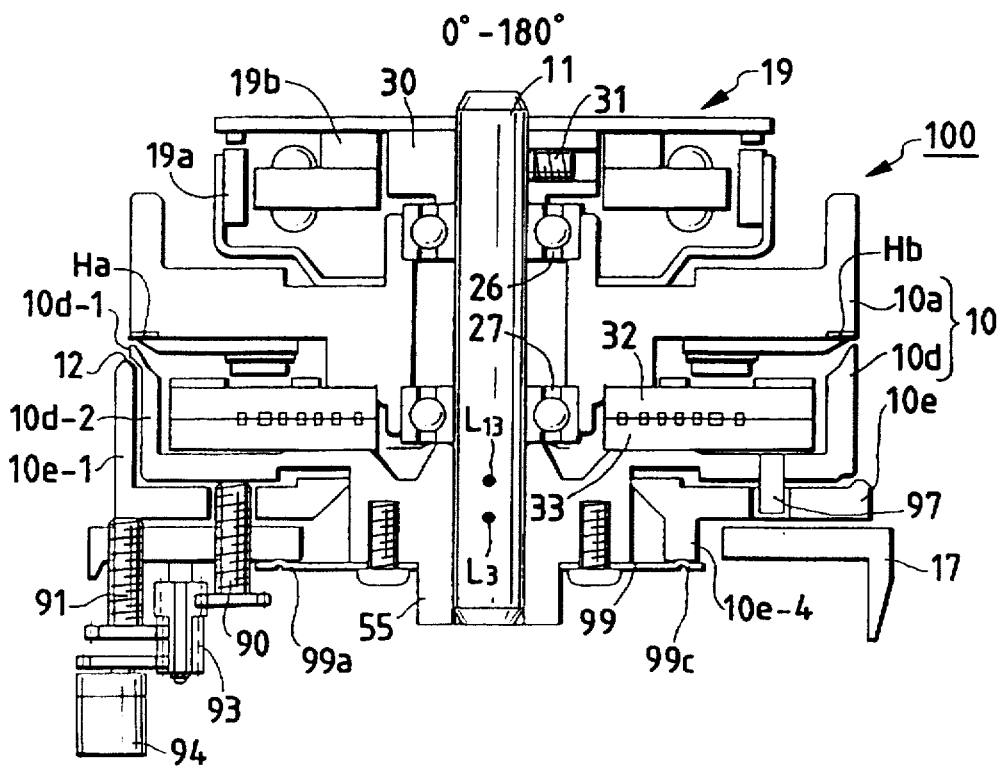
FIG. 42 is a 0°–180° cross sectional view showing the head drum assembly in FIG. 41.
Figure 44:
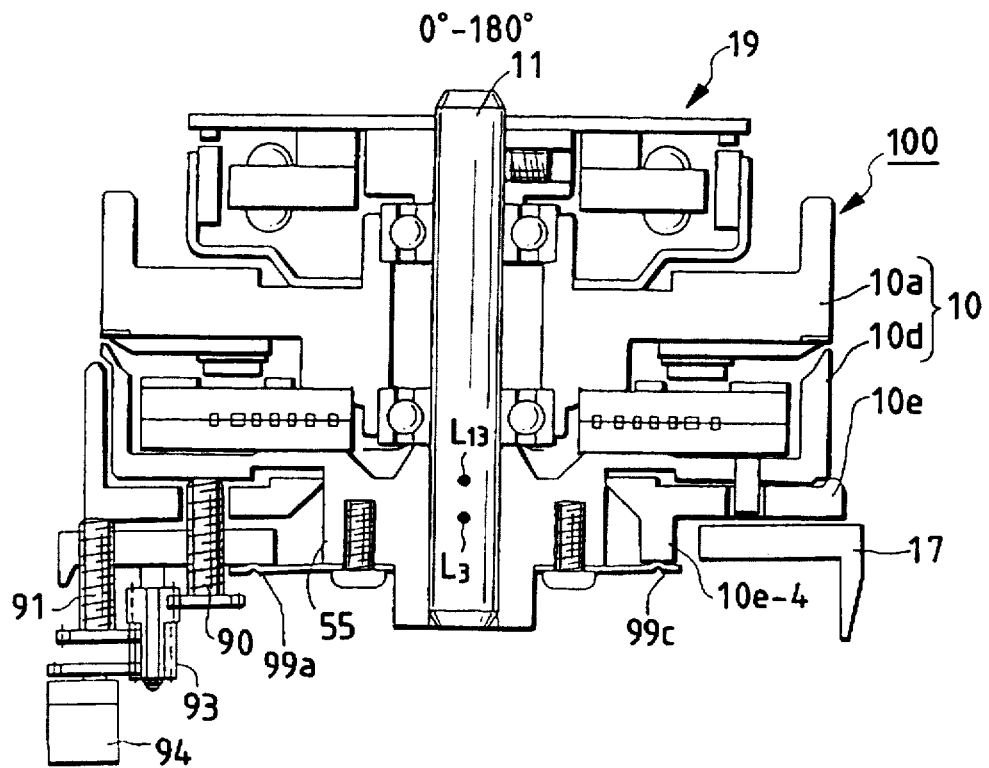
FIG. 44 is a 0°–180° cross sectional view showing the head drum in FIG. 41 under a first positioning control.
Figure 45:
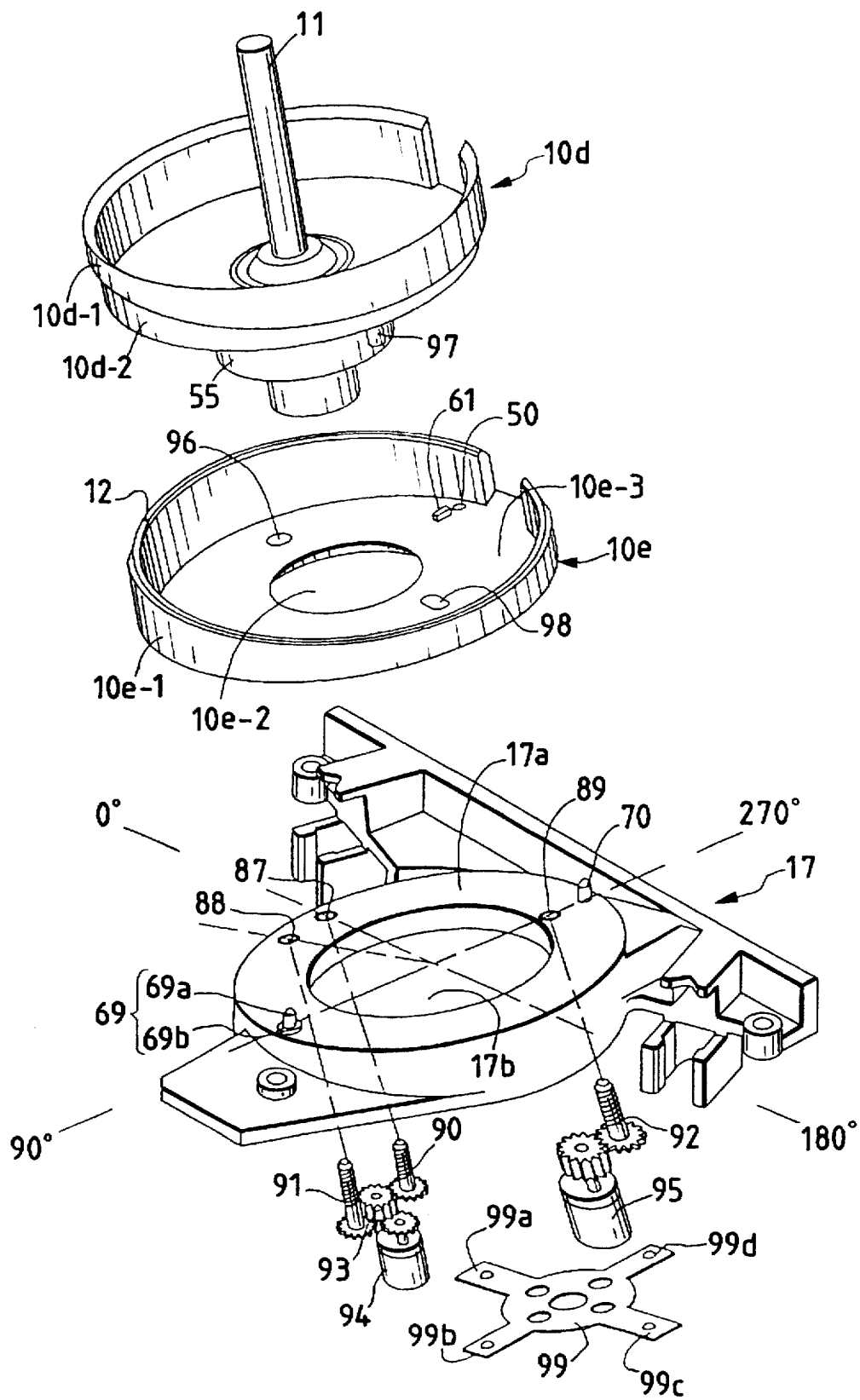
FIG. 45 is an exploded view showing the head drum assembly in FIG. 41.

The head drum assembly 100 thus constructed is mounted on the drum base 17 secured on a chassis (not shown). The drum base 17, as shown in FIGS. 41 and 45, has formed therein three threaded holes 87, 88, and 89 at the angular positions of 0°, about 30°, and 270°, respectively, into which screws with gears 90, 91, and 92 are inserted. FIGS. 42 and 44 are 0°–180° cross sectional views, but show the screw 91 arranged at the angular position of about 30° for convenience. The screws 90 and 91 are rotated simultaneously by the motor 94 through an idle gear 93 to be moved vertically at a speed ratio of 2:1.

The drum base 17 includes, as shown in FIG. 45, a pair of support pints 69 and 70 which are fitted into the upper surface 17a at the angular positions of 90° and 270°, respectively. The support pins 69 and 70 are similar in structure to those shown in FIG. 36. The support pins 69 and 70 are inserted into the holes 49 and 50 formed in the lead ring 10e with given gaps to define an axis of rotation of the lead ring 10e along the line L3 extending through the support pins 69 and 70.

The lead ring 10e, as shown in FIG. 45, includes a cylindrical portion 10e-1 formed thereon the lead 12 for guiding the lower edge Th of the magnetic tape T and a bottom portion 10e-3 having formed therein a central opening 10e-2 defined by inner wall which is of knife-edge shape in cross section, as clearly shown in FIGS. 41 to 44. The bottom portion 10e-3 has a hole 96 through which the screw 90 is inserted, an elongated hole 98 into which a positioning pin 97 installed in the lower drum 10d is fitted, and support protrusions 60 and 61 at the angular positions of 0°, 180°, 90°, 270°, respectively. The lower drum 10d has a central boss 55 fitted into the central opening 10e-2 of the lead ring 10e with a certain clearance and a recessed or small-diameter portion 10d-2 fitted into the cylindrical portion 10e-1 of the lead ring 10e with a certain clearance. The lower drum 10d is supported on the bottom of the lead ring 10e by the support protrusions 60 and 61 and the end of the screw 90 projecting through the through hole 96.

A plate spring 99 is installed on the central boss 55 of the lower drum 10d using screws. The plate spring 99 includes four arms 99a, 99b, 99c, and 99d extending radially at regular intervals. The arms 99a, 99b and 99d engage the bottom of the drum base 17 at the angular positions of 0°, 90°, and 270° to urge the lower drum 10d and the lead ring 10e downward, while the arm 99c, as shown in FIG. 42, engages at the angular position of 180° a protrusion 10e-4 formed on the bottom of the lead ring 10e to urge the lead ring 10e clockwise, as viewed in the drawing of FIG. 42.

In operation, the first positioning control is, as shown in FIG. 44, accomplished by turning on the motor 94 to move the screw 91 vertically to rotate the tape guide drum 10 and the lead ring 10e around the line L3. When the screw 91 is moved upward under condition that the screw 92 is projected from the upper surface 17a by a distance equal to the thickness of the spacer 69b of the support pin 69, it will cause the lead ring 10e to be rotated clockwise against a spring force of the arm 99c of the plate spring 99. When the screw 91 is moved downward, it will cause the lead ring 10e to be rotated counterclockwise with the aide of the spring force of the arm 99c. The arm 99c corresponds to the spring 21 in FIG. 40(b).

Figure 43:
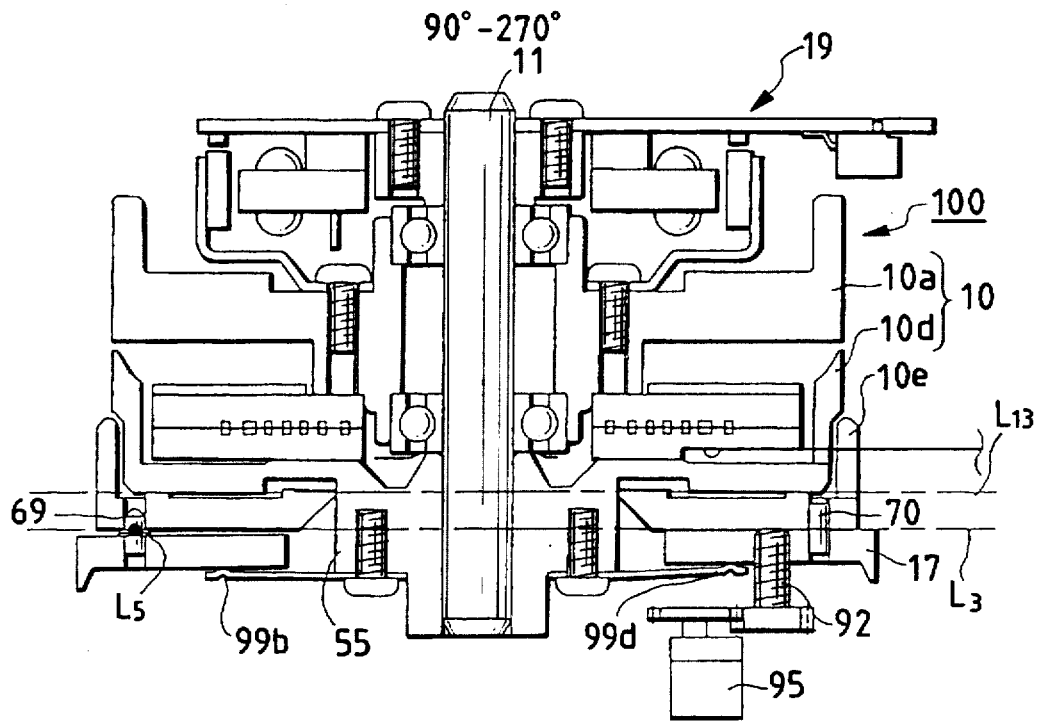
FIG. 43 is a 90°–270° cross sectional view showing the head drum assembly in FIG. 41 under a second positioning control.

The second positioning control is, as shown in FIG. 43, accomplished by turning on the motors 95 and 94 simultaneously to move the screws 92 and 91 vertically to rotate the tape guide drum 10 and the lead ring 10e around the line L5. When the screws 92 and 91 are moved downward in a given speed ratio, it will cause the lead ring 10e to be rotated clockwise with the aide of a spring force of the arm 99d of the plate spring 99. Conversely, when the screws 92 and 91 are moved upward in a given speed ratio, it will cause the lead ring 10e to be rotated counterclockwise against the spring force of the arm 99d of the plate spring 99. The arm 99d corresponds to the spring 67 in FIG. 40(c).

The speed ratio of the screw 92 to the screw 91 during the vertical movement may be determined so as to orient a plane defined by three points: the end of the screw 92, the end of the screw 91, and the spacer 69b of the support pin 69 to coincide with the bottom of the lead ring 10e when the tape guide drum 10 and the lead ring 10e are rotated through a desired angle around the line 5.

When either of the first positioning control and the second positioning control is performed, the screw 90 is moved along with the screws 91 in the same direction by a distance of about twice that of the screw 91 to turn the lower drum 10d and the upper drum 10a relative to the lead ring 10e around the line L13 (i.e., the track correction), however; it has been found by the inventors of this application that such movement of the screws 90 and 91 can achieve the first and second positioning control as long as the degree to which tracks of a magnetic tape are curved is smaller than a given value.

The reason for locating the screw 91 at the angular position of 30° is to minimize the influence of rotation of the lower drum 10d and the upper drum 10a on the lead ring 10e during the second positioning control. If the screw 91 is located at the angular position of −30° (i.e., 330°), it is necessary to increase the amount of rotation of the upper drum 10a and the lower drum 10e relative to the lead ring 10e. Specifically, assuming that the threaded holes 87, 88, and 89 and the support pins 69 are located at regular intervals away from the center of the central opening 17b of the drum base 17, an interval ratio among them, as viewed from the angular direction of 180°, will be 1 (an interval between the support pin 69 and the threaded hole 88): 2 (an interval between the support pin 69 and the threaded hole 87): 4 (an interval between the support pin 69 and the threaded hole 89). Therefore, when the screw 92 is moved downward a distance of 4 in the second positioning control, the screw 91 must be moved downward a distance of 1. Since the speed ratio of the screw 91 to the screw 90 moved by the motor 94 is, as mentioned above, 1:2, the screw 90 is moved downward a distance of 2. Alternatively, if the threaded hole 88 into which the screw 91 is inserted is formed at the angular position of −30° (i.e., 330°), a ratio of an interval between the support pin 69 and the threaded hole 87: an interval between the support pin 69 and the threaded hole 88: an interval between the support pin 69 and the threaded hole 89 will be 2:3:4. Therefore, when the screw 92 is moved downward a distance 4 in the second positioning control, the screw 91 must be moved downward a distance of 3. This will cause the screw 90 to be moved downward a distance of about 6, so that an inclination of the lower drum 10e and the upper drum 10a relative to the lead ring 10e will be increased as compared with when the threaded hole 88 is formed at the angular position of 30°.

In the above discussion, the first positioning control and the second positioning control are performed independently, but it is possible to perform the first and second positioning control simultaneously by selectively changing displacements of the screws 91 and 89 from the upper surface 17a of the drum base 17.

In this embodiment, the screws 90 and 91 are both moved by the motor 94, but they may alternatively be moved by separate motors. In this case, it is advisable that a displacement of the screw 90 be controlled according to movement of the screws 91 and 92 so as to prevent the lower drum 10d and the upper drum 10a from being inclined to the lead ring 10e.

The trick play mode such as the FF reproduction mode or the FB reproduction mode is achieved by moving the screws 90 and 91 vertically through the motor 94 under condition that the screw 92 is projected from the upper surface 17a by a distance equal to the thickness of the spacer 69b of the support pin 69. Specifically, in the FF reproduction mode, the screws 90 and 91 are moved upward, as viewed in FIG. 42, through the motor 94 in a speed ratio of 2:1 to turn the lower drum 10d and the lead ring 10e clockwise. In the FB reproduction mode, the screws 90 and 91 are moved downward in a speed ratio of 2:1 to turn the lower drum 10d and the lead ring 10e counterclockwise.

FIGS. 46 to 50 show a structure of the head drum assembly 100 in detail according to the fifth embodiment which is different from the fourth embodiment in that the sub-base 41 is interposed between the lead ring 10e and the drum base 17, the first positioning control, the track correction, and the lead correction are achieved by turning the lead ring 10e and the lower drum 10d relative to the sub-base 41, and the second positioning control is achieved by turning the sub-base 41 relative to the drum base 17. Other arrangements are the same as those in the fourth embodiment.

Figure 46:
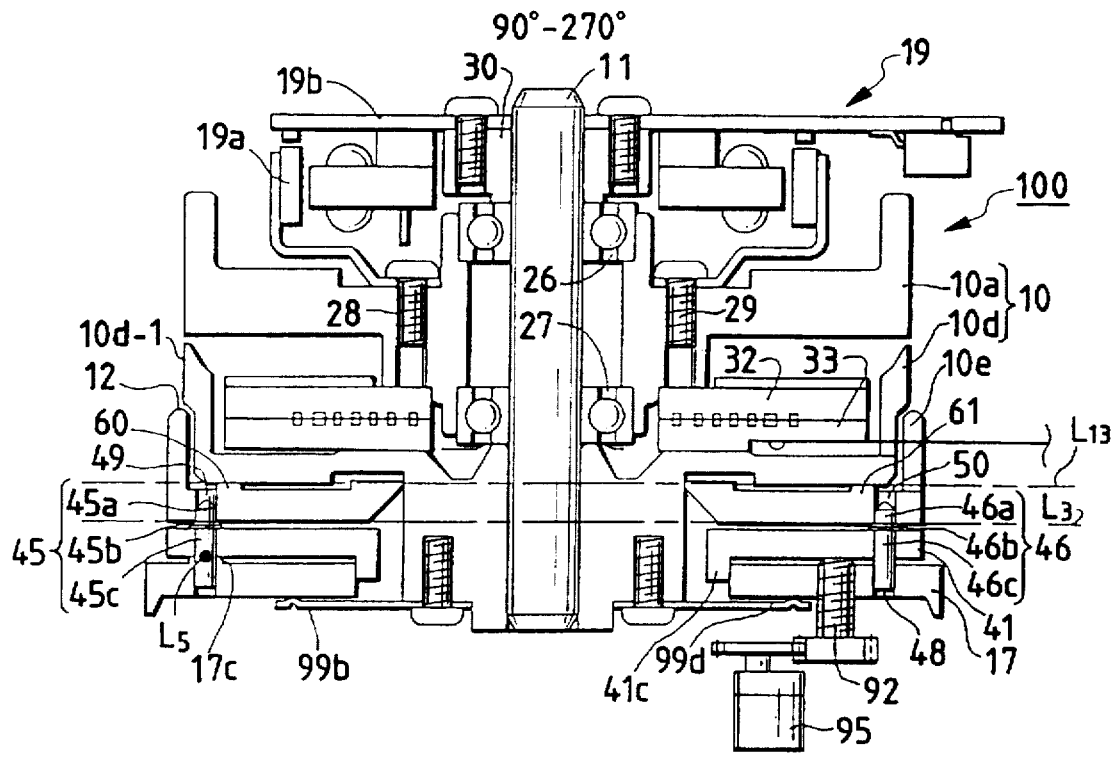
FIG. 46 is a 90°–270° cross sectional view showing a head drum assembly according to a fifth embodiment.
Figure 47:
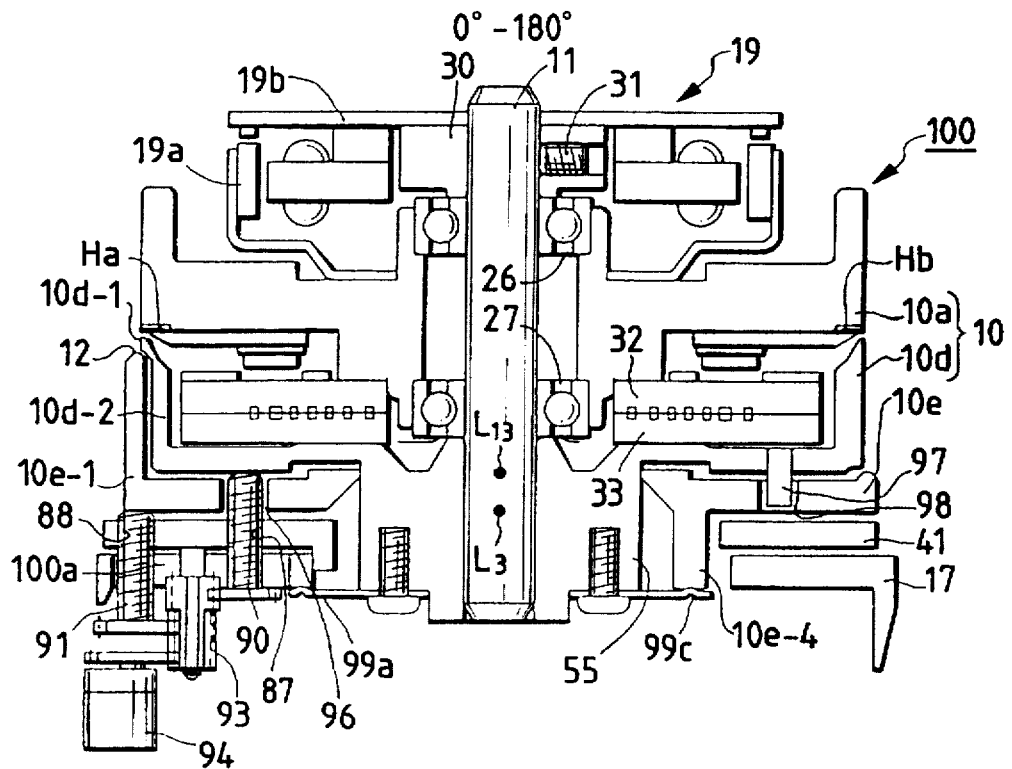
FIG. 47 is a 0°–180° cross sectional view showing the head drum assembly in FIG. 46.
Figure 48:
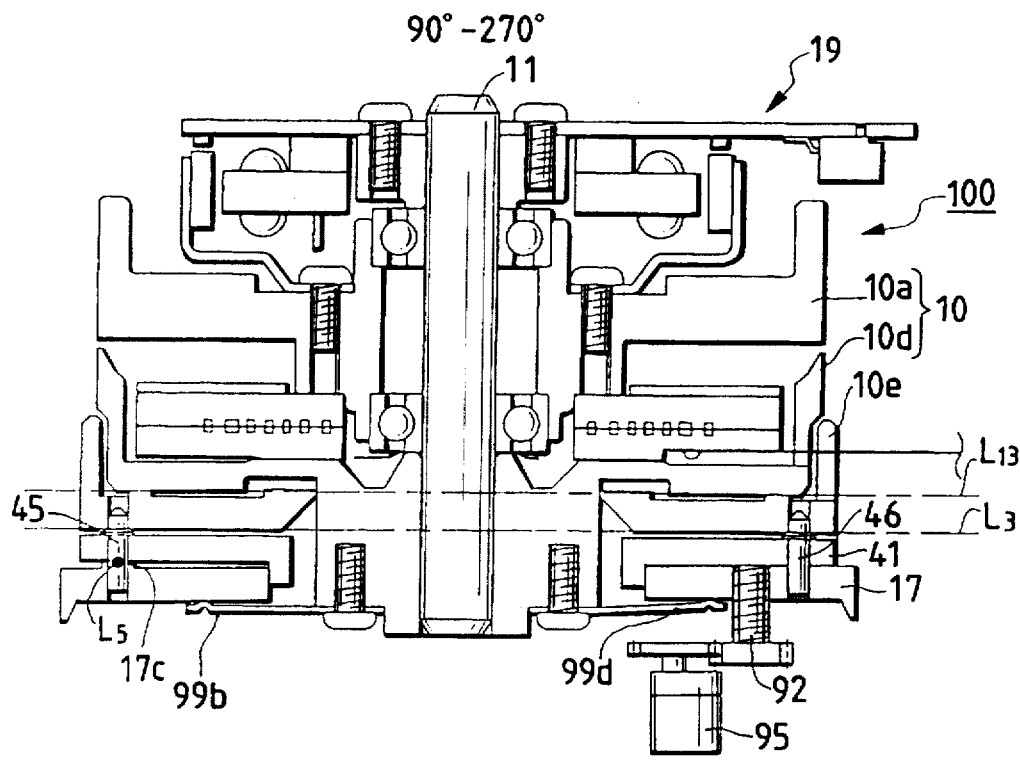
FIG. 48 is a 90°–270° cross sectional view showing the head drum assembly in FIG. 46 under a second positioning control.
Figure 49:
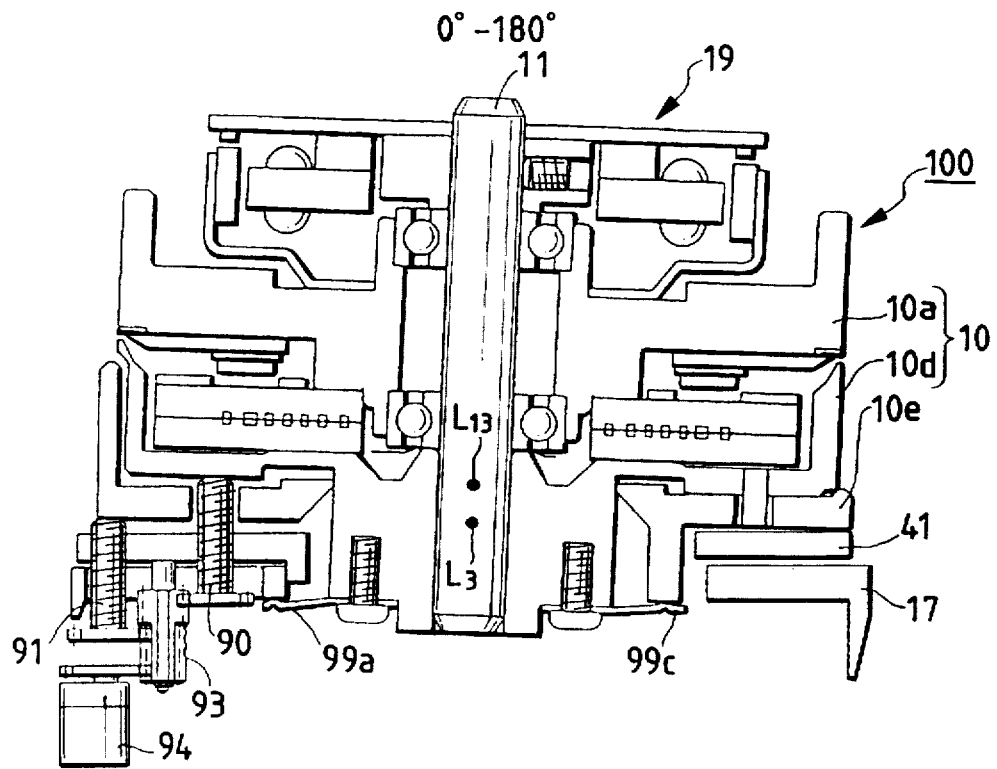
FIG. 49 is a 0°–180° cross sectional view showing the head drum in FIG. 46 under a first positioning control.
Figure 50:
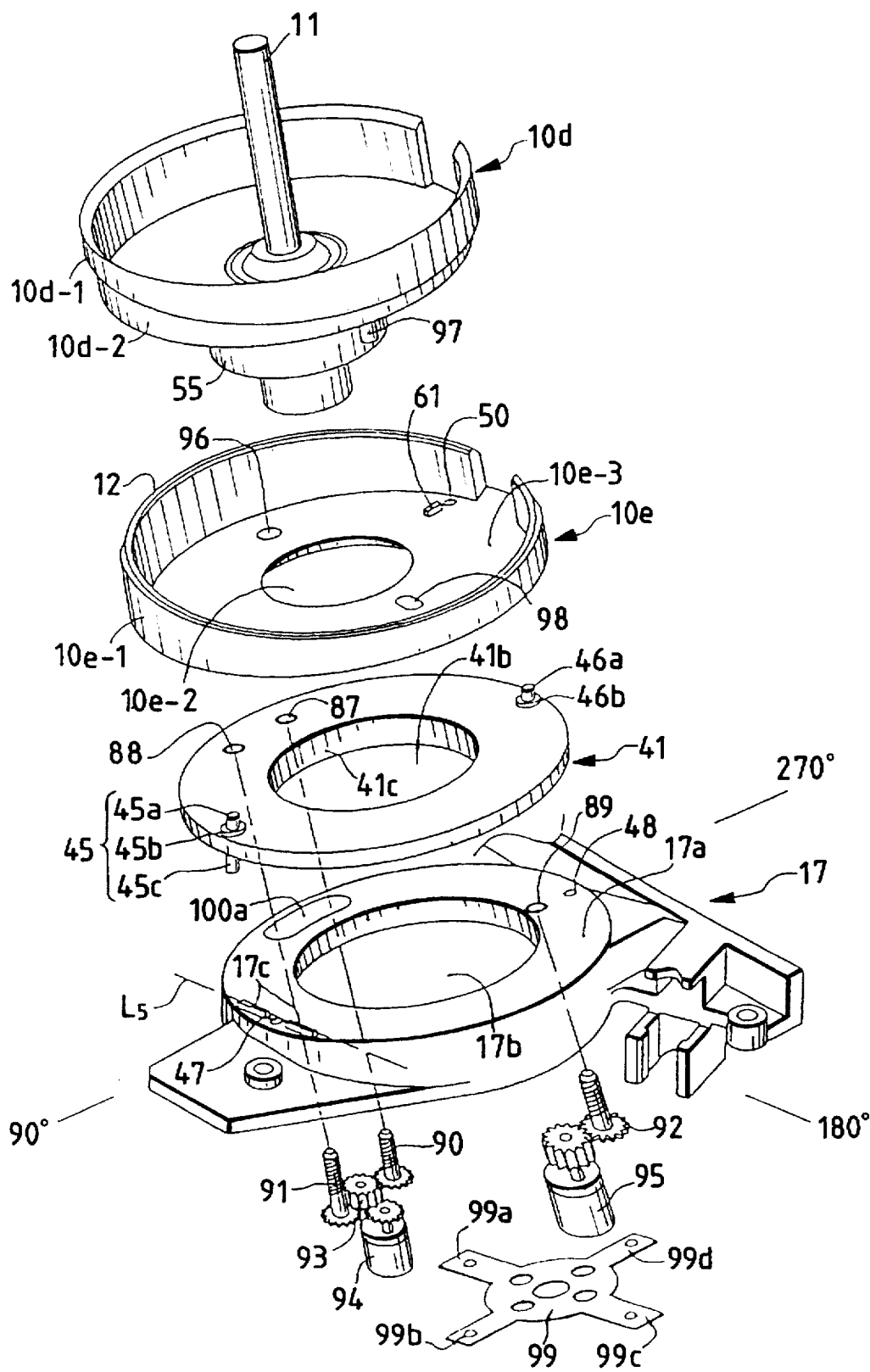
FIG. 50 is an exploded view showing the head drum assembly in FIG. 46.

The head drum assembly 100 is mounted on the drum base 17 through the sub-base 41. The drum base 17, as shown in FIGS. 46, 50, has an elongated groove 100a, through holes 47 and 48, a threaded hole 89, and ribs 17c. The groove 10a is formed at the angular position of 0°. The through hole 48 and the threaded hole 89 are formed at the angular position of 270°. The through hole 47 and the ribs 17c are formed at the angular position of 90°. The ribs 17c are projected from the upper surface 17a at a given height.

The screw with a gear 92 is disposed in the drum base 17 which engages the threaded hole 89 with its end projecting from the upper surface 17a in engagement with the sub-base 41. The screw 92 is, as shown in FIG. 46, moved vertically by the motor 95.

The support pins 45 and 46, which are similar to those in the first embodiment, are press-fitted into the sub-base 41 at locations diametrically opposed with each other at angular positions of 90° and 270°. The support pins 45 and 46 include upper shafts 45a and 46a, spacers 45b and 46b, and lower shafts 45c and 46c, respectively. The lower shafts 45c and 46c are inserted into the sub-base 41 until the spacers 45b and 46b contact the upper surface 41a, and slidably engage through holes 47 and 48 formed in the drum base 17 at angular positions of 90° and 270° for restricting rotation of the sub-base 41. Clearances between the lower shafts 45c and 46c of the support pins 45 and 46 and the through holes 47 and 48 are determined so as to allow the sub-base to be rotated over a given angular range around the line L5 defined by the ribs 17c. The sub-base 41, as can be seen in FIG. 50, has an inner circular wall 41c defining an opening 41b at the center thereof. The inner circular wall 41, as shown in FIG. 46, partially projects downward in engagement with an inner wall 17b of the drum base 17 with a given clearance enough to allow the sub-base 41 to be rotated over a given angular range around the line L5.

The screw 90 is inserted into the threaded hole 87 through the groove 10a so that its end may engage the bottom of the lower drum 10d through the hole 96 formed in the lead ring 10e. The screw 91 is inserted into the threaded hole 88 through the groove 100a so that its end may engage the bottom of the lead ring 10e. The screws 90 and 91 are moved vertically by the motor 94.

The lead ring 10e, as shown in FIG. 50, has formed therein through holes 49 and 50 at the angular positions of 90° and 270° into which the upper shafts 45a and 46a of the support pins 45 and 46 are inserted to define the line L3 around which the head drum assembly 100 is rotated. The lower drum 10d has the central boss 55 which is fitted into the central opening 10e-2 of the lead ring 10e with a given clearance and also fitted into the central opening 41b of the sub-base 41 and the central opening 17b of the drum base 17 with given clearances. A plate spring 99 is installed on the central boss 55 of the lower drum 10d using screws. The plate spring 99 includes four arms 99a, 99b, 99c, and 99d extending outward at regular intervals. The arms 99a, 99b and 99d engage the bottom of the drum base 17, while the arm 99c engages the protrusion 10e-4 formed on the bottom of the lead ring 10e for urging the head drum assembly 100 downward.

FIGS. 51(a) to 58(c) show a structure of the head drum assembly 100 according to the sixth embodiment which is different from the fourth embodiment in location of axes of rotation of the tape guide drum 10 and the lead ring 10e. Other arrangements are identical, and explanation thereof in detail will be omitted here.

Figure 51A:
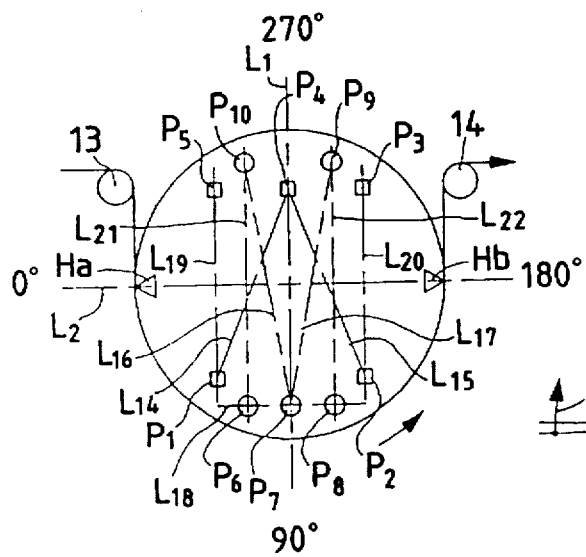
FIG. 51(a) is a plan view which shows a tape guide head drum according to a sixth embodiment.

In FIG. 51(a), squares P1 to P5 indicate pivots forming axes of rotation of the lead ring 10e between the lower drum 10d and the lead ring 10e, and while circles P6 to P10 indicate pivots forming axes of rotation of the tape guide drum 10 between the drum base 17 and the lower drum 10d.

As a first example of location of the axis of rotation, the positioning control of the tape guide drum 10 and the lead ring 10e around the line L14 defined by the pivots P1 and P4 and the line L15 defined by the pivots P2 and P4 between the lower drum 10d and the lead ring 10e and around the line L17 defined by the pivots 7 and 9 and the line L16 defined by the pivots 7 and 10 between the drum base 17 and the lower drum 10d, will be first described below.

The lower drum 10d is supported on the pivots P7, P9, and P10 disposed between the drum base 17 and the lower drum 10d and urged in a direction indicated by the arrow AR9. The pivots P9 and P10 are formed by actuators movable in a direction indicated by the arrow AR5.

The lead ring 10e is urged by springs 150 and 151 to bring the pivots P1, P2, and P4 into engagement with the lower drum 10d.

The drum base 17 has disposed therein the actuators 129 and 131 at the angular positions of 0° and 180°. The lead ring 10e has disposed therein the actuators 130 and 132 at the angular positions of 0° and 180°. The first positioning control (corresponding to the track correction and the lead correction in the FB reproduction mode) is accomplished by moving the actuators 129 and 130 downward while moving the actuators 131 and 132 upward to rotate the tape guide drum 10 and the lead ring 10e counterclockwise. The first positioning control achieved by clockwise rotation of the tape guide drum 10 and the lead ring 10e or the track correction and the lead correction in the FF reproduction mode have an inverse relationship to the above, and explanation thereof will be omitted here.

Figure 51C:
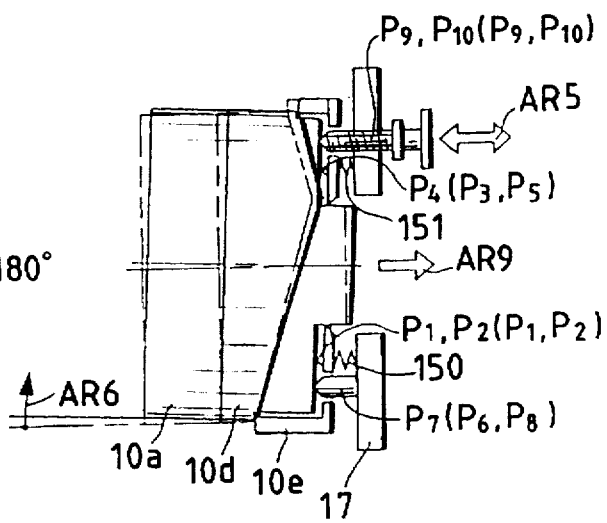
FIG. 51(c) is a side view of FIG. 51(a), as viewed from an angular position of 180°.
Figure 51B:
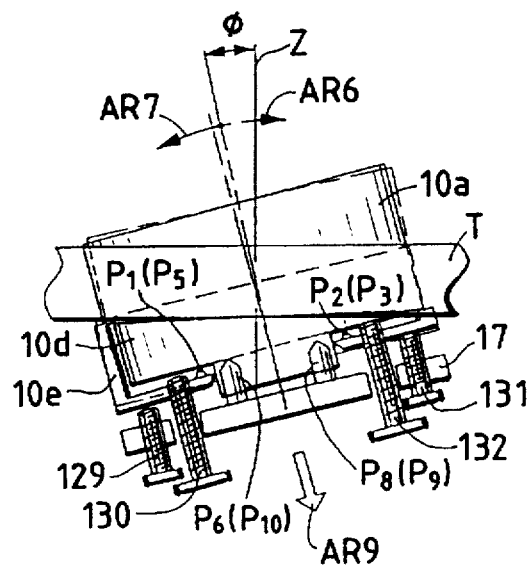
FIG. 51(b) is a front view of FIG. 51(a), as viewed from an angular direction of 90°.

The second positioning control is, as shown in FIG. 51(c), accomplished by moving the pivots P9 and P10 in synchronization with each other to rotate the tape guide drum 10 and the lead ring 10e around the pivot P7.

Next, as a second example of the axis of rotation, the positioning control of the tape guide drum 10 and the lead ring 10e around the line L19 defined by the pivots P1 and P5 and the line L20 defined by the pivots P2 and P3 arranged between the lower drum 10d and the lead ring 10e and around the line L21 defined by the pivots 6 and 10 and the line L22 defined by the pivots 8 and 9 between the drum base 17 and the lower drum 10d, will be described below.

The lower drum 10d is supported on the pivots P6, P8, P9, and P10 disposed between the drum base 17 and the lower drum 10d and urged in a direction indicated by the arrow AR9. The pivots P9 and P10 are provided by actuators movable in a direction indicated by the arrow AR5.

The lead ring 10e is urged by springs 150 and 151 to bring the pivots P1, P2, P3, and P5 into engagement with the lower drum 10d.

The first positioning control, the second positioning control, and a structure of the head drum assembly 100 achieving the track correction and the lead correction in the above described first example of the axis of rotation will be discussed below.

The head drum assembly 100 is similar in structure to that in the fourth embodiment, and explanation thereof will be omitted here.

Figure 52:
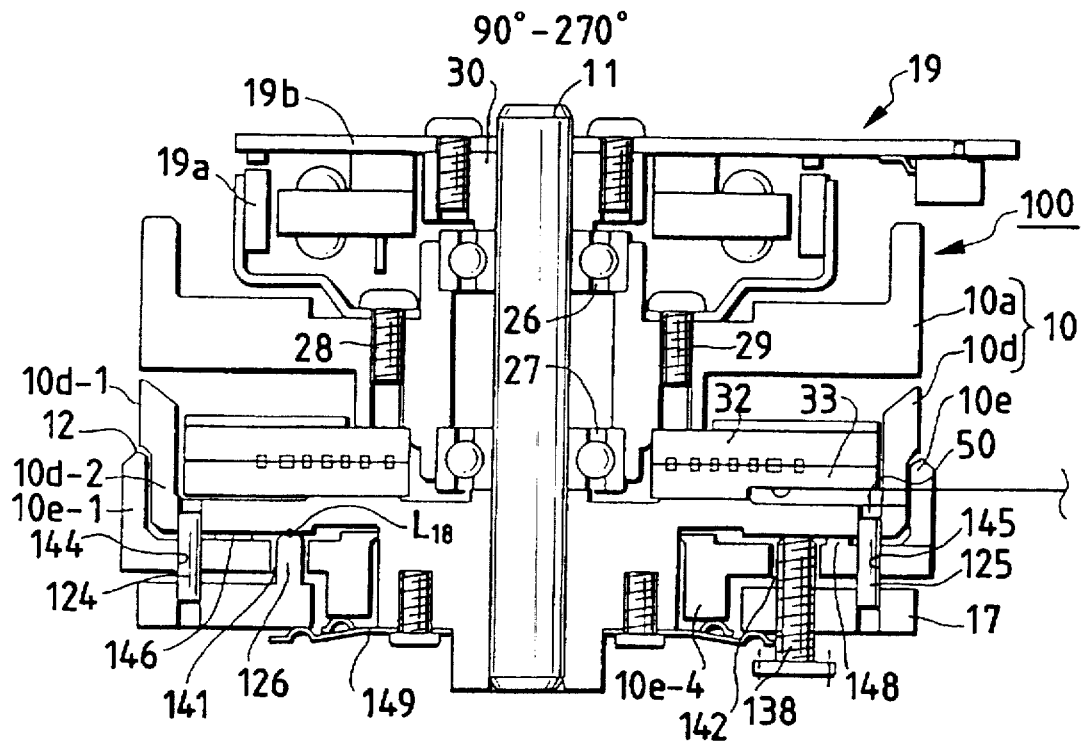
FIG. 52 is a 90°–270° cross sectional view showing a head drum assembly according to a sixth embodiment.
Figure 57:
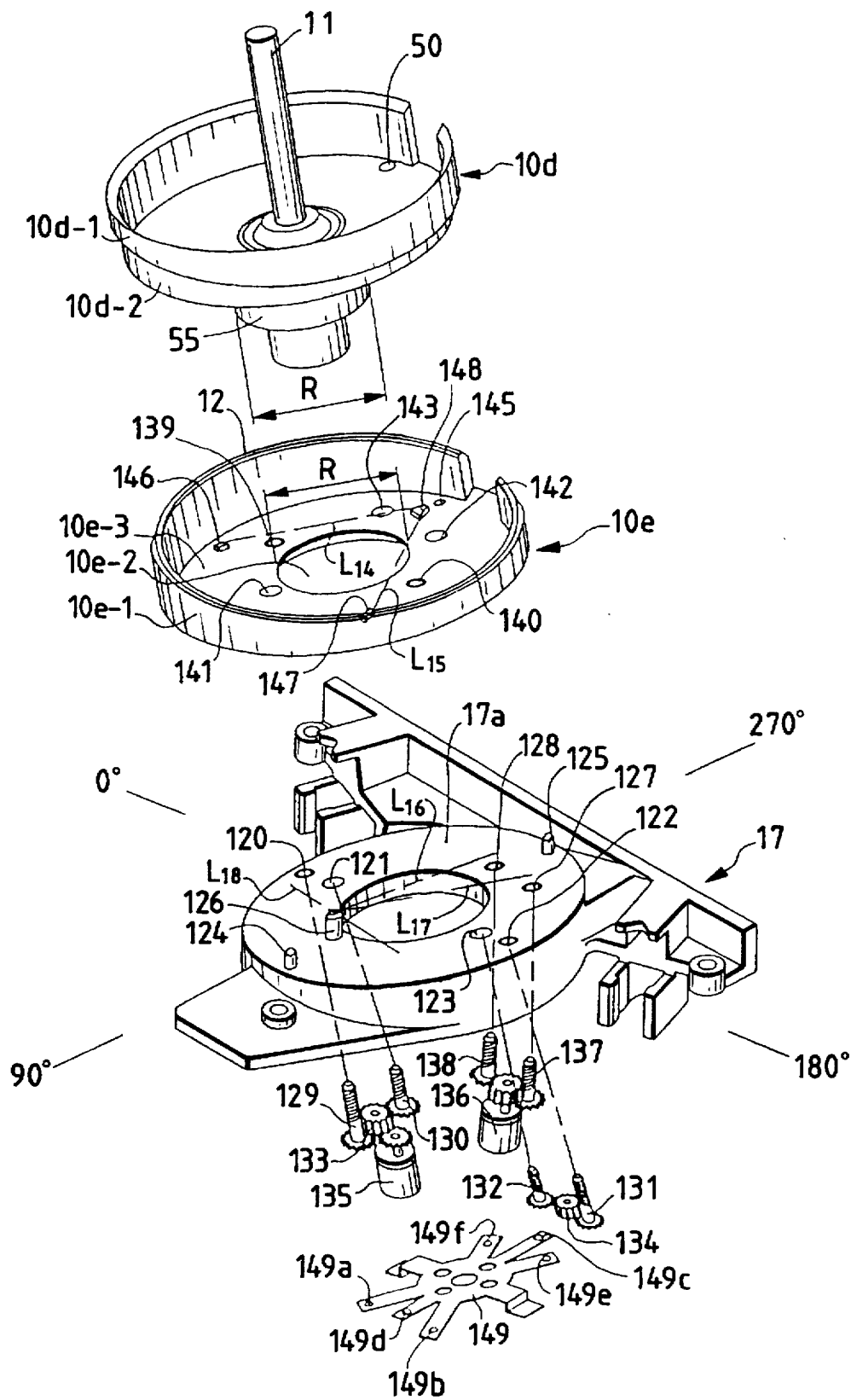
FIG. 57 is an exploded view showing the head drum assembly in FIG. 52.

The head drum assembly 100 is mounted on the drum base 17 secured on a chassis (not shown). The drum base 17, as shown in FIGS. 52 and 57, has formed therein a threaded hole 120 and a through hole 121 at the angular position of 0° and a threaded hole 122 and a through hole 123 at the angular position of 180°. Screws with gears 129 and 131 are inserted into the threaded holes 120 and 122. Screws with gears 130 and 132 engage threaded holes 139 and 140 formed in the lead ring 10e through the through holes 121 and 123. The screws 129 and 130 are connected to a motor 135 through an idle gear 133. The screws 131 and 132 are connected to the motor 135 through an idle gear 134 and a gear train (not shown). The activation of the motor 135, thus, causes the screws 129, 130, 131, and 132 to be moved simultaneously as follows: When the screws 129 and 130 are moved upward, the screws 131 and 132 are moved downward, while when the screws 129 and 130 are moved downward, the screws 131 and 132 are moved upward.

Figure 56:
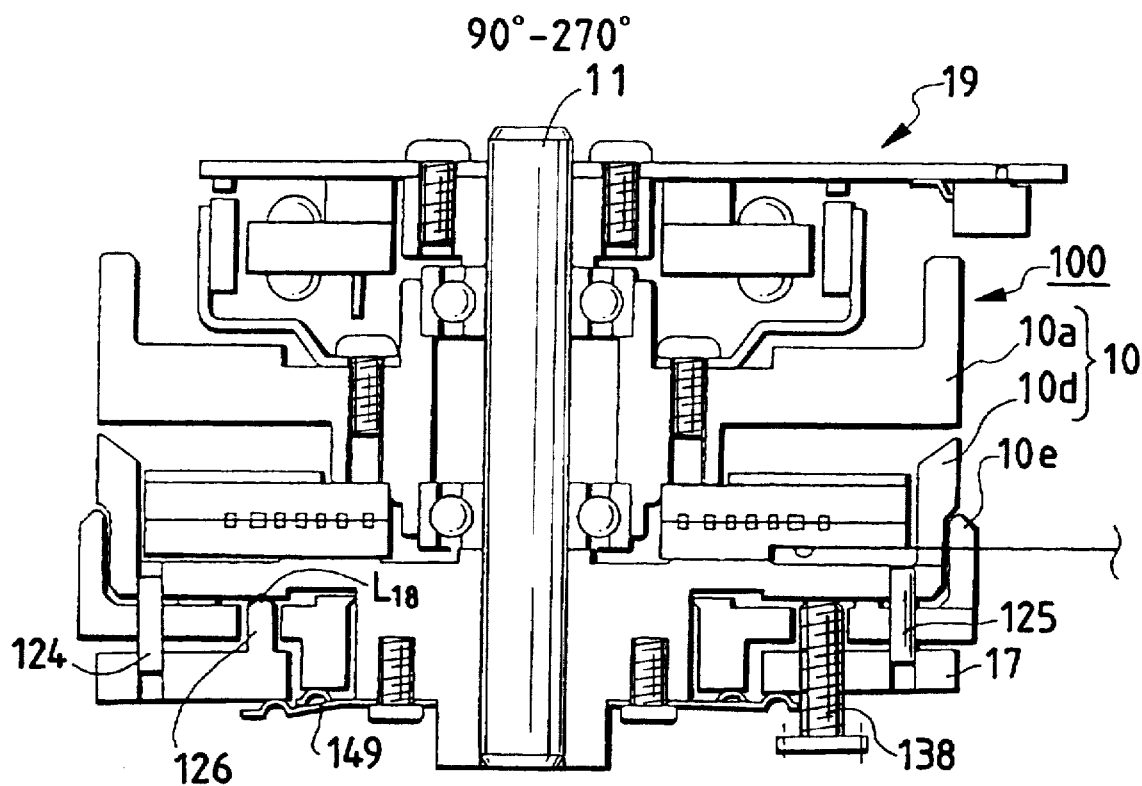
FIG. 56 is a 90°–270° cross sectional view showing the head drum assembly in FIG. 52 under a second positioning control.

The drum base 17 has formed therein threaded holes 127 and 128 at the angular positions of about 250° and 290° into which screws with gears 137 and 138 are inserted. The screws 137 and 138 are moved simultaneously in a vertical direction by a motor 136. Note that the threaded hole 128 and the screw 138 at the angular position of 290° are shown in FIGS. 52 and 56 of 90°-270° views for the sake of simplicity of illustration.

The drum base 17 has disposed in the upper surface 17a a positioning pin 124 and a support pin 126 at the angular position of 90° and a positioning pin 125 at the angular position of 270°. The positioning pins 124 and 125 are inserted into through holes 144 and 145 formed in the lead ring 10e with their ends being projected from the bottom portion 10e-3 in engagement with holes 49 and 50 formed in the lower drum 10d with given clearances for orienting rotation of the lead ring 10e and the lower drum 10e around the drum shaft 11.

The lead ring 10e has formed in the bottom portion 10e-3 threaded holes 139 and 140 at the angular position of 180°, holes 141, 142, and 143 at the angular positions of 90°, 250°, and 290°, and the through holes 144 and 145 at the angular positions of 90° and 270°. The support pin 126 is inserted into the hole 141. The screws 137 and 138 are inserted into the holes 142 and 143 with given clearances. The lead ring 10e also has support protrusions 146, 147, and 148 formed on the bottom portion 10e-3 at the angular positions of 45°, 135°, and 270°.

A plate spring 149 is secured on the central boss 55 of the lower drum 10d using screws. The plate spring 149 includes six arms 149a to 149f extending radially. Of these arms, the arms 149a 149b, and 149c at the angular positions of 45°, 135°, and 270° engage the lower surface of the drum base 17 to urge the lower drum 10d downward, bringing the bottom portion 10e-3 of the lower drum 10d into constant engagement with the support pin 126 and the screws 137 and 138. The arms 149d, 149e, and 149f engage an annular protrusion 10e-4 formed on the lower surface of the lead ring 10e to urge the lead ring 10e upward, bringing the support protrusions 146, 147, and 148 into constant engagement with the lower surface of the lower drum 10d.

Figure 54:
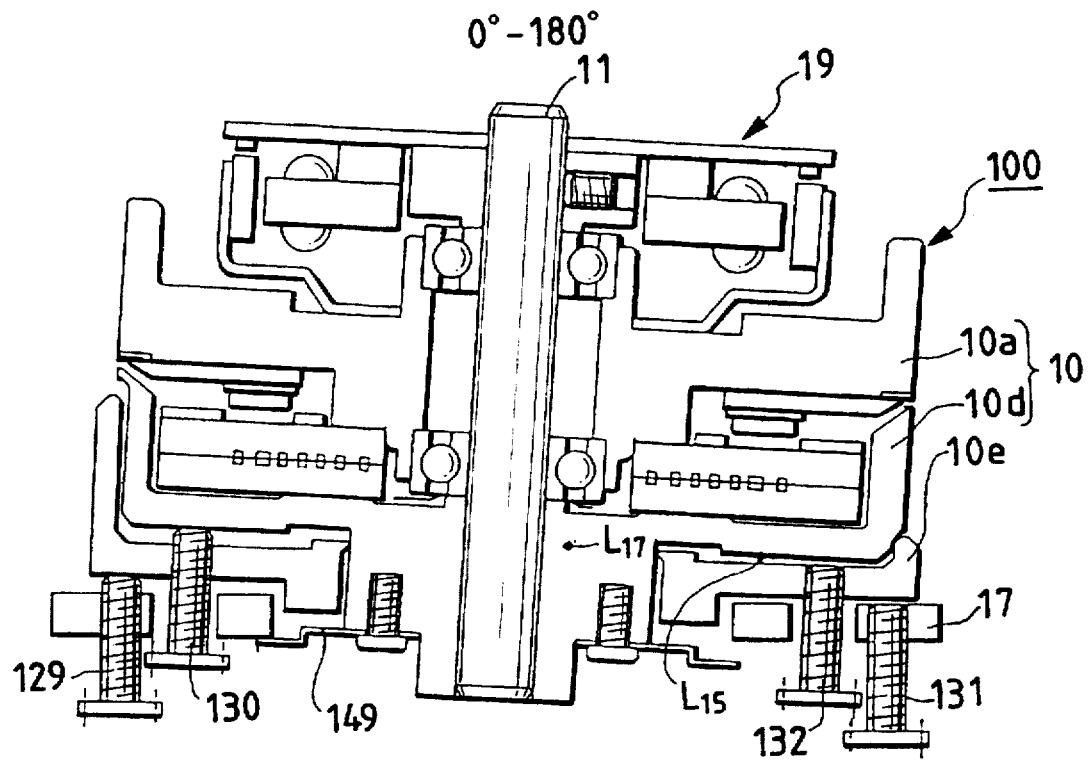
FIG. 54 is a 0°–180° cross sectional view showing the rotation of the head drum assembly clockwise in FIG. 52 under a first positioning control.

In operation, the first positioning control of the head drum assembly 100 (i.e., the tape guide drum 10 and the lead ring 10e) is, as shown in FIG. 54, accomplished by turning the lower drum 10d clockwise around the line L17 extending through the support pin 126 and the end of the screw 137 and turning the lead ring 10e clockwise (counterclockwise relative to the lower drum 10d) around the line L15 extending through the support protrusions 147 and 148. The first positioning control is, as shown in FIG. 55, also accomplished by turning the lower drum 10d counterclockwise around the line L16 extending through the support pin 126 and the end of the screw 138 and turning the lead ring 10e counterclockwise (clockwise relative to the lower drum 10d) around the line L14 extending through the support protrusions 146 and 148.

Figure 55:
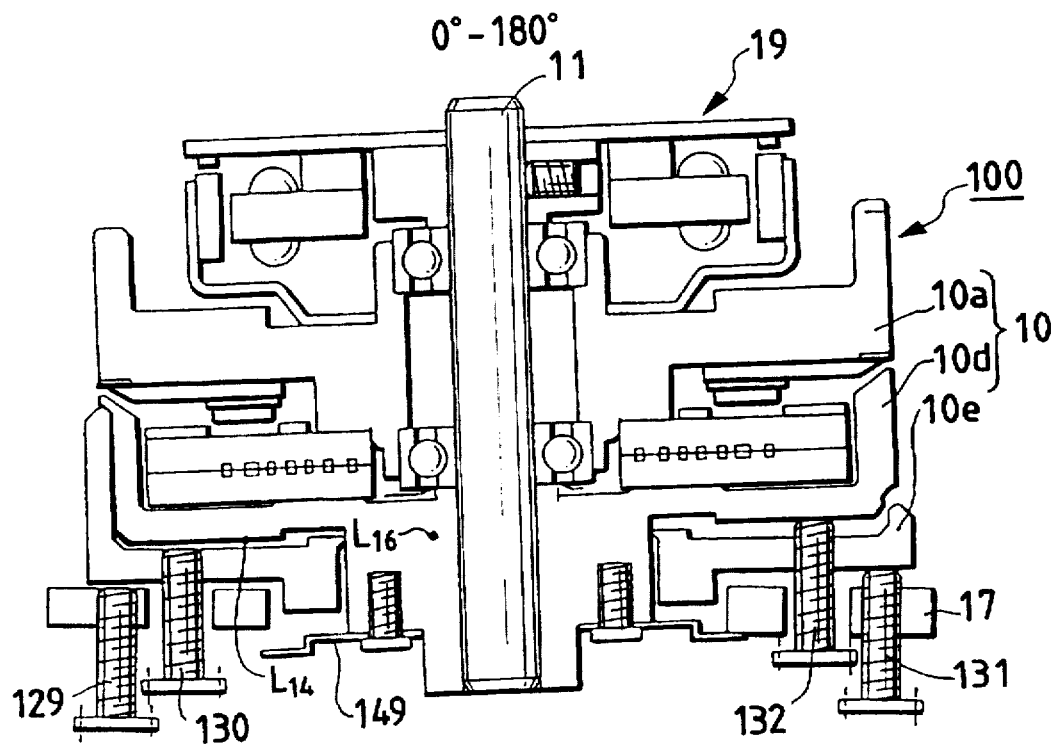
FIG. 55 is a 0°–180° cross sectional view showing the rotation of the head drum in FIG. 52 counterclockwise under a first positioning control.

The first positioning control shown in FIGS. 54 and 55 corresponds to the track correction and the lead correction in the FF reproduction mode and the FB reproduction mode. FIG. 56 shows the tape guide drum 10 and the lead ring 10e rotated clockwise around the line L18 under the second positioning control.

Either of the first positioning control and the track and lead correction in the FF reproduction mode according to clockwise rotation of the lower drum 10d and the lead ring 10e may be achieved independently by turning on the motor 136 to move the screws 137 and 138 up to the same level as that of the support pin 126, and then turning on the motor 135 to move the screws 129 and 130 upward, as viewed in FIG. 54, while moving the screws 131 and 132 downward, thereby causing the screws 131 and 132 to be moved away from the lower surfaces of the lead ring 10e and the lower drum 10d, respectively, the screw 130 to engage the lower surface of the lower drum 10d to turn the lower drum 10d clockwise around the line L17, and the screw 129 to engage the lower surface of the lead ring 10e to turn the lead ring 10e clockwise around the line L15.

Additionally, either of the first positioning control and the track and lead correction in the FF reproduction mode according to counterclockwise rotation of the lower drum 10d and the lead ring 10e may be achieved independently by turning on the motor 135 to move the screws 131 and 132 upward, as viewed in FIG. 55, while moving the screws 129 and 130 downward, thereby causing the lower drum 10d to be turned counterclockwise around the line L16 and the lead ring 10e to be turned counterclockwise around the line L14.

Figure 53:
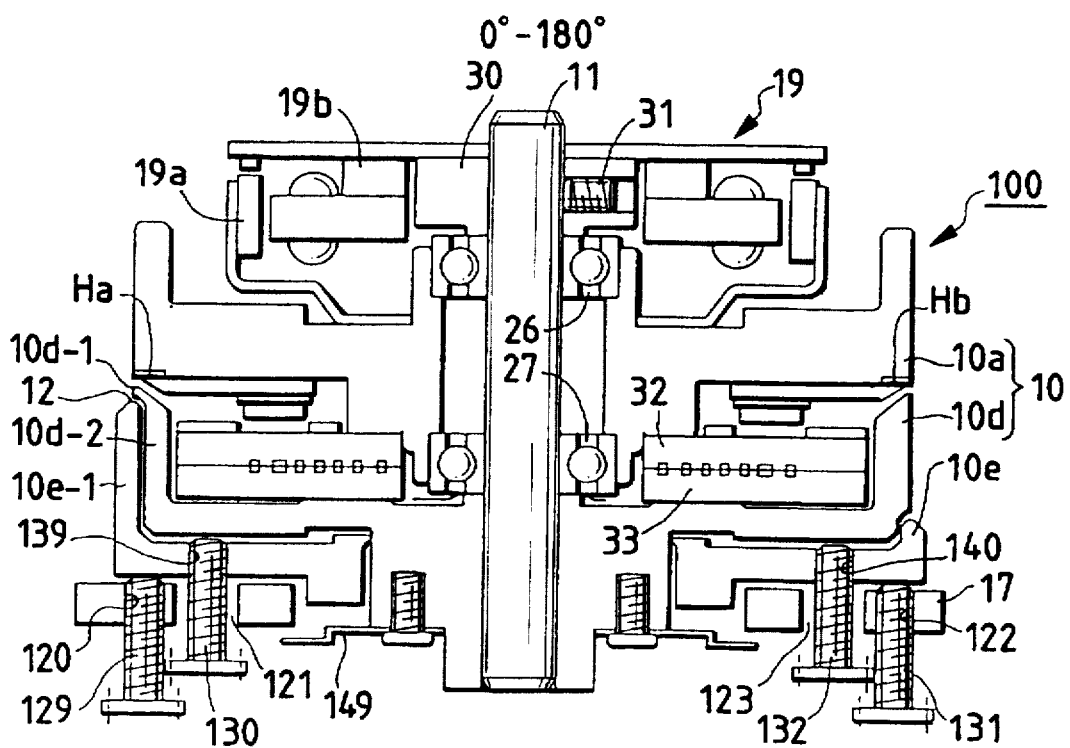
FIG. 53 is a 0°–180° cross sectional view showing the head drum assembly in FIG. 52.

Only the second positioning control may be achieved in the following manner. First, the screws 129 and 131 are, as shown in FIG. 53, moved away from the lower surface of the lead ring 10e, and the screws 130 and 132 are moved away from the lower surface of the lower drum 10d, thereby causing the lower drum 10d to be urged downward by a spring force of the plate spring 149 so that the lower surface of the lower drum 10d is supported by the support pin 126 and the screws 137 and 138 in engagement therewith. Next, the motor 136 is turned on to move the screws 137 and 138 downward, thereby causing the lead ring 10e and the lower drum 10d to be turned clockwise around the line L18.

In the above discussion, the first and second positioning control are performed independently, however; they may be performed simultaneously.

The orientation of the lead ring 10e with respect to the lower drum 10d during record or self-record/reproduction operation is established by moving the screws 129 and 131 away from the lower surface of the lead ring 10e, as shown in FIG. 53, and also moving the screws 130 and 132 away from the lower surface of the lower drum 10d under condition that the screws 137 and 138 are leveled by the motor 136 with the support pin 126, thereby bringing the three support protrusions 146, 147, and 148 into engagement with the lower surface of the lower drum 10d with the aide of the spring force of the plate spring 149.

Figure 66:
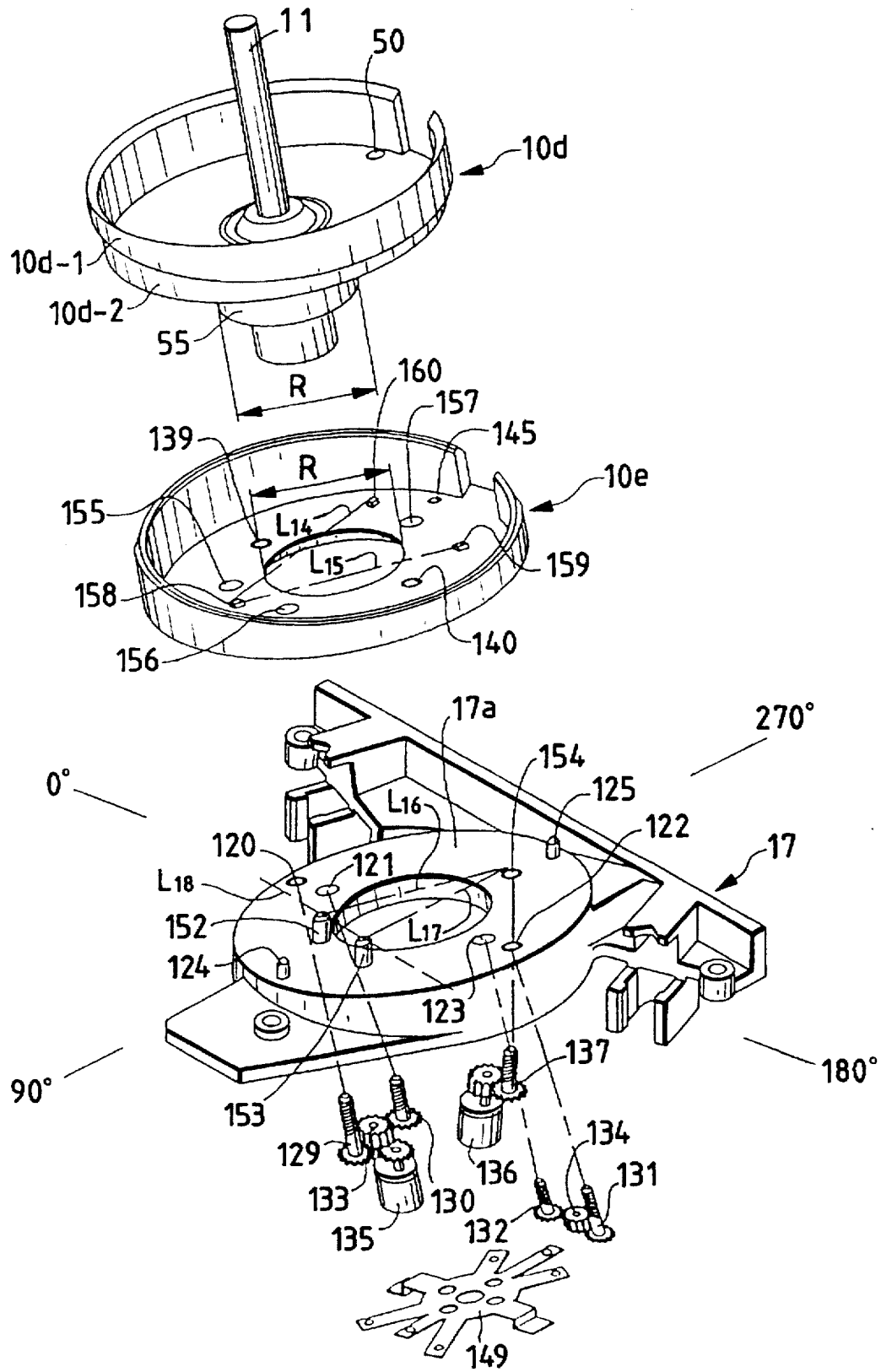
FIG. 66 is a perspective view showing a modification of a head drum assembly according to a sixth embodiment.

The first example of the axis of rotation explained so far is not limited to the above arrangements. For example, it is, as shown in FIG. 66, advisable that support pins 152 and 153 and a threaded hole 154 into which the screw 137 is inserted be provided on and in the drum base 17, and holes 155, 156, and 157 into which the support pins 152 and 153 and the screws 137 are inserted, respectively, and support protrusions 158, 159, and 160 be provided in and on the lead ring 10e.

Figure 58A:
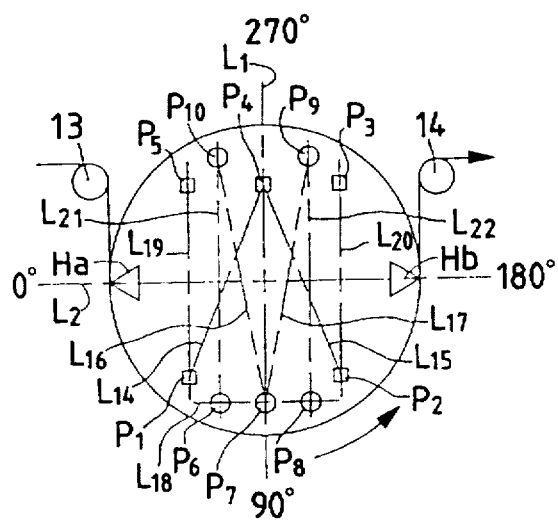
FIG. 58(a) is a plan view which shows a modification of a tape guide head drum according to a sixth embodiment.
Figure 58C:
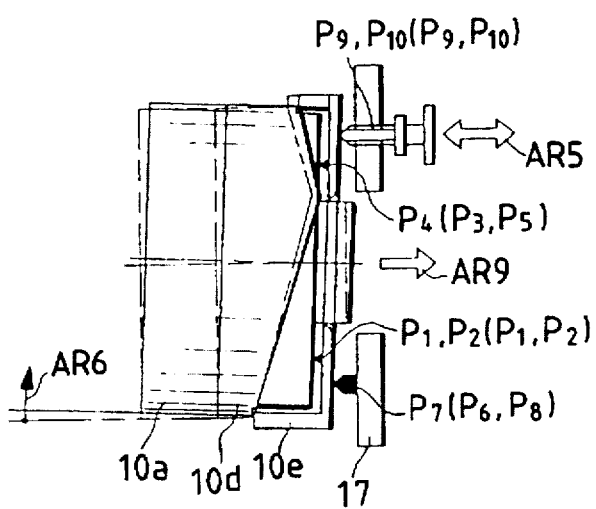
FIG. 58(c) is a side view of FIG. 58(a), as viewed from an angular position of 180°.
Figure 58B:
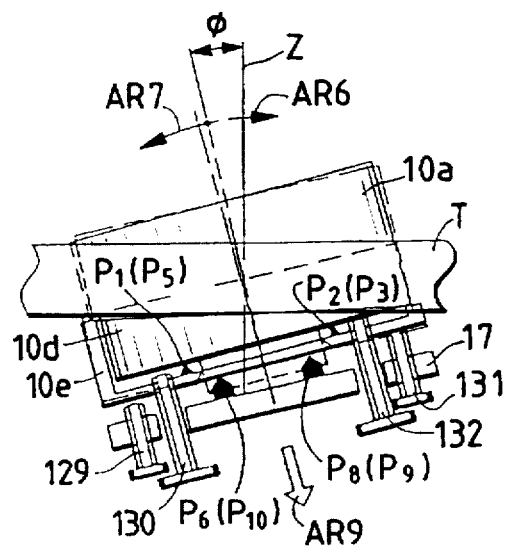
FIG. 58(b) is a front view of FIG. 58(a), as viewed from an angular direction of 90°.

While, in the above mentioned sixth embodiment, the pivots P7, P9, and P10 or the pivots P6, P8, P9 and P10 are disposed between the base drum 17 and the lower drum 10d, they may alternatively be, as shown in FIG. 58(a) to 58(c). disposed between the base drum 17 and the lead ring 10e.

A seventh embodiment in which the present invention is used with the head drum assembly 100 shown in FIG. 38(c) will be discussed below with reference to FIGS. 59(a) to 64.

The first positioning control in this embodiment is, as shown in FIG. 59(b), accomplished by turning the tape guide drum 10 around the line L3 (perpendicular to the drawing at right angles to the line L1) defined by a pivot 18 disposed between the drum base 17 and the lower drum 10b.

A spring 21 which urges the lower drum 10b counterclockwise around the pivot 18 is disposed between the drum base 17 and the lower drum 10b at the angular position of 180°. An actuator 83 is disposed in the drum base 17 at the angular position of 0° which moves the lower drum 10b vertically, as shown by the arrow AR5. The first positioning control is, thus, accomplished by moving the actuator 83 upward to turn the lower drum 10b clockwise, as shown by the arrow AR6, against a spring force of the spring 21 or by moving the actuator 83 downward to turn the lower drum 10b counterclockwise, as shown by an arrow AR7, with the aide of the spring force of the spring 21.

Though, in FIG. 59(b), the lower drum 10b is turned counterclockwise relative to the drum base 179 while the upper drum 10a is further turned counterclockwise relative to the lower drum 10b (this corresponds to the track correction and the lead correction in the FB reproduction mode, as will be describe later), it is possible to achieve the first positioning control. As already mentioned, it is preferable that the first positioning control be achieved by turning the upper drum 10a and the lower drum 10b together while maintaining the coaxiality thereof. The turning of the upper drum 10a and the lower drum 10b in union may be achieved by controlling the actuator 81 independently according to a displacement of the actuator 83 so as to maintain the coaxiality between the upper drum 10a and the lower drum 10b.

A spring 67 which urges the lower drum 10b clockwise around the pivot 57 is disposed between the drum base 17 and the lower drum 10b. An actuator 58 is disposed in the drum base 17 which is displaceable vertically, as shown by the arrow AR5. Thus, the second positioning control is accomplished by moving the actuator 58 upward to turn the lower drum 10b counterclockwise, as shown by the arrow AR7, against a spring force of the spring 67 or alternatively moving the actuator 58 downward to turn the lower drum 10b clockwise, as shown by the arrow AR6, with the aide of the spring force of the spring 67.

The track correction and the lead correction during the trick play mode such as the FF reproduction mode or the FB reproduction mode are achieved in the following manner. In the FF reproduction mode, the track correction is achieved by moving the actuator 81 arranged at the angular position of 0° upward to turn the upper drum 10a clockwise around the line L13 (perpendicular to the drawing of FIG. 59(b)) defined by the pivot 86 against the spring force of the spring 84 arranged at the angular position of 180°, and at the same time, the lead correction is achieved by moving the actuator 83 upward to turn the lower drum 10b clockwise around the line L3 defined by the pivot 18. In the FB reproduction mode, the track correction and the lead correction are achieved by moving the actuators 81 and 83 downward to turn the upper drum 10a and the lower drum 10b counterclockwise.

Figure 60:
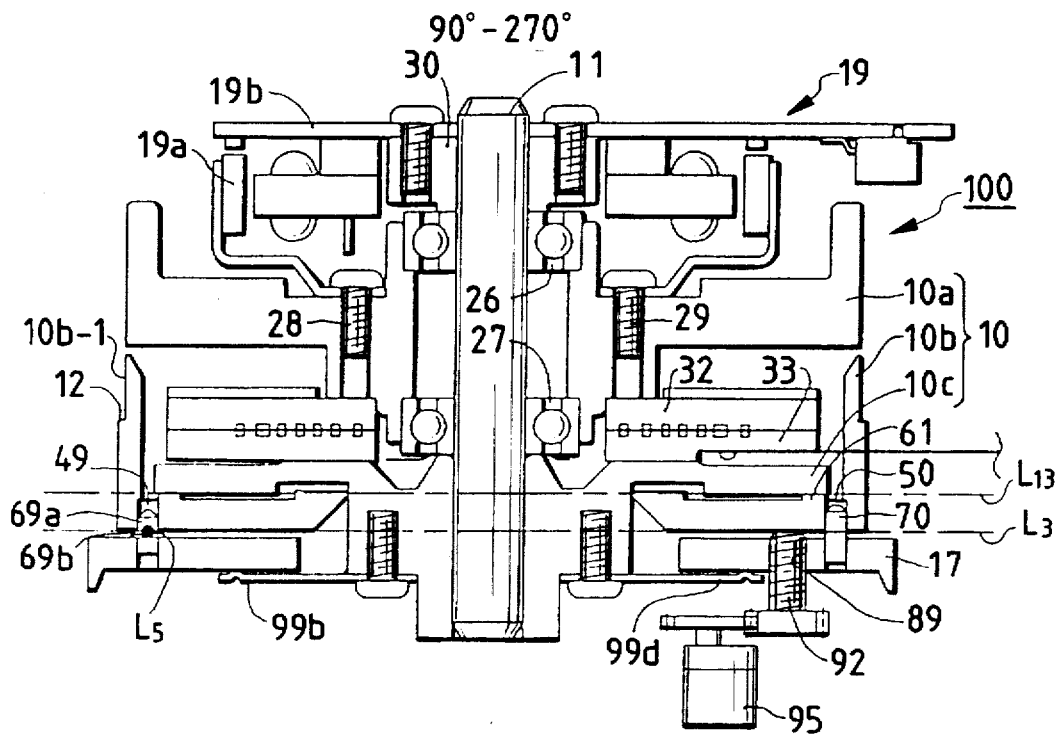
FIG. 60 is a 90°–270° cross sectional view showing a head drum assembly according to a seventh embodiment.
Figure 61:
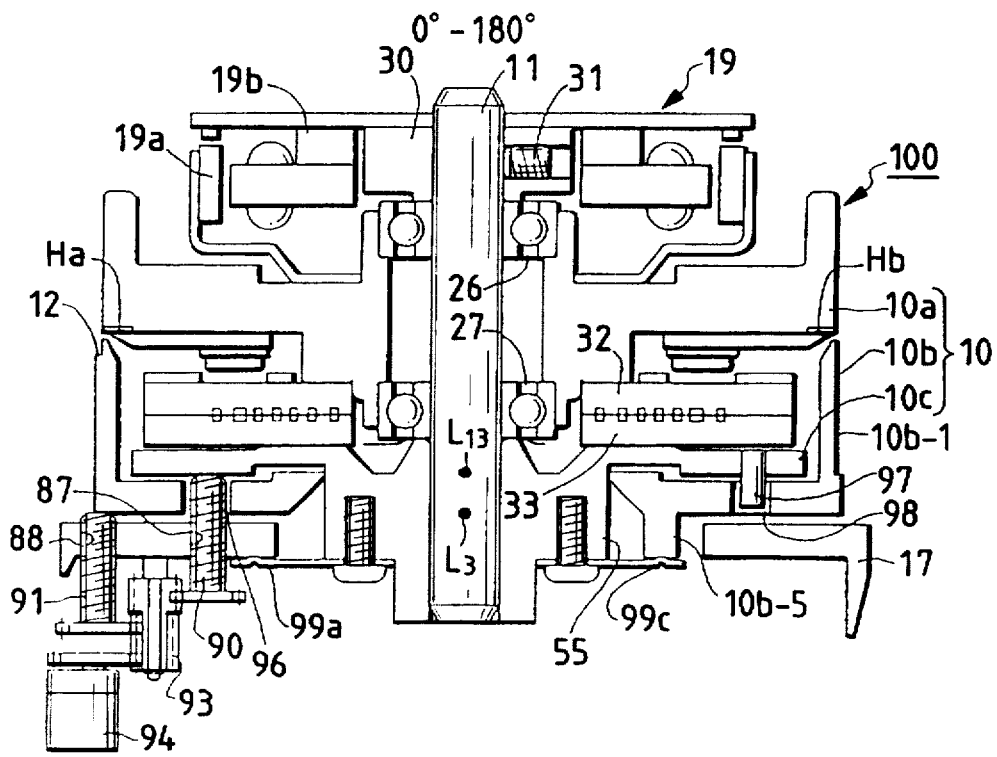
FIG. 61 is a 0°–180° cross sectional view showing the head drum assembly in FIG. 60.
Figure 62:
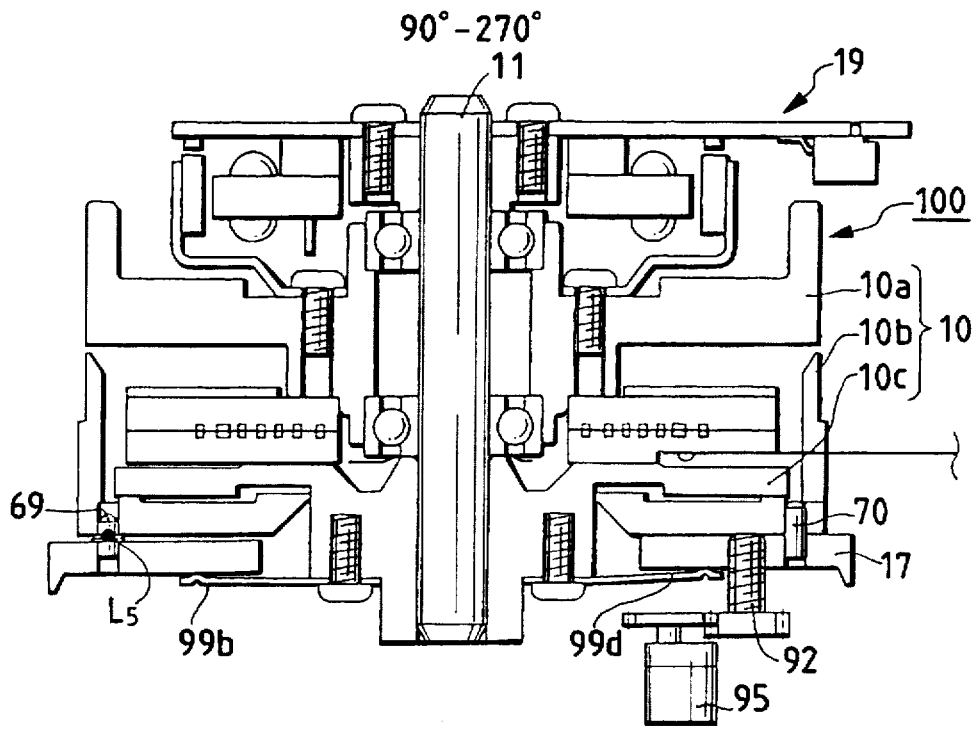
FIG. 62 is a 90°–270° cross sectional view showing the head drum assembly FIG. 60 under a second positioning control.
Figure 63:
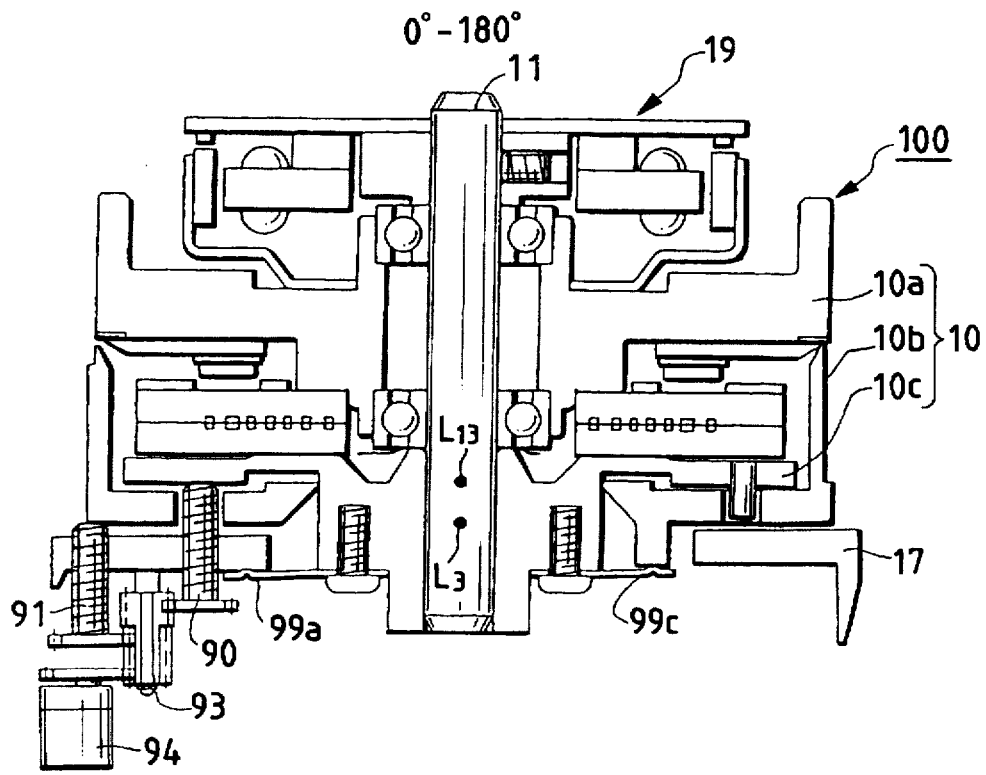
FIG. 63 is a 0°–180° cross sectional view showing the head drum in FIG. 60 under a first positioning control.
Figure 64:
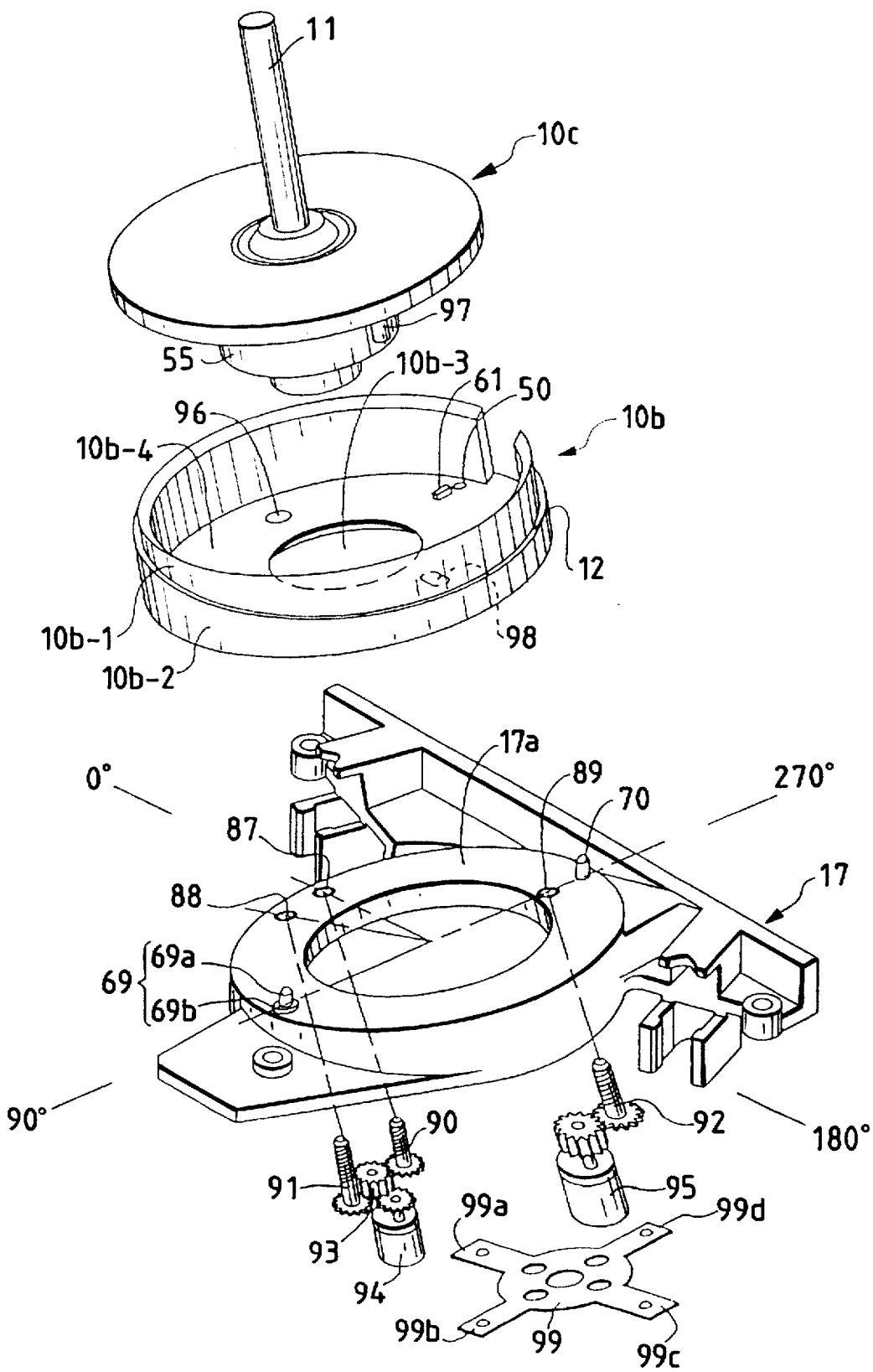
FIG. 64 is an exploded view showing the head drum assembly in FIG. 60.

FIGS. 60, 61, and 64 show a structure of the head drum assembly 100 of the seventh embodiment. FIG. 62 shows the second positioning control of the head drum assembly 100, and FIG. 63 shows the first positioning control thereof.

The head drum assembly 100, as shown in FIGS. 60, 61, and 64, includes the tape guide drum 10 and the drum motor 19. The tape guide drum 10 includes the upper drum 10a supported by the drum shaft 11, the lower drum 10b, and the intermediate disc member 10c disposed within the lower drum 10b with a given clearance therebetween.

The drum shaft 11 is press-fitted into the intermediate disc member 10c. The upper drum 10a having mounted thereon magnetic heads Ha and Hb is rotatably supported on the drum shaft 11 through bearings 26 and 27. The drum motor 19 consists of a rotor 19a and a stator 19b. The rotor 19a is installed on the upper drum 10a using screws 28 and 29. The stator 19b is secured on the drum shaft 11 by a set screw 31 through a collar 30. A rotatable transformer 32 is mounted on the upper drum 10a which transmits and receives signals to and from a stationary transformer 33 secured on the intermediate disc member 10c.

The thus-constructed head drum assembly 100 is mounted on the drum base 17 installed on a chassis (not shown). The drum base 17, as shown in FIGS. 60, 61, and 64, has formed therein threaded holes 87, 88, and 89 at the angular positions of 0°, about 30°, and 270°, respectively, into which screws with gears 90, 91, and 92 are inserted. The screws 90 and 91 are moved vertically by a motor 94 through an idle gear 93 in a speed ratio of about 2:1. The screw 92 is moved by a motor 95 vertically. Note that FIGS. 61 and 63 are 0°–180° cross sectional views, but also show the screw 91 arranged at the angular position of 30° for the sake of simplicity of illustration.

The drum base 17 has disposed thereon at the angular positions of 90° and 270° support pins or pivots 69 and 70 which are similar in structure to those shown in FIG. 36. The pins 69 and 70 engage holes 49 and 50 with given clearances which are formed in the lower drum 10b for forming an axis of rotation along the line L3 extending through the pivots 69a and 70.

The lower drum 10b, as can be seen in FIG. 64, includes a annular portion 10b-2 and a bottom portion 10b-4. The annular portion 10b-2 has formed thereon a tape-wrapped surface 10b-1 and a stepped portion or lead 12. The bottom portion 10b-4 has formed therein a central opening, a through hole 96 and an elongated hole 98. The central opening is 10b-3 defined by an inner wall of tapered or knife-edge shape in cross section, as shown in FIGS. 60 and 61. The through hole 96 is formed at the angular position of 0° to receive therein a screw with a gear 90. The elongated hole 98 is formed at the angular position of 180° to receive therein a positioning pin 97 disposed in the intermediate disc member 10c. The bottom portion 10b-4, as shown in FIG. 60, has also formed thereon at the angular positions of 90° and 270° support protrusions 60 and 61. The intermediate disc member 10c is disposed within the lower drum 10b in engagement with the annular portion 10b-2, while a central boss 55 engages the central opening 10b-3 of the lower drum 10b with a given clearance and the positioning pin 97 is inserted into the elongated hole 98. The intermediate disc member 10c is, thus, supported by the support protrusions 60 and 61 formed on the bottom portion 10b-4 of the lower drum 10b and the end of the screw 90 projecting through the through hole 96.

A plate spring 99 is secured on the central boss 55 of the lower drum 10d using screws. The plate spring 99 includes four arms 99a to 99d extending radially with regular intervals. The arms 99a, 99b, and 99d engage at the angular positions of 0°, 90°, and 270° the lower surface of the drum base 17 to urge the intermediate disc member 10c and the lower drum 10b downward. The arm 99c engages at the angular position of 180° a protrusion 10b-5, as shown in FIG. 61, formed on the lower surface of the bottom portion 10b-4 of the lower drum 10b to urge the lower drum 10b in a counterclockwise direction.

FIG. 63 show the head drum assembly 100 (i.e., the tape guide drum 10) under the first positioning control (the track correction and the lead correction in the FF reproduction mode) achieved with clockwise rotation of the lower drum 10b around the line L3 and clockwise rotation of the intermediate disc member 10c or the upper drum 10a around the line L13. FIG. 62 show the head drum assembly 100 under the second positioning control achieved by clockwise rotation of the tape guide drum 10 (i.e., the upper drum 10a and the lower drum 10b) around the line L5.

Specifically, the first positioning control around the line L3 is achieved by turning on the motor 94 to move the screw 91 vertically, as shown in FIG. 62. The upward movement of the screw 91 under condition that the screw 92 projects from the upper surface 17a of the drum base 17 by a distance equal to the thickness of the spacer 69b of the support pin 69 causes the lower drum 10b to be turned clockwise against a spring force of the arm 99c of the plate spring 99. Conversely, the downward movement of the screw 91 causes the lower drum 10b to be turned counterclockwise with the aide of the spring force of the arm 99c of the plate spring 99.

The second positioning control is achieved by turning on the motors 95 and 94 at the same time to move the screws 92 and 91 vertically. The downward movement of the screws 92 and 91 in a given speed ratio, as shown in FIG. 62, causes the lower drum 10b to be turned clockwise with the aide of the spring force of the arm 99d of the plate spring 99. Conversely, the upward movement of the screws 92 and 91 in the given speed ratio causes the lower drum 10b to be turned counterclockwise against the spring force of the arm 99d of the plate spring 99.

The speed ratio of the screw 92 to the screw 91 during the vertical movement may be determined so as to orient a plane defined by three points: the end of the screw 92, the end of the screw 91, and the spacer 69b of the support pin 69 to coincide with the bottom of the lower drum 10b when rotating the tape guide drum 10 through a desired angle around the line 15.

When either of the first positioning control and the second positioning control is performed independently, the screw 90 is moved along with the screws 91 in the same direction by a distance of about twice that of the screw 91 to turn the intermediate disc member 10c and the upper drum 10a around the line L13 relative to the lower drum 10b (i.e., the track correction), however; it has been found by the inventors of this application that the first and second positioning control can be achieved regardless of the rotation of the upper drum 10a relative to the lower drum 10b as long as the degree to which tracks of a magnetic tape are curved is smaller than a given value.

In the above discussion, the first positioning control and the second positioning control are performed independently, however; they may be performed simultaneously by selectively changing displacements of the screws 91 and 89 from the upper surface 17a of the drum base 17.

In the seventh embodiment, the screws 90 and 91 are moved by the single motor 94 for decreasing the number of component parts, but they may alternatively be moved by separate motors. In this case, it is advisable that a displacement of the screw 90 be controlled according to movement of the screws 91 and 92 so as to prevent the upper drum 10a from being inclined to the lower drum 10b.

The trick play mode such as the FF reproduction mode or the FB reproduction mode is achieved by moving the screws 90 and 91 vertically through the motor 94 under condition that the screw 92 is projected from the upper surface 17a by a distance equal to the thickness of the spacer 69b of the support pin 69. Specifically, in the FF reproduction mode, the screws 90 and 91 are moved upward, as viewed in FIG. 63, through the motor 94 in a speed ratio of 2:1 to turn the intermediate disc member 10c, the upper drum 10a, and the lower drum 10b clockwise. In the FB reproduction mode, the screws 90 and 91 are moved downward in a speed ratio of 2:1 to turn the intermediate disc member 10c, the upper drum 10a, and the lower drum 10d counterclockwise.

While the present invention has been disclosed in terms of the preferred embodiment, in order to facilitate a better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A magnetic reproduction apparatus comprising:

a tape guide drum including an upper drum portion and a lower drum portion, the lower drum portion having formed thereon a lead for guiding a lower edge portion of a magnetic tape wrapped about said tape guide drum, the upper drum portion having mounted thereon a magnetic head so as to be rotatable on a given head rotation plane for reproducing information data recorded on slant tracks formed on the magnetic tape;

a drum shaft supporting the upper drum portion and the lower drum portion of said tape guide drum coaxially with each other and orienting the upper drum portion and the lower drum portion at a given angle to a direction of tape travel;

an entrance guide post defining a tape-entering position of a tape-wrapped area on said tape guide drum;

an exit guide post defining a tape-leaving position of the tape-wrapped area on said tape guide drum;

entrance guide roller means, having disposed thereon a flange, for orienting an upper edge portion of the magnetic tape entering said tape guide drum;

exit guide roller means, having disposed thereon a flange, for orienting the upper portion of the magnetic tape leaving said tape guide drum;

first positioning means for positioning said tape guide drum, for orienting a first portion of the head rotation plane at the tape-entering position in a first direction and orienting a second portion of the head rotation plane at the tape-leaving position in a second direction opposite the first direction; and second positioning means for positioning said tape guide drum for orienting the first and second portions of the head rotation plane at the tape-entering position and the tape-leaving position in the same direction, said second positioning means turning said tape guide drum around an axis defined by a line extending between a drum base supporting said tape guide drum and the lower drum in a direction perpendicular to a line extending between said drum base and the lower drum in parallel to a line extending through the center of the tape-wrapped area between the tape-entering position and the tape-leaving position and perpendicular to said drum shaft.

2. A magnetic reproduction apparatus as set forth in claim 1, further comprising a drum base having a reference surface which is inclined at the given angle to the direction of tape travel and which supports said tape guide drum, and wherein said first positioning means turns said tape guide drum around a line defined between a first pivot and a second pivot provided between said drum base and the lower drum of said tape guide drum.

3. A magnetic reproduction apparatus as set forth in claim 1, wherein said first positioning means turns said tape guide drum around a first line defined between a first pivot and a second pivot provided between a drum base supporting said tape guide drum and the lower drum of said tape guide drum, and around a second line defined between the first pivot and a third pivot provided between said drum base and the lower drum.

4. A magnetic reproduction apparatus as set forth in claim 1, wherein said first positioning means turns said tape guide drum around a first line defined between a first pivot and a second pivot provided between a drum base supporting said tape guide drum and the lower drum of said tape guide drum and around a second line defined between third pivot and a fourth pivot provided between said drum base and the lower drum.

5. A magnetic reproduction apparatus as set forth in claim 1, further comprising turning means for establishing relative turning of the upper drum and the lower drum.

6. A magnetic reproduction apparatus comprising:

a tape guide drum including an upper drum portion and a lower drum portion, the upper drum portion having mounted thereon a magnetic head so as to be rotatable on a given head rotation plane for reproducing information data recorded on slant tracks formed on the magnetic tape;

a lead ring including an annular portion and a bottom portion, the annular portion having formed thereon a lead guiding a lower edge portion of the magnetic tape wrapped about said tape guide drum;

a stepped portion formed on a lower portion of the lower drum of said tape guide drum, said stepped portion being disposed within the annular portion of said lead ring with a given clearance;

a drum base having a reference surface which is inclined at a given angle to the direction of tape travel and supports said tape guide drum;

a drum shaft supporting the upper drum portion and the lower drum portion of said tape guide drum coaxially with each other and orienting the upper drum portion and the lower drum portion at a given angle to a direction of tape travel;

an entrance guide post defining a tape-entering position of a tape-wrapped area on said tape guide drum;

an exit guide post defining a tape-leaving position of the tape-wrapped area on said tape guide drum;

entrance guide roller means, having disposed thereon a flange, for orienting an upper edge portion of the magnetic tape entering said tape guide drum;

exit guide roller means, having disposed thereon a flange, for orienting the upper portion of the magnetic tape leaving said tape guide drum;

first positioning means for positioning said tape guide drum, orienting a first portion of the head rotation plane and a first portion of said lead ring at the tape-entering position in a first direction and orienting a second portion of the head rotation plane and a second portion of said lead ring at the tape-leaving position in a second direction opposite the first direction; and second positioning means for positioning said tape guide drum for orienting the first and second portions of the head rotation plane and said lead ring at the tape-entering position and the tape-leaving position in the same direction, said second positioning means turning said tape guide drum around an axis defined by a line extending between a drum base supporting said tape guide drum and the lower drum in a direction perpendicular to a line extending between said drum base and the lower drum in parallel to a line extending through the center of the tape-wrapped area between the tape-entering position and the tape-leaving position and perpendicular to said drum shaft.

7. A magnetic reproduction apparatus as set forth in claim 6, further comprising turning means for establishing relative turning of said lead ring and said tape guide drum.

* * * * *